US012639285B1

(12) United States Patent
Lieven et al.

(10) Patent No.: US 12,639,285 B1
(45) Date of Patent: May 26, 2026

(54) ADAPTING DATA ALIGNMENT RECOMMENDATIONS TO CODE REVISIONS USING PENALTY-MATRICES

(71) Applicant: Direct Supply, Inc., Milwaukee, WI (US)

(72) Inventors: Suzanne Lieven, Milwaukee, WI (US); Charles W. Fastner, Milwaukee, WI (US); Eric Arndt, Milwaukee, WI (US); Sarthak Dabas, Jr., Milwaukee, WI (US)

(73) Assignee: Direct Supply, Inc., Milwaukee, WI (US)

( * ) Notice: Subject to any disclaimer, the term of this patent is extended or adjusted under 35 U.S.C. 154(b) by 0 days.

(21) Appl. No.: 19/338,250

(22) Filed: Sep. 24, 2025

Related U.S. Application Data

(63) Continuation-in-part of application No. 18/217,283, filed on Jun. 30, 2023, now abandoned.

(51) Int. Cl.
 *G06F 16/23* (2019.01)
 *G06F 18/21* (2023.01)
(52) U.S. Cl.
 CPC ........ *G06F 16/2358* (2019.01); *G06F 18/217* (2023.01)
(58) Field of Classification Search
 None
 See application file for complete search history.

(56) References Cited

U.S. PATENT DOCUMENTS

| | | | | |
|---|---|---|---|---|
| 8,204,809 | B1 * | 6/2012 | Wise | G06Q 40/06 705/36 R |
| 12,519,840 | B1 * | 1/2026 | Abotchie | H04L 63/20 |
| 2005/0071185 | A1 * | 3/2005 | Thompson | G06Q 10/10 705/317 |
| 2009/0319420 | A1 * | 12/2009 | Sanchez | G06Q 40/03 705/38 |
| 2019/0116038 | A1 * | 4/2019 | Sprague | H04L 9/3226 |
| 2019/0236510 | A1 * | 8/2019 | Kwak | G07C 5/008 |
| 2022/0107788 | A1 * | 4/2022 | Beck | G06F 8/34 |
| 2024/0256678 | A1 * | 8/2024 | Thompson | G06F 21/577 |
| 2025/0039067 | A1 * | 1/2025 | Crabtree | H04L 43/028 |
| 2025/0068755 | A1 * | 2/2025 | Johnson, Jr. | G06F 16/9024 |
| 2025/0284613 | A1 * | 9/2025 | Smith | G06F 8/65 |
| 2025/0335624 | A1 * | 10/2025 | Gjerdrum | G06F 16/24542 |
| 2025/0348592 | A1 * | 11/2025 | Wargo | G06F 21/552 |

(Continued)

*Primary Examiner* — Eliyah S. Harper
(74) *Attorney, Agent, or Firm* — Perkins Coie LLP

(57) ABSTRACT

Methods and systems are provided for adjusting data-alignment recommendations across a dispersed network of entities when a governing code of data standards is revised. A template-generation model receives the amended code and produces a first data template that lists entity-specific alignment tasks ranked by base scores reflecting predicted enforcement risk. Historical enforcement data—aggregated from multiple sources by matching entity identifiers—are supplied to an enforcement model, which outputs a penalty matrix containing weights that quantify the likelihood of future enforcement procedures for each entity-standard pair. The base scores are automatically adjusted in view of these weights, and the template-generation model issues an updated data template whose recommendations are re-ranked to prioritize entities facing heightened compliance risk.

20 Claims, 43 Drawing Sheets

(56) References Cited

U.S. PATENT DOCUMENTS

| | | | | |
|---|---|---|---|---|
| 2025/0378108 A1* | 12/2025 | Orth | ........................ | G06F 16/38 |
| 2025/0384733 A1* | 12/2025 | Chun | .................. | G07F 17/3225 |
| 2025/0384735 A1* | 12/2025 | Chun | .................. | G07F 17/3241 |

* cited by examiner

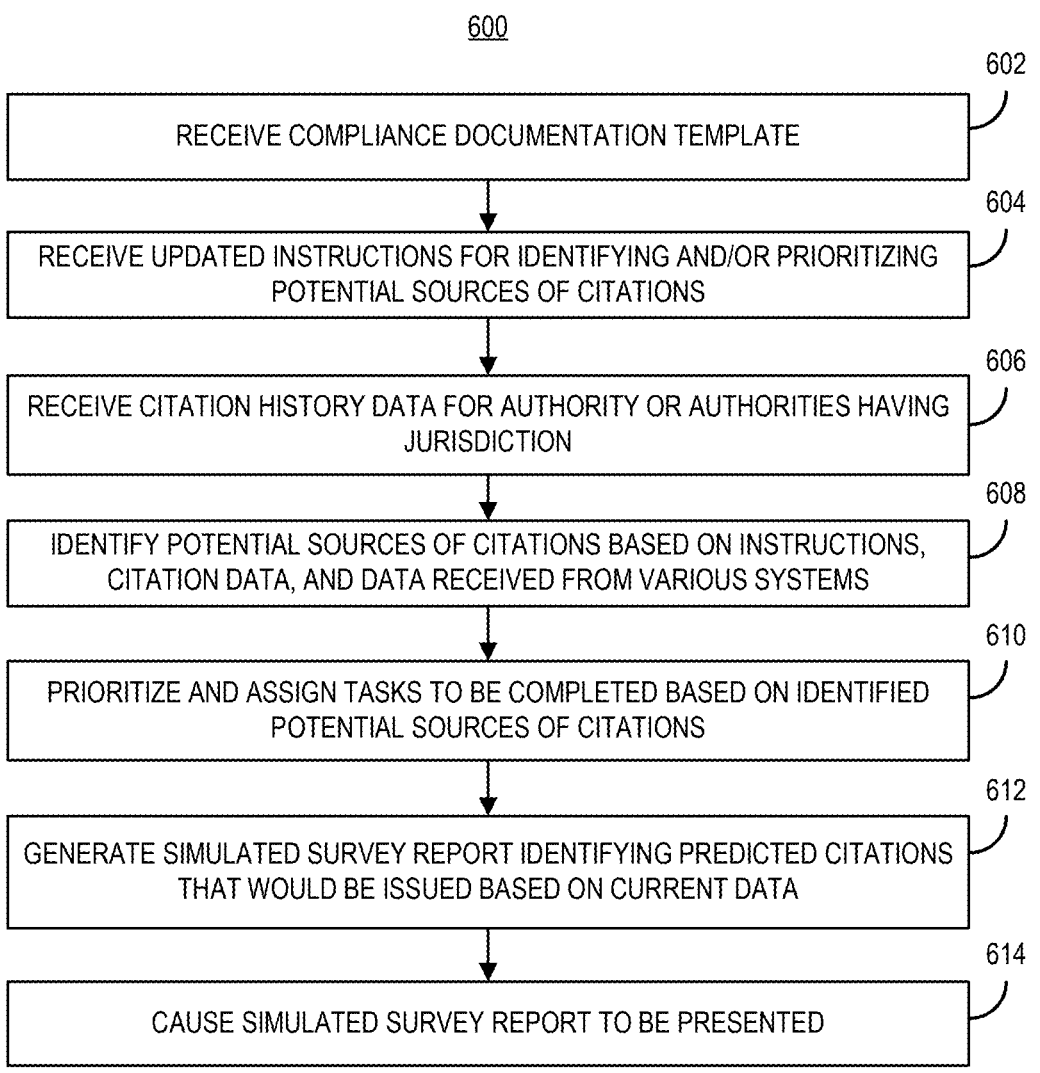

600

602
RECEIVE COMPLIANCE DOCUMENTATION TEMPLATE

604
RECEIVE UPDATED INSTRUCTIONS FOR IDENTIFYING AND/OR PRIORITIZING POTENTIAL SOURCES OF CITATIONS

606
RECEIVE CITATION HISTORY DATA FOR AUTHORITY OR AUTHORITIES HAVING JURISDICTION

608
IDENTIFY POTENTIAL SOURCES OF CITATIONS BASED ON INSTRUCTIONS, CITATION DATA, AND DATA RECEIVED FROM VARIOUS SYSTEMS

610
PRIORITIZE AND ASSIGN TASKS TO BE COMPLETED BASED ON IDENTIFIED POTENTIAL SOURCES OF CITATIONS

612
GENERATE SIMULATED SURVEY REPORT IDENTIFYING PREDICTED CITATIONS THAT WOULD BE ISSUED BASED ON CURRENT DATA

614
CAUSE SIMULATED SURVEY REPORT TO BE PRESENTED

FIG. 6

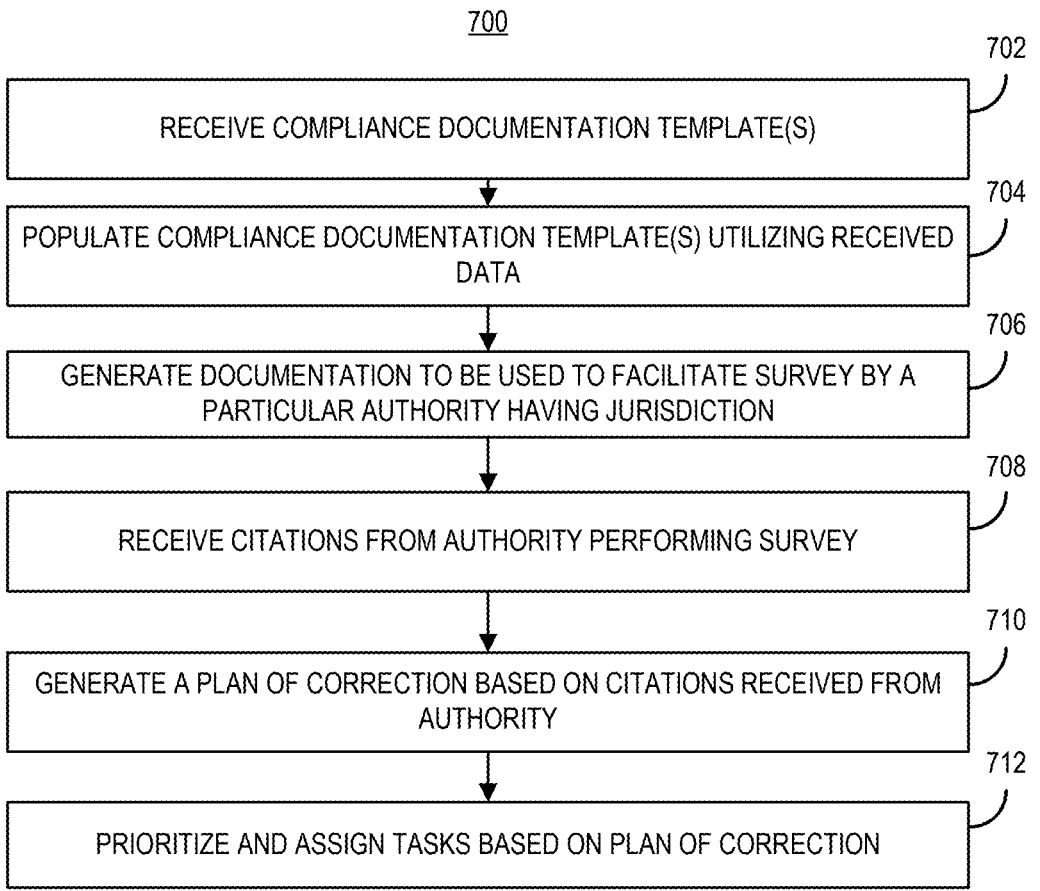

700

702
RECEIVE COMPLIANCE DOCUMENTATION TEMPLATE(S)

704
POPULATE COMPLIANCE DOCUMENTATION TEMPLATE(S) UTILIZING RECEIVED DATA

706
GENERATE DOCUMENTATION TO BE USED TO FACILITATE SURVEY BY A PARTICULAR AUTHORITY HAVING JURISDICTION

708
RECEIVE CITATIONS FROM AUTHORITY PERFORMING SURVEY

710
GENERATE A PLAN OF CORRECTION BASED ON CITATIONS RECEIVED FROM AUTHORITY

712
PRIORITIZE AND ASSIGN TASKS BASED ON PLAN OF CORRECTION

FIG. 7

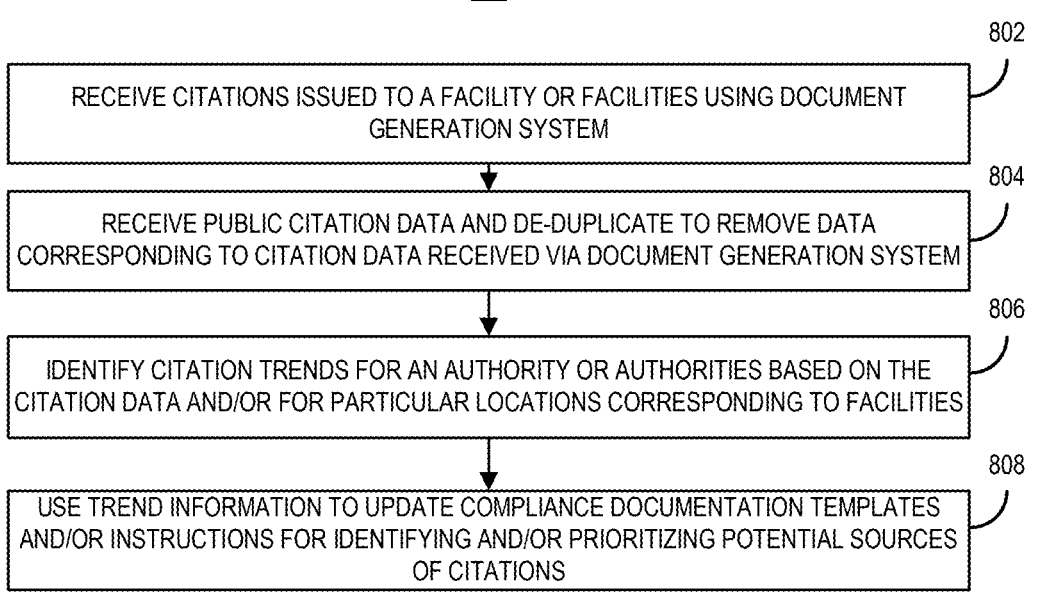

800

802
RECEIVE CITATIONS ISSUED TO A FACILITY OR FACILITIES USING DOCUMENT GENERATION SYSTEM

804
RECEIVE PUBLIC CITATION DATA AND DE-DUPLICATE TO REMOVE DATA CORRESPONDING TO CITATION DATA RECEIVED VIA DOCUMENT GENERATION SYSTEM

806
IDENTIFY CITATION TRENDS FOR AN AUTHORITY OR AUTHORITIES BASED ON THE CITATION DATA AND/OR FOR PARTICULAR LOCATIONS CORRESPONDING TO FACILITIES

808
USE TREND INFORMATION TO UPDATE COMPLIANCE DOCUMENTATION TEMPLATES AND/OR INSTRUCTIONS FOR IDENTIFYING AND/OR PRIORITIZING POTENTIAL SOURCES OF CITATIONS

FIG. 8

900

902
AGGREGATE POTENTIAL SOURCES OF CITATIONS IDENTIFIED DURING SIMULATED SURVEYS OF MULTIPLE FACILITIES (E.G., IN AN AREA INCLUDING A FACILITY OF INTEREST)

904
ANALYZE AGGREGATED DATA TO IDENTIFY TRENDS IN CITATIONS IN SIMULATED SURVEYS

906
IDENTIFY AREAS FOR IMPROVEMENTS BASED ON THE TRENDS

908
RECEIVE USER INPUT INDICATIVE OF DESIRED OUTPUT FORMAT

910
GENERATE AUDIT TEMPLATE(S) BASED ON RECEIVED USER INPUT, AREAS FOR IMPROVEMENTS, AND TRENDS

912
CAUSE USER INTERFACE BASED ON AUDIT TEMPLATE(S) TO BE PRESENTED, FACILITATE ENTRY OF NOTES AND GENERATION OF CITATIONS

914
CAUSE USER INTERFACE WITH TRENDS AND/OR AREAS FOR IMPROVEMENT TO BE PRESENTED

FIG. 9

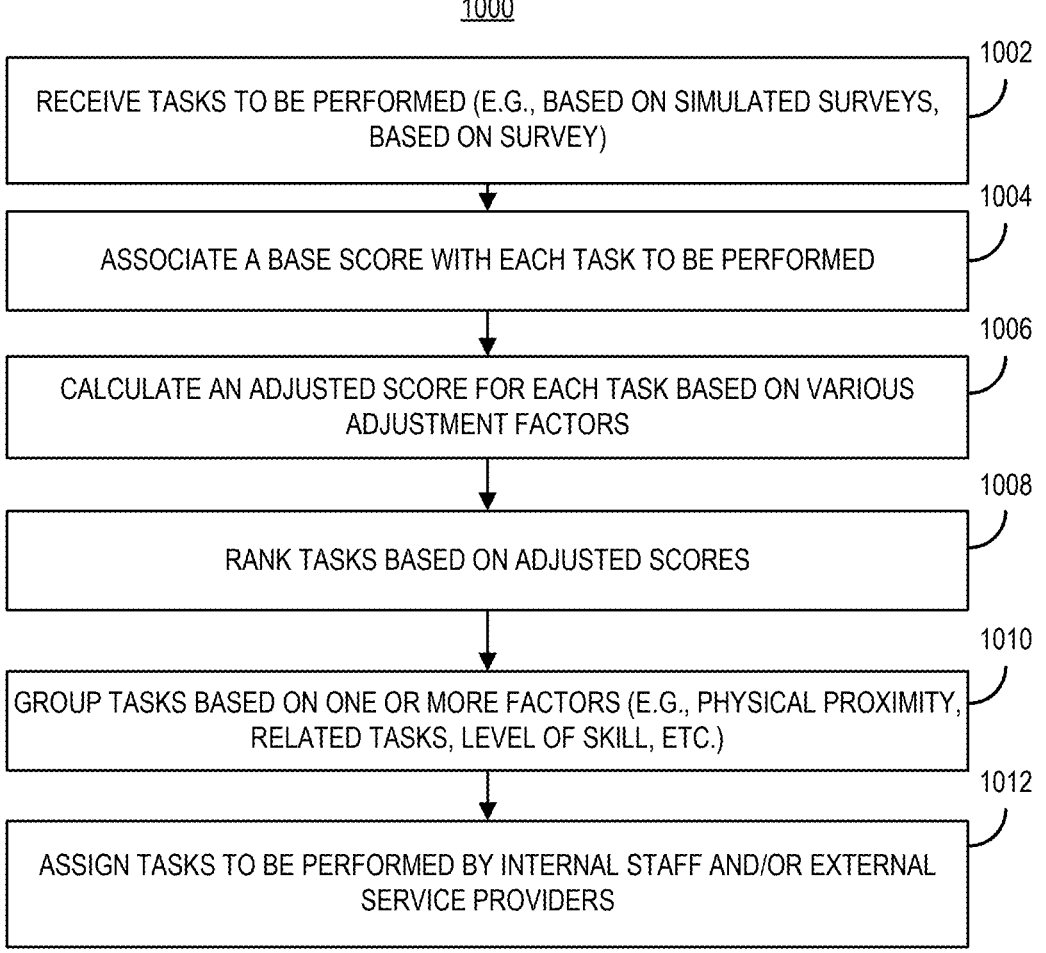

1000

RECEIVE TASKS TO BE PERFORMED (E.G., BASED ON SIMULATED SURVEYS, BASED ON SURVEY) — 1002

ASSOCIATE A BASE SCORE WITH EACH TASK TO BE PERFORMED — 1004

CALCULATE AN ADJUSTED SCORE FOR EACH TASK BASED ON VARIOUS ADJUSTMENT FACTORS — 1006

RANK TASKS BASED ON ADJUSTED SCORES — 1008

GROUP TASKS BASED ON ONE OR MORE FACTORS (E.G., PHYSICAL PROXIMITY, RELATED TASKS, LEVEL OF SKILL, ETC.) — 1010

ASSIGN TASKS TO BE PERFORMED BY INTERNAL STAFF AND/OR EXTERNAL SERVICE PROVIDERS — 1012

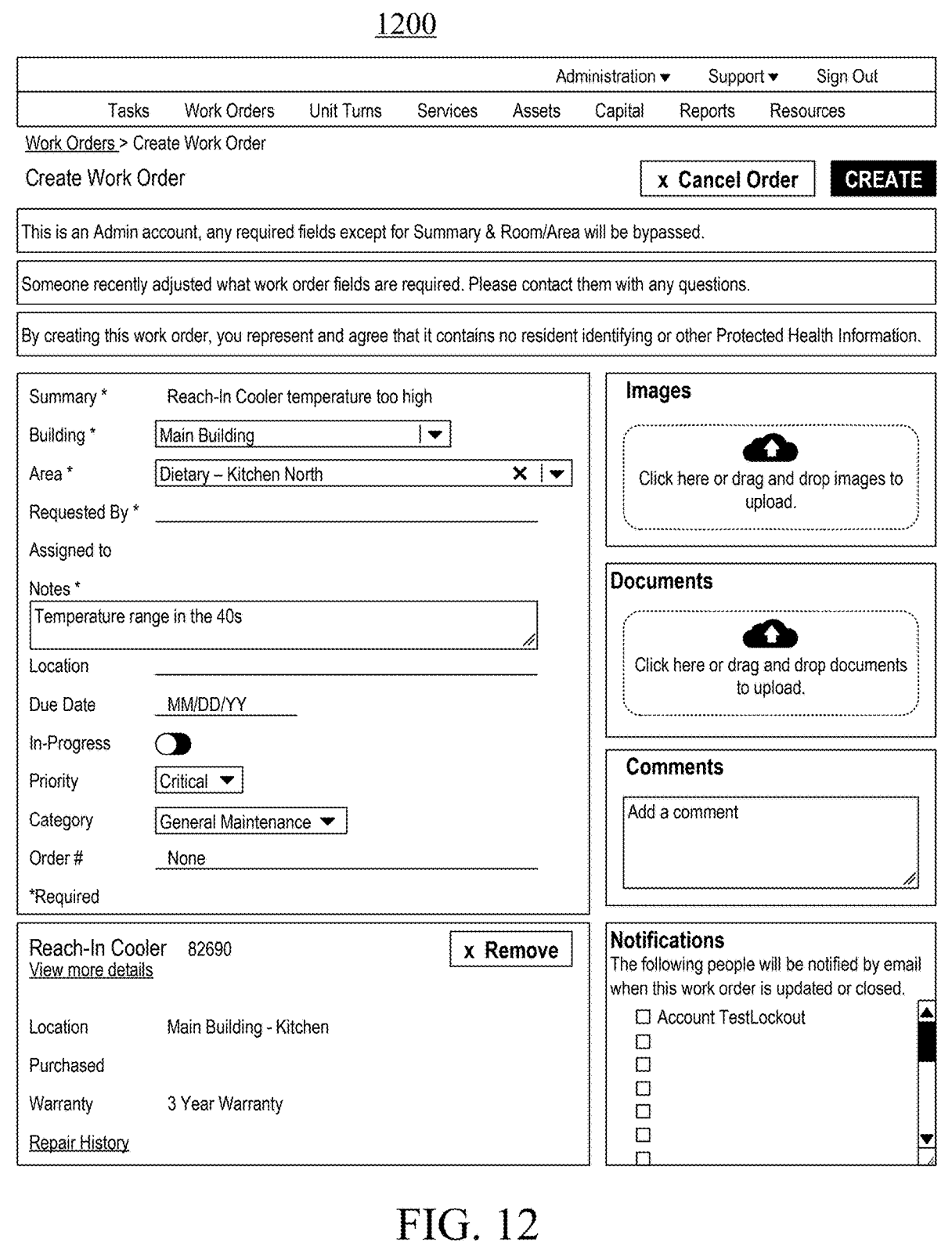

Administration ▾     Support ▾     Sign Out

| Tasks | Work Orders | Unit Turns | Services | Assets | Capital | Reports | Resources |

Work Orders > Create Work Order

Create Work Order                                    [ x Cancel Order ]    [ CREATE ]

This is an Admin account, any required fields except for Summary & Room/Area will be bypassed.

Someone recently adjusted what work order fields are required. Please contact them with any questions.

By creating this work order, you represent and agree that it contains no resident identifying or other Protected Health Information.

Summary *        Reach-In Cooler temperature too high

Building *       [ Main Building                    ▾ ]

Area *           [ Dietary – Kitchen North      ✕  ▾ ]

Requested By *   _____

Assigned to

Notes *
[ Temperature range in the 40s                      ]

Location         _____

Due Date         MM/DD/YY

In-Progress      ◯

Priority         [ Critical ▾ ]

Category         [ General Maintenance ▾ ]

Order #          None

*Required

Images

☁
Click here or drag and drop images to upload.

Documents

☁
Click here or drag and drop documents to upload.

Comments

[ Add a comment                                     ]

Reach-In Cooler    82690                  [ x Remove ]
View more details

Location      Main Building - Kitchen

Purchased

Warranty      3 Year Warranty

Repair History

Notifications
The following people will be notified by email when this work order is updated or closed.
☐ Account TestLockout
☐
☐
☐
☐
☐
☐

FIG. 12

1300

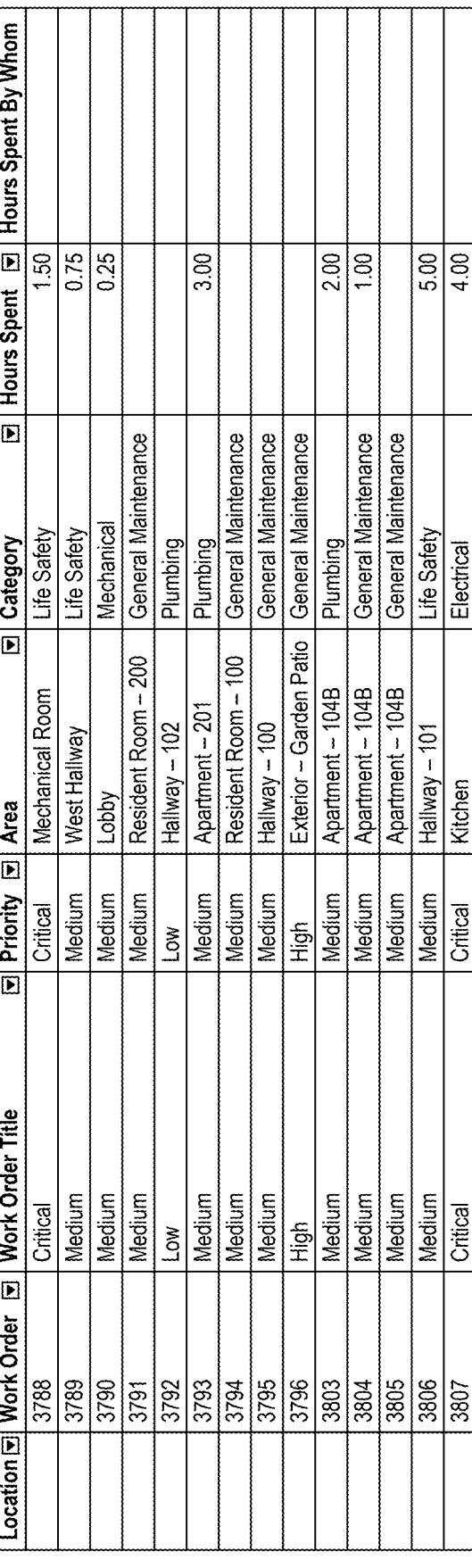

| Location | Work Order | Work Order Title | Priority | Area | Category | Hours Spent | Hours Spent By Whom |
|---|---|---|---|---|---|---|---|
| | 3788 | Critical | Critical | Mechanical Room | Life Safety | 1.50 | |
| | 3789 | Medium | Medium | West Hallway | Life Safety | 0.75 | |
| | 3790 | Medium | Medium | Lobby | Mechanical | 0.25 | |
| | 3791 | Medium | Medium | Resident Room – 200 | General Maintenance | | |
| | 3792 | Low | Low | Hallway – 102 | Plumbing | | |
| | 3793 | Medium | Medium | Apartment – 201 | Plumbing | 3.00 | |
| | 3794 | Medium | Medium | Resident Room – 100 | General Maintenance | | |
| | 3795 | Medium | Medium | Hallway – 100 | General Maintenance | | |
| | 3796 | High | High | Exterior – Garden Patio | General Maintenance | | |
| | 3803 | Medium | Medium | Apartment – 104B | Plumbing | 2.00 | |
| | 3804 | Medium | Medium | Apartment – 104B | General Maintenance | 1.00 | |
| | 3805 | Medium | Medium | Apartment – 104B | General Maintenance | | |
| | 3806 | Medium | Medium | Hallway – 101 | Life Safety | 5.00 | |
| | 3807 | Critical | Critical | Kitchen | Electrical | 4.00 | |

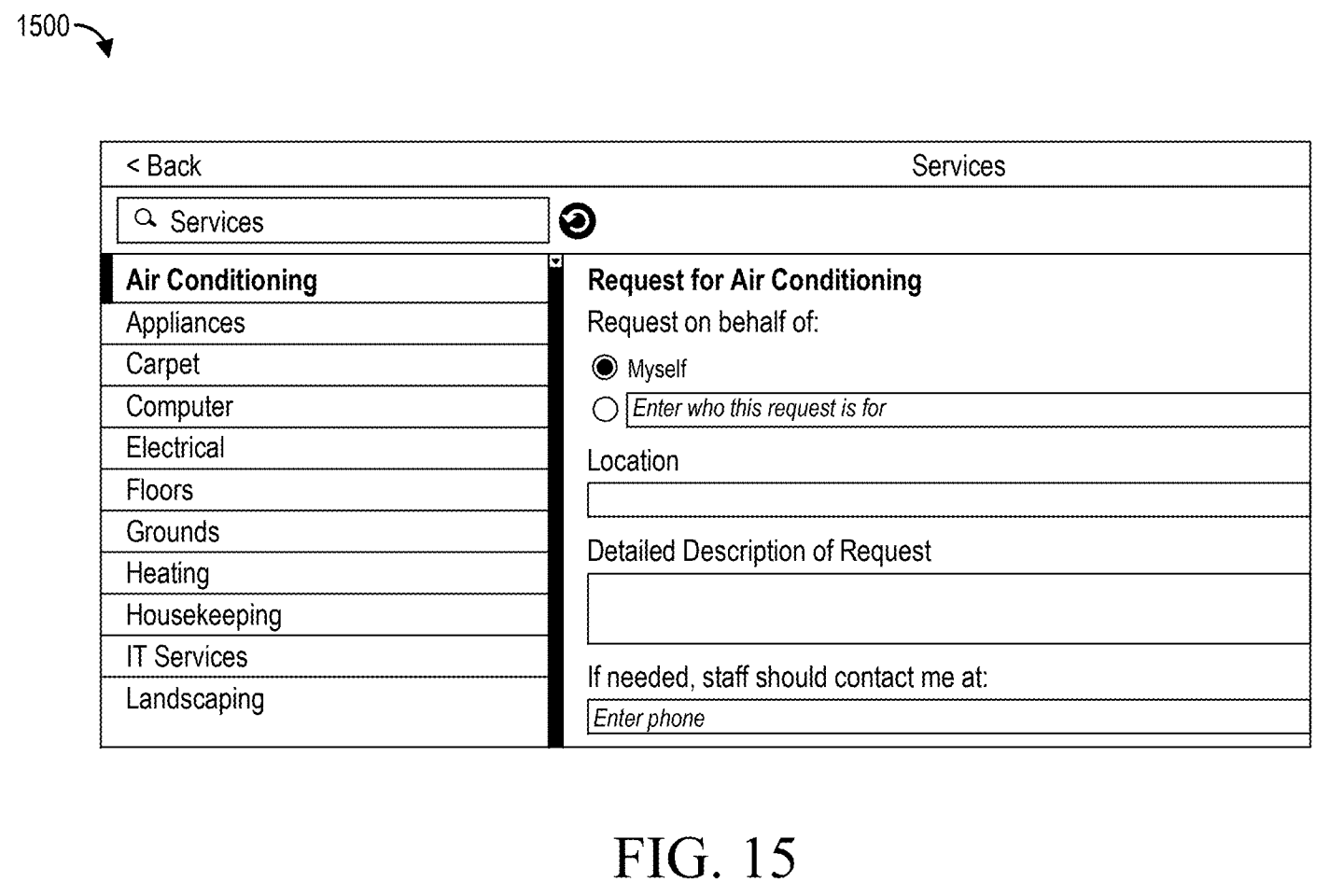

< Back    Services

🔍 Services    ↻

Air Conditioning    Request for Air Conditioning

Appliances    Request on behalf of:

Carpet    ● Myself

Computer    ○ [Enter who this request is for]

Electrical    Location

Floors    [                    ]

Grounds    Detailed Description of Request

Heating    [                    ]

Housekeeping

IT Services    If needed, staff should contact me at:

Landscaping    [Enter phone]

FIG. 15

1600

| Summary | Description | Priority | Area Name | Location | Category | Requested By | Status | Open Date | Closed Date | Closed By | Duration | Duration (HH:MM) | Initiated By |
|---|---|---|---|---|---|---|---|---|---|---|---|---|---|
| No Flushing on Toilet on Master Bath | No Flushing on Toilet on Master Bath | High | | Master Bath | Cleaning | Resident | Cancelled | 10/27/21 1:04 PM | 10/27/21 1:05 PM | Sentrics Test | 01m | 0.02 | Sentrics Integration |
| No Flushing on Toilet on Master Bath | No Flushing on Toilet on Master Bath | High | Master Bath | Master Bath | Cleaning | Resident | Cancelled | 10/27/21 1:05 PM | 10/27/21 2:46 PM | Sentrics Test | 1h 41m | 1.68 | Sentrics Integration |
| No Flushing on Toilet on Master Bath | No Flushing on Toilet on Master Bath | High | | Master Bath | Cleaning | Resident | Cancelled | 10/27/21 11:41 AM | 10/27/21 1:03 PM | Sentrics Test | 1h 22m | 1.37 | Sentrics Integration |
| No Flushing on Toilet on Master Bath | No Flushing on Toilet on Master Bath | High | | Master Bath | Cleaning | Resident | Cancelled | 10/27/21 11:43 AM | 10/27/21 1:03 PM | Sentrics Test | 1h 20m | 1.33 | Sentrics Integration |
| No Flushing on Toilet on Master Bath | No Flushing on Toilet on Master Bath | High | | Master Bath | Cleaning | Resident | Cancelled | 10/27/21 11:45 AM | 10/27/21 1:03 PM | Sentrics Test | 1h 18m | 1.30 | Sentrics Integration |
| No Flushing on Toilet on Master Bath | No Flushing on Toilet on Master Bath | High | | Master Bath | Cleaning | Resident | Cancelled | 10/27/21 11:49 AM | 10/27/21 1:03 PM | Sentrics Test | 1h 14m | 1.23 | Sentrics Integration |
| No Flushing on Toilet on Master Bath | No Flushing on Toilet on Master Bath | High | | Master Bath | Cleaning | Resident | Cancelled | 10/27/21 11:50 AM | 10/27/21 1:03 PM | Sentrics Test | 1h 13m | 1.22 | Sentrics Integration |
| No Flushing on Toilet on Master Bath | No Flushing on Toilet on Master Bath | High | | Master Bath | Cleaning | Resident | Cancelled | 10/27/21 11:50 AM | 10/27/21 1:03 PM | Sentrics Test | 1h 13m | 1.22 | Sentrics Integration |
| No Flushing on Toilet on Master Bath | No Flushing on Toilet on Master Bath | High | | Master Bath | Cleaning | Resident | Cancelled | 10/27/21 11:53 AM | 10/27/21 1:03 PM | Sentrics Test | 1h 10m | 1.17 | Sentrics Integration |
| No Flushing on Toilet on Master Bath | No Flushing on Toilet on Master Bath | High | | Master Bath | Cleaning | Resident | Cancelled | 10/27/21 11:53 AM | 10/27/21 1:03 PM | Sentrics Test | 1h 10m | 1.17 | Sentrics Integration |
| Jamming door | Staff is allowed access when resident is absent | High | Other | My apartment | | Bernard Bently | Completed | 07/06/21 6:09 AM | 07/14/21 5:13 AM | Cubigo Test | 7d 23h 04m | 191.07 | Cubigo Integration |
| Jamming door | Staff is allowed access when resident is absent | High | Other | My apartment | | Bernard Bently | Completed | 07/06/21 6:06 AM | 07/14/21 5:06 AM | Cubigo Test | 7d 23h 00m | 191.00 | Cubigo Integration |
| Jamming door | Staff is allowed access when resident is absent | High | Other | My apartment | | Bernard Bently | Completed | 07/06/21 6:08 AM | 07/14/21 5:17 AM | Cubigo Test | 7d 23h 09m | 191.15 | Cubigo Integration |
| Request for Plumbing Service | Requesting plumbing service to look into leaky faucets and pipes, water heater issues, low water pressure, and a running toilet. Requester details... | Medium | Kitchen | 100 | Plumbing | Resident | Completed | 03/10/22 2:34 PM | 03/16/22 12:09 PM | Touchtown Test | 5d 20h 35m | 140.58 | Touchtown Integration |

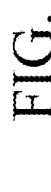

Work Orders > Infrastructure Device Lost Communication – Clear Router Lost Communication

| OPEN | Work Order #5641  created on Aug. 2, 2022 | x Cancel Order | SAVE | COMPLETE |

This is an Admin account, any required fields except for Summary & Room/Area will be bypassed.

Please ensure all *Required fields are complete to submit your Work Order

By editing this work order, you represent and agree that it contains no resident identifying or other Protected Health Information.

Summary *    Infrastructure Device Lost Communication – Clear Router...

Area *    | IT Room    ✕ |

Requested By *    Resident

Assigned to    | Nobody ▶ |

Notes

Clear Router Clear Router (1) at IT Room is offline since 2022-08-02 13:39:29

Location    Central Hall, Central Hall, Central Hall, IT Room

Images

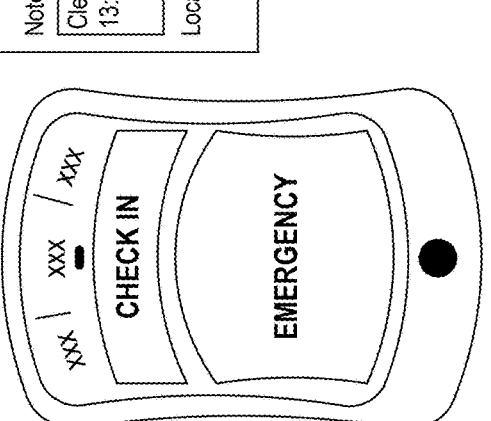

Click here or drag and drop images to upload.

Comments

Clear Router Lost Communication

1702

xxx / xxx / xxx

CHECK IN

EMERGENCY

| Work Order # | Summary | Description | Priority | Area Type | Area Name | Location | Category | Status | Open Date | Closed Date | Duration | Duration (HH:MM) | Initiated By |
|---|---|---|---|---|---|---|---|---|---|---|---|---|---|
| 5350 | Nurse Call Maintenance Alert \| AIO Station Kitchen \| Low Battery | Event Reason: LowBattery Device: AIO Station Serial# 0003F40A-43F6-1900-0000-000100000000 Located: Kitchen System: 00:03:F4:0A:43:F6 | Medium | Apartment | Kitchen | Building: Main \| Location: Kitchen | LowBattery | Completed | 11/18/21 2:18 PM | 02/03/22 7:58 PM | 77d 5h 40m | 1853.67 | Pal Care Integration |
| 5417 | Nurse Call Maintenance Alert \| AIO Station Kitchen \| Low Battery | Event Reason: LowBattery Device: AIO Station Serial# 14 33346 Located: Kitchen System: 00:03:F4:0A:43:F6 | Medium | Apartment | 112 | Building: Main \| Location: Kitchen | | Completed | 02/08/22 5:03 PM | 06/23/22 9:25 AM | 134d 15h 22m | 3231.37 | Pal Care Integration |
| 5421 | Nurse Call Maintenance Alert \| AIO Station Kitchen \| Low Battery | Event Reason: LowBattery Device: AIO Station Serial# 0003F40A-43F6-1900-0000-063000000000 Located: Kitchen System: 00:03:F4:0A:43:F6 | Medium | Common Area | Big Kitchen | Building: Main \| Location: Kitchen | LowBattery | Completed | 02/10/22 10:33 AM | 02/22/22 10:18 AM | 11d 23h 45m | 287.75 | Pal Care Integration |
| 5253 | Nurse Call Maintenance Alert \| Push Cord Momentary – Fixed Room 1 | Event Message: Device: Push Cord Momentary – Fixed \| SN# 6828802 Located: Room 1 System: 5C:FF:35:DE:73:08 | Medium | | | Building: \| Location: Room 1 | LowBattery | Cancelled | 11/17/21 11:01 AM | 11/17/21 11:15 AM | 14m | 0.23 | Pal Care Integration |
| 5255 | Nurse Call Maintenance Alert \| Room 1 \| LowBattery | Event Message: Device: Event Reason: LowBattery | Medium | Apartment | 105 | Building: \| Location: Room 1 | LowBattery | Completed | 11/17/21 1:55 PM | 11/18/21 11:05 AM | 21h 10m | 21.17 | Pal Care Integration |

FIG. 18

Work History Report

1900

| Due Date Timeframe: | Last 12 Months ∨ |
| Category: | Water Headers/Boilers (Over 200,000 BTU  ∨ |
| Completion Status: | All  ∨ |
| Documentation Status: | All  ∨ |
| Task Type: | All  ∨ |
| Assigned To: | All  ∨ |

Run Report

| Due Date | Category | Task Description | Task Description |
|---|---|---|---|
| 12/31/2022 | Water Heaters/Boilers (Over 200,000 BTU) | Boilers: Flush to remove impurities, test pressure relief valve | Marked done on-time on 12/19/2022. View Details  Edit |
| 11/30/2022 | Water Heaters/Boilers (Over 200,000 BTU) | Boilers: Flush to remove impurities, test pressure relief valve | Marked done on-time on 11/30/2022. View Details  Edit |
| 10/31/2022 | Water Heaters/Boilers (Over 200,000 BTU) | Boilers: Flush to remove impurities, test pressure relief valve | Marked done on-time on 10/31/2022. View Details  Edit |
| 9/30/2022 | Water Heaters/Boilers (Over 200,000 BTU) | Boilers: Flush to remove impurities, test pressure relief valve | Marked done on-time on 9/27/2022. View Details  Edit |
| 8/31/2022 | Water Heaters/Boilers (Over 200,000 BTU) | Boilers: Flush to remove impurities, test pressure relief valve | Marked done on-time on 8/30/2022. View Details  Edit |
| 7/31/2022 | Water Heaters/Boilers (Over 200,000 BTU) | Boilers: Flush to remove impurities, test pressure relief valve | Marked done on-time on 7/28/2022. View Details  Edit |
| 6/30/2022 | Water Heaters/Boilers (Over 200,000 BTU) | Boilers: Flush to remove impurities, test pressure relief valve | Marked done on-time on 6/23/2022. View Details  Edit |
| 5/31/2022 | Water Heaters/Boilers (Over 200,000 BTU) | Boilers: Flush to remove impurities, test pressure relief valve | Marked done on-time on 5/29/2022. View Details  Edit |
| 4/30/2022 | Water Heaters/Boilers (Over 200,000 BTU) | Boilers: Flush to remove impurities, test pressure relief valve | Marked done on-time on 4/28/2022. View Details  Edit |
| 3/31/2022 | Water Heaters/Boilers (Over 200,000 BTU) | Boilers: Flush to remove impurities, test pressure relief valve | Marked done on-time on 3/30/2022. View Details  Edit |
| 2/28/2022 | Water Heaters/Boilers (Over 200,000 BTU) | Boilers: Flush to remove impurities, test pressure relief valve | Marked done on-time on 2/24/2022. View Details  Edit |
| 1/31/2022 | Water Heaters/Boilers (Over 200,000 BTU) | Boilers: Flush to remove impurities, test pressure relief valve | Marked done on-time on 1/28/2022. View Details  Edit |
| 12/31/2021 | Water Heaters/Boilers (Over 200,000 BTU) | Boilers: Flush to remove impurities, test pressure relief valve | Marked done on-time on 1/3/2022. View Details  Edit |

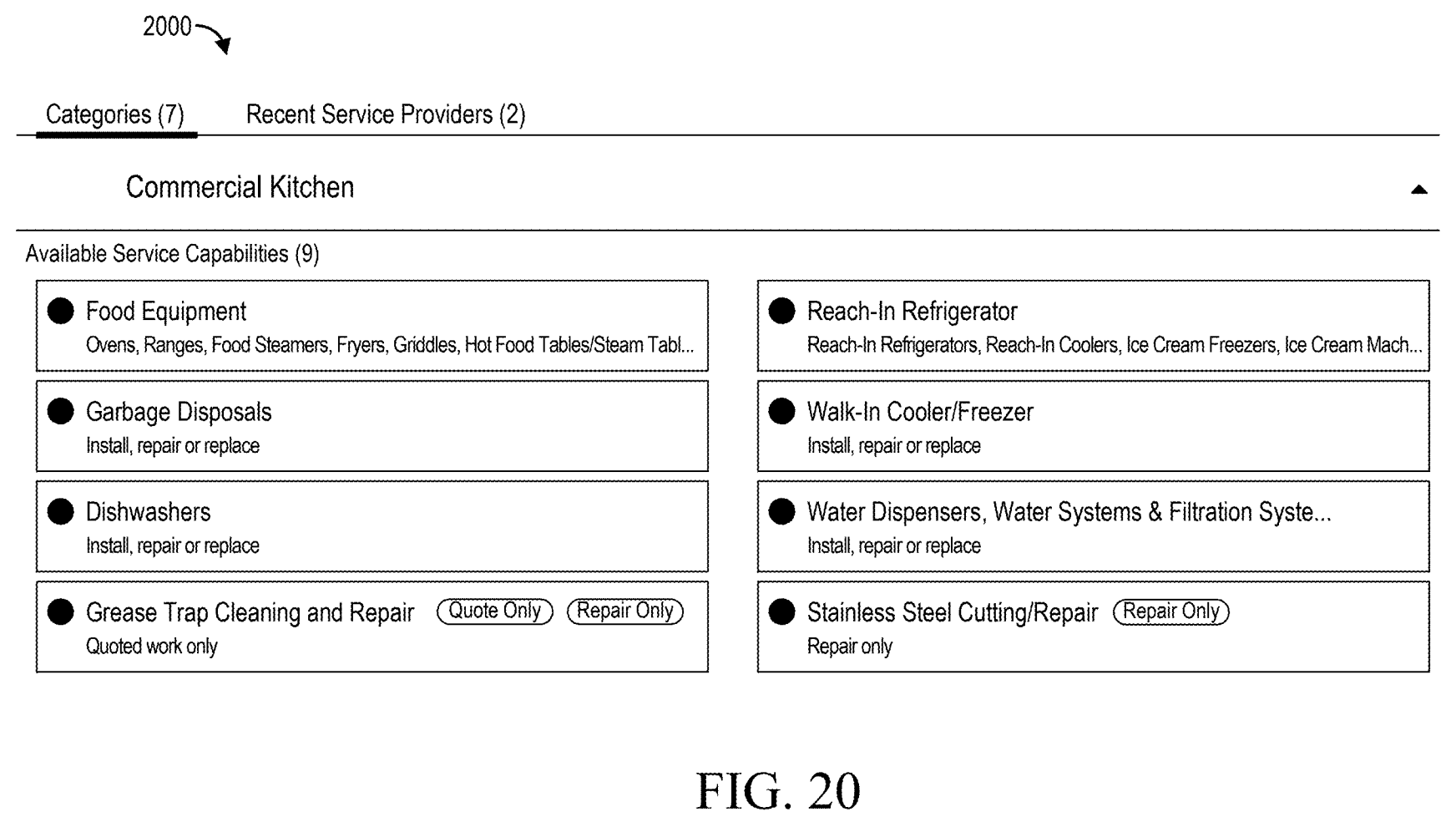

Categories (7)     Recent Service Providers (2)

Commercial Kitchen

Available Service Capabilities (9)

● Food Equipment
Ovens, Ranges, Food Steamers, Fryers, Griddles, Hot Food Tables/Steam Tabl…

● Garbage Disposals
Install, repair or replace

● Dishwashers
Install, repair or replace

● Grease Trap Cleaning and Repair (Quote Only) (Repair Only)
Quoted work only ● Reach-In Refrigerator
Reach-In Refrigerators, Reach-In Coolers, Ice Cream Freezers, Ice Cream Mach…

● Walk-In Cooler/Freezer
Install, repair or replace

● Water Dispensers, Water Systems & Filtration Syste…
Install, repair or replace ● Stainless Steel Cutting/Repair (Repair Only)
Repair only

FIG. 20

Figure 21:
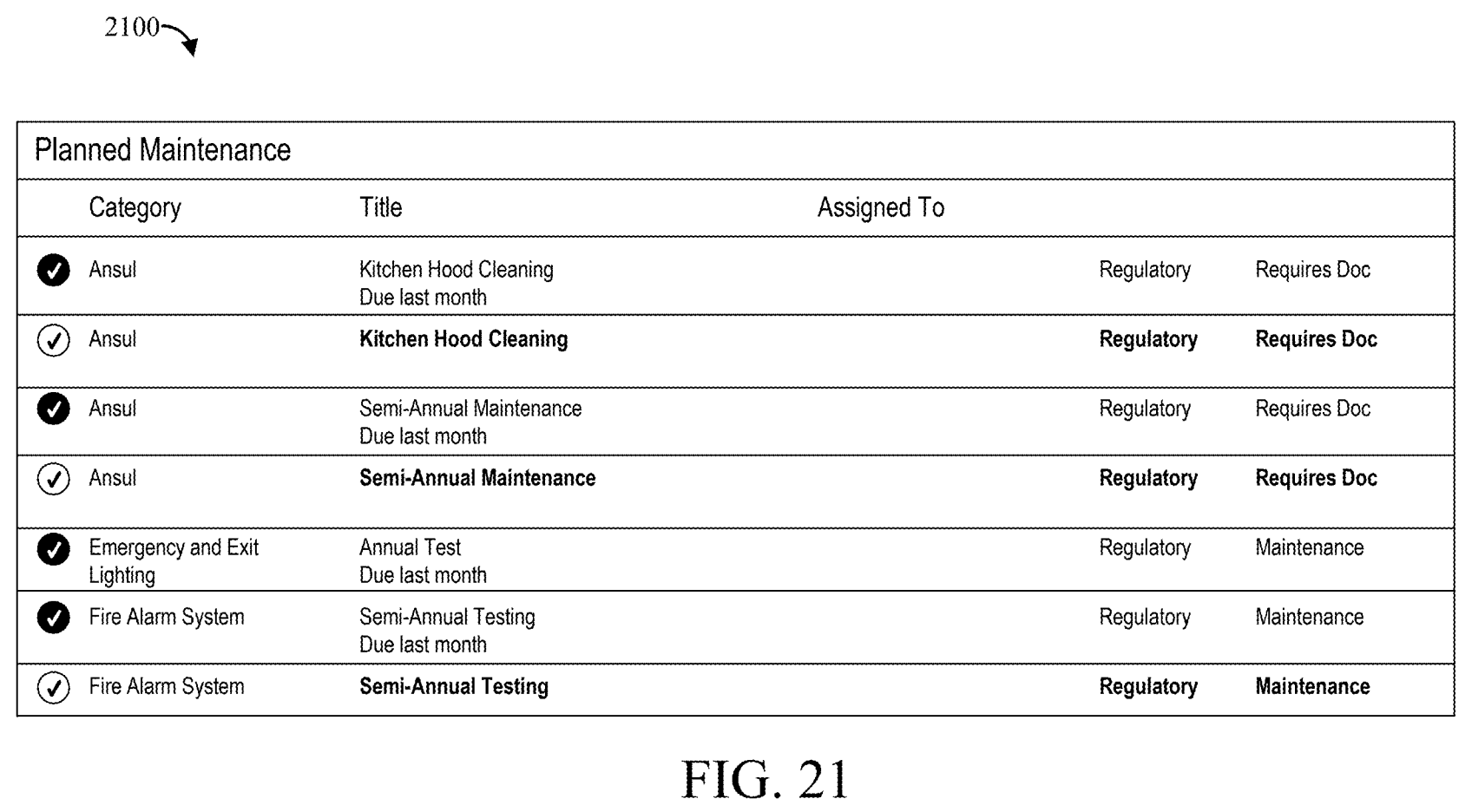

Planned Maintenance

2100

| Category | Title | Assigned To | | |
|----------|-------|-------------|---|---|
| Ansul | Kitchen Hood Cleaning<br>Due last month | | Regulatory | Requires Doc |
| Ansul | Kitchen Hood Cleaning | | Regulatory | Requires Doc |
| Ansul | Semi-Annual Maintenance<br>Due last month | | Regulatory | Requires Doc |
| Ansul | Semi-Annual Maintenance | | Regulatory | Requires Doc |
| Emergency and Exit Lighting | Annual Test<br>Due last month | | Regulatory | Maintenance |
| Fire Alarm System | Semi-Annual Testing<br>Due last month | | Regulatory | Maintenance |
| Fire Alarm System | Semi-Annual Testing | | Regulatory | Maintenance |

Figure 24:
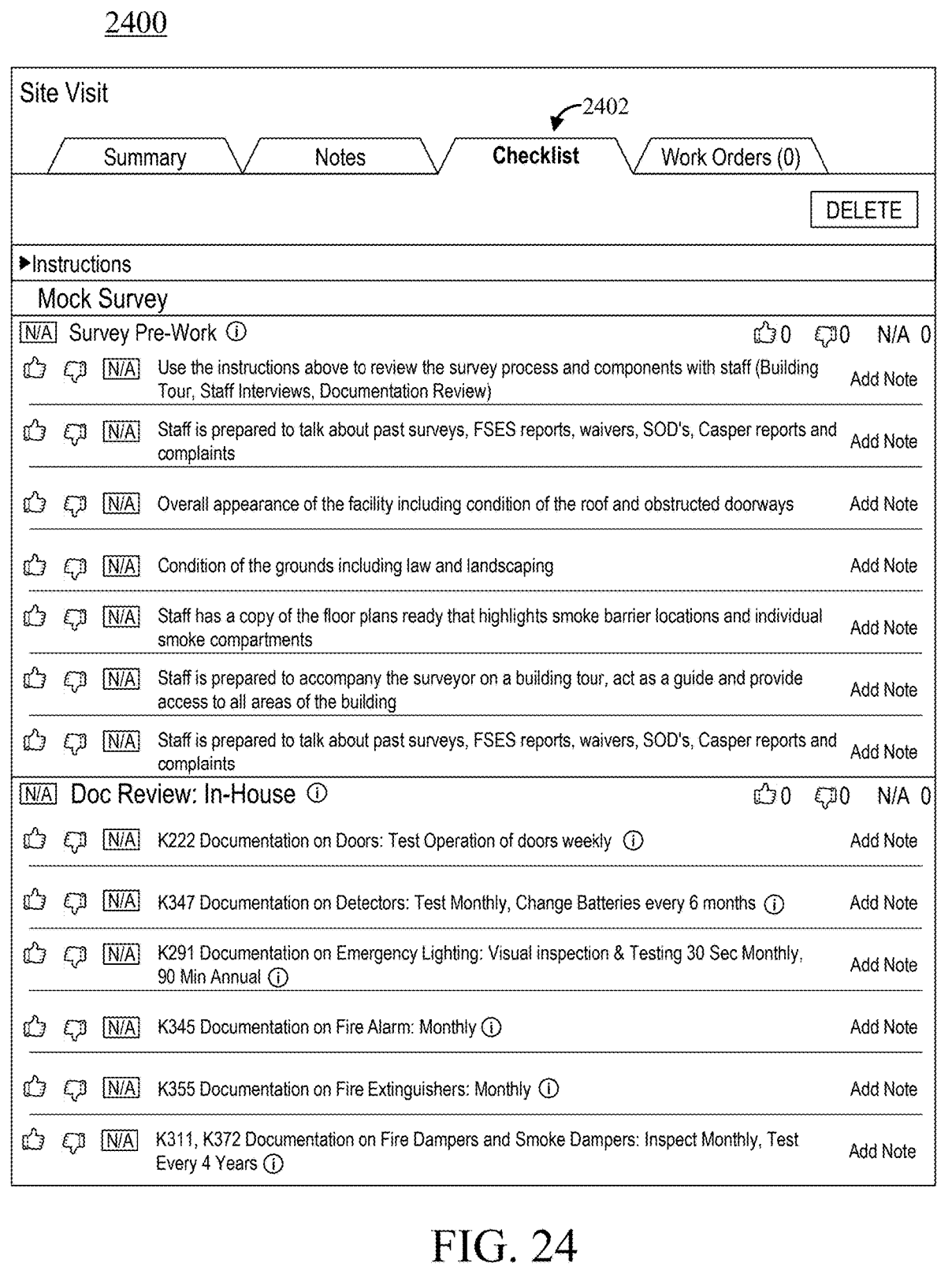

| Site Visit | | | |
|---|---|---|---|

2402

| Summary | Notes | Checklist | Work Orders (0) |
|---|---|---|---|

DELETE

▶Instructions

Mock Survey

| [N/A] Survey Pre-Work ⓘ | | 👍0  👎0  N/A 0 |
|---|---|---|

| 👍 | 👎 | [N/A] | Use the instructions above to review the survey process and components with staff (Building Tour, Staff Interviews, Documentation Review) | Add Note |
|---|---|---|---|---|
| 👍 | 👎 | [N/A] | Staff is prepared to talk about past surveys, FSES reports, waivers, SOD's, Casper reports and complaints | Add Note |
| 👍 | 👎 | [N/A] | Overall appearance of the facility including condition of the roof and obstructed doorways | Add Note |
| 👍 | 👎 | [N/A] | Condition of the grounds including law and landscaping | Add Note |
| 👍 | 👎 | [N/A] | Staff has a copy of the floor plans ready that highlights smoke barrier locations and individual smoke compartments | Add Note |
| 👍 | 👎 | [N/A] | Staff is prepared to accompany the surveyor on a building tour, act as a guide and provide access to all areas of the building | Add Note |
| 👍 | 👎 | [N/A] | Staff is prepared to talk about past surveys, FSES reports, waivers, SOD's, Casper reports and complaints | Add Note |

| [N/A] Doc Review: In-House ⓘ | | 👍0  👎0  N/A 0 |
|---|---|---|

| 👍 | 👎 | [N/A] | K222 Documentation on Doors: Test Operation of doors weekly ⓘ | Add Note |
|---|---|---|---|---|
| 👍 | 👎 | [N/A] | K347 Documentation on Detectors: Test Monthly, Change Batteries every 6 months ⓘ | Add Note |
| 👍 | 👎 | [N/A] | K291 Documentation on Emergency Lighting: Visual inspection & Testing 30 Sec Monthly, 90 Min Annual ⓘ | Add Note |
| 👍 | 👎 | [N/A] | K345 Documentation on Fire Alarm: Monthly ⓘ | Add Note |
| 👍 | 👎 | [N/A] | K355 Documentation on Fire Extinguishers: Monthly ⓘ | Add Note |
| 👍 | 👎 | [N/A] | K311, K372 Documentation on Fire Dampers and Smoke Dampers: Inspect Monthly, Test Every 4 Years ⓘ | Add Note |

Vertical Openings – Enclosure 2012 EXISTING Stairways, elevator shafts, light and ventilation shafts, chutes, and other vertical openings between floors are enclosed with construction having a fire resistance rating of at least 1-hour. An atrium may be used in accordance with 8.6. 19.3.1.1 through 19.3.1.6 If all vertical openings are properly enclosed with construction providing at least a 2 hour fire resistance rating.

2012 NEW

Stairways, elevator shafts, light and ventilation shafts, chutes, and other vertical openings between floors are enclosed with construction having a fire resistance rating of at least 2 hours connecting four or more stories. (1- hour for single story building and buildings up to three stories in height.) An atrium may be used in accordance with 8.6.7, 18.3.1 through 18.3.1.5 Subdivision of Building Spaces – Smoke Barrier Construction

2012 EXISTING

Smoke barriers shall be constructed to a ½ hour fire resistance rating per 8.5. Smoke barriers shall be permitted to terminate at an atrium wall. Smoke dampers are not required in duct penetrations in fully ducted HVAC systems where an approved sprinkler system is installed for smoke compartments adjacent to the smoke barrier. 19.3.7.3, 8.6.7.1(1) Describe any mechanical smoke control system in REMARKS.

2012 NEW

Smoke barriers shall be constructed to provide at least a 1 hour fire resistance rating and constructed in accordance with 8.5. Smoke barriers shall be permitted to terminate at an atrium wall. Smoke dampers are not required in duct penetrations of fully ducted HVAC systems. 18.3.7.3, 18.3.7.A, 18.3.7.5, 8.3 Describe any mechanical smoke control system in REMARKS.

  

Inspect Monthly, Test Every 4 Years     Add Note

FIG. 27

*LOGBOOK DOCUMENTATION*    <u>2800</u>

Emergency Generators: Test generator under load,
perform routine checks, create entry in logbook – Diesel
Marked done on-time on February 16, 2022

Reference Materials ▼

| |
|---|
| <u>NFPA 110 – Generators</u> |
| <u>In-house Inspections – Emergency Power Generators</u> |

Steps:

It is suggested that you review or watch the Masters Training video that accompanies this task. The video can be found under the 'Education' or 'Training' tab on your website. This video will assist in explaining how to perform this inspection. The link is also available here: <u>In-house Inspections – Emergency Power Generators</u>

In some areas, you may be required to check the ozone levels in your area before running your generator. Please verify if this is required with your Supervisor.

Notify facility of test

1. Ensure critical computer and healthcare systems have back-up power sources
2. Based on the time needed to transfer power, make nursing staff aware of the anticipated power outage

Execute prestart checklist

1. Refer to your generator's Owner's Manual for specifics on your model's requirements
2. Check engine oil level (do not overfill)
3. Check coolant level (caution: do not check while engine is hot)
4. Check all hoses, fan belts and mechanical components of engine
5. Inspect fuel system
   - Check fuel level
   - Check for fuel leaks
   - Ensure fuel fittings are tight
6. Inspect exhaust system
   - Ensure exhaust systems is tight
   - Check for combustible materials near the system
   - Ensure that exhaust is discharged away from buildings
7. Inspect battery system
   - Test and record electrolyte specific gravity
   - Battery conductance tests are allowed when applicable or warranted
8. Check and change air filter as necessary

Test generator under load

1. Diesel generators (compression ignition) must run under load for 30 minutes. This does not include the necessary required time for engine arm up and cool down. Once the required exhaust temperature is reached and maintained, then the 30 minute run timj can begin.
2. Refer to your generator's Owner's Manual for specifics on your model's requirements
3. Ensure maintenance personnel have the proper keys for panel boxes, etc.
4. Using handheld radios, have second maintenance staff member walk the interior of the building to verify power transfer
   - Verify that the emergency lighting came on for the 30 second monthly test that is required
   - Verify that the annunciator sounded off as required (K916)
5. Monitor or engage transfer switch
   - For automatic transfer switch: note the time it takes to switch to emergency power
   - For manual transfer switch: engage the transfer switch for emergency power
6. Disconnect the power to the switch then make sure the switch lever can be moved from the "off" to "on" position easily
7. Ensure exhaust / louver system is working correctly
8. Verify that engine RPMs stabilize and engine runs smoothly
9. Allow generator to operate for 30 minutes (under at least 30 percent of the rated capacity)
10. Check gauges and record required information
11. Monitor or disengage transfer switch
    - For automatic transfer switch: note the time it takes to switch back to normal power
    - For manual transfer switch: disengage the transfer switch back to normal power
12. Verify that the engine continues to run in a cool-down mode (it will shut down by itself)
13. Verify that mode selector switch (Run/Off/Auto) is in the "auto" position

Create entry in logbook

1. Note date, time, and engine hours for the inspection
2. Note any discrepancies and Document any other required checks

FIG. 28

2900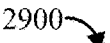

| Serial # | Building | Location | Make & Model | Description |
|---|---|---|---|---|
| 21356 | Main Building | 105 | Generac CT100514 | Emergency Power Generator |

| | |
|---|---|
| Date: | 2/19/2022 |
| Start Time: | 10 |
| End Time: | 11 |
| Hour Meter Reading (Start): | 26 hours |
| Hour Meter Reading (End): | 26 hours |
| Transfer Time to Emergency Power: | 26 Seconds |
| Retransfer delay time: | 26 Seconds |
| *Transfer time must be under 10 seconds | |
| Run Time – does not include warm up or cool down time: | 2 minutes |
| Load: | 26 % |
| Battery Specific Gravity: | 26 |
| (conductivity on maintenance free batteries) | |
| Engine Oil Pressure: | 26 psi |
| Water Temperature: | 26F |
| Inspect Belts: | NA |
| Inspect Hoses: | NA |
| Voltage Output – Phase 1: | 26 V |
| Voltage Output – Phase 2: | 26 V |
| Voltage Output – Phase 3: | 16 V |
| Amperage Output – Phase 1: | 26 amps |
| Amperage Output – Phase 2: | 26 amps |
| Amperage Output – Phase 3: | 26 amps |
| Hertz/Cycles: | 26 Hz |
| Battery-Powered Lighting On-Site?: | Yes |
| Cool Down Time: | 2 minutes |
| Comments: | 1 |

Export to Excel     Print View

| Due Date | Category | Task Description | Task Completion | | |
|---|---|---|---|---|---|
| 12/31/2022 | Fire Drills | Fire Drills: Perform a fire drill during 3rd shift – (Upload copy of drill with signature sheet when complete) 12 | Skipped on 12/14/2022. | Upload Document | View Details |
| 11/30/2022 | Fire Drills | Fire Drills: Perform a fire drill during 2nd shift – (Upload copy of drill with signature sheet when complete) 12 | Marked done on-time on 11/28/2022. | Manage Documents | View Details   Edit |
| 10/31/2022 | Fire Drills | Fire Drills: Perform a fire drill during 1st shift – (Upload copy of drill with signature sheet when complete) 12 | Marked done on-time on 10/26/2022. | Manage Documents | View Details   Edit |
| 9/30/2022 | Fire Drills | Fire Drills: Perform a fire drill during 3rd shift – (Upload copy of drill with signature sheet when complete) 12 | Skipped on 9/29/2022. | Upload Document | View Details   Edit |
| 8/31/2022 | Fire Drills | Fire Drills: Perform a fire drill during 2nd shift – (Upload copy of drill with signature sheet when complete) 12 | Skipped on 8/25/2022. | Upload Document | View Details   Edit |
| 7/31/2022 | Fire Drills | Fire Drills: Perform a fire drill during 1st shift – (Upload copy of drill with signature sheet when complete) 12 | Skipped on 7/31/2022. | Upload Document | View Details   Edit |

Figure 32:
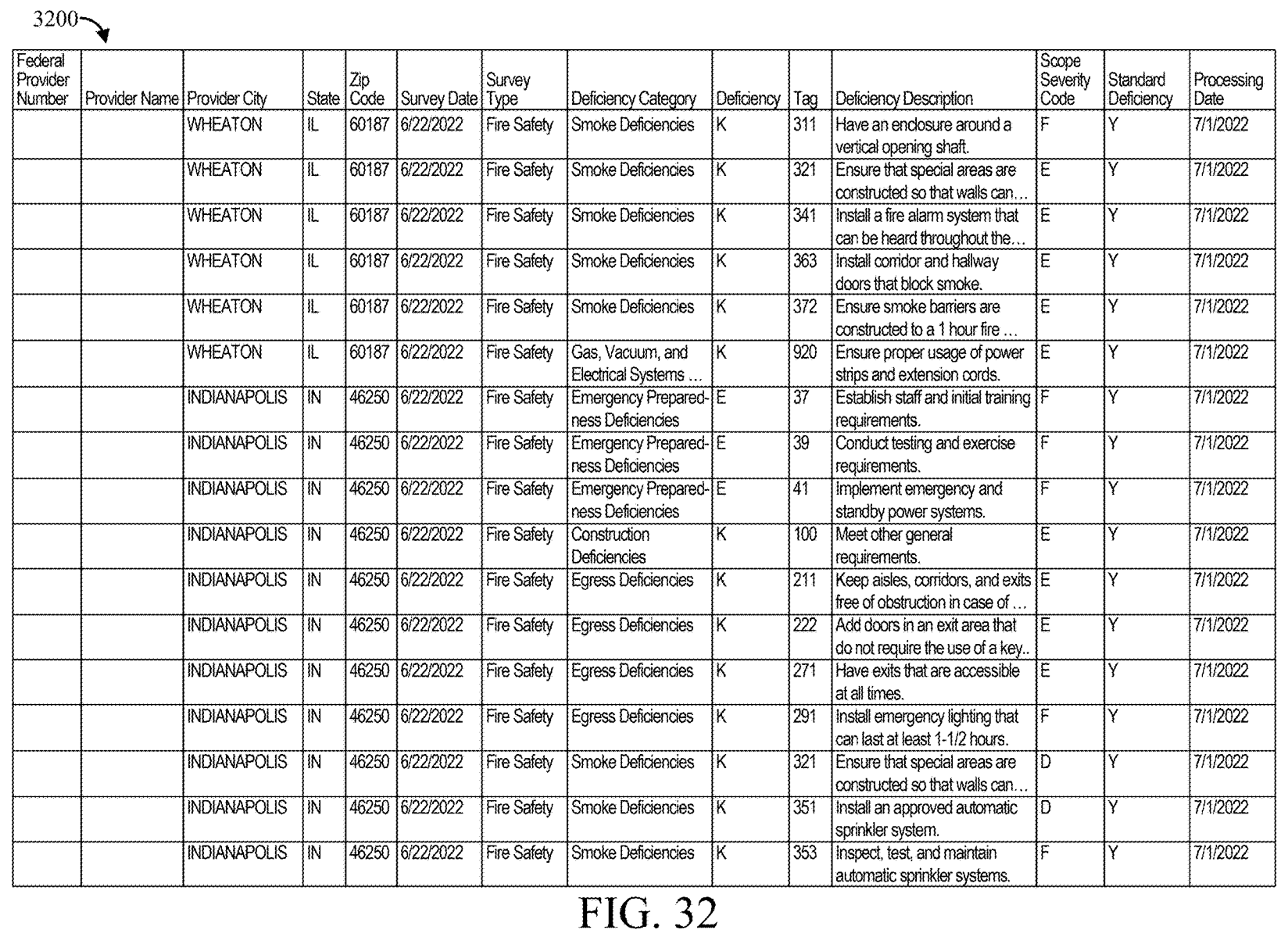

| Federal Provider Number | Provider Name | Provider City | State | Zip Code | Survey Date | Survey Type | Deficiency Category | Deficiency | Tag | Deficiency Description | Scope Severity Code | Standard Deficiency | Processing Date |
|---|---|---|---|---|---|---|---|---|---|---|---|---|---|
| | | WHEATON | IL | 60187 | 6/22/2022 | Fire Safety | Smoke Deficiencies | K | 311 | Have an enclosure around a vertical opening shaft. | F | Y | 7/1/2022 |
| | | WHEATON | IL | 60187 | 6/22/2022 | Fire Safety | Smoke Deficiencies | K | 321 | Ensure that special areas are constructed so that walls can… | E | Y | 7/1/2022 |
| | | WHEATON | IL | 60187 | 6/22/2022 | Fire Safety | Smoke Deficiencies | K | 341 | Install a fire alarm system that can be heard throughout the… | E | Y | 7/1/2022 |
| | | WHEATON | IL | 60187 | 6/22/2022 | Fire Safety | Smoke Deficiencies | K | 363 | Install corridor and hallway doors that block smoke. | E | Y | 7/1/2022 |
| | | WHEATON | IL | 60187 | 6/22/2022 | Fire Safety | Smoke Deficiencies | K | 372 | Ensure smoke barriers are constructed to a 1 hour fire … | E | Y | 7/1/2022 |
| | | WHEATON | IL | 60187 | 6/22/2022 | Fire Safety | Gas, Vacuum, and Electrical Systems… | K | 920 | Ensure proper usage of power strips and extension cords. | E | Y | 7/1/2022 |
| | | INDIANAPOLIS | IN | 46250 | 6/22/2022 | Fire Safety | Emergency Prepared-ness Deficiencies | E | 37 | Establish staff and initial training requirements. | F | Y | 7/1/2022 |
| | | INDIANAPOLIS | IN | 46250 | 6/22/2022 | Fire Safety | Emergency Prepared-ness Deficiencies | E | 39 | Conduct testing and exercise requirements. | F | Y | 7/1/2022 |
| | | INDIANAPOLIS | IN | 46250 | 6/22/2022 | Fire Safety | Emergency Prepared-ness Deficiencies | E | 41 | Implement emergency and standby power systems. | F | Y | 7/1/2022 |
| | | INDIANAPOLIS | IN | 46250 | 6/22/2022 | Fire Safety | Construction Deficiencies | K | 100 | Meet other general requirements. | E | Y | 7/1/2022 |
| | | INDIANAPOLIS | IN | 46250 | 6/22/2022 | Fire Safety | Egress Deficiencies | K | 211 | Keep aisles, corridors, and exits free of obstruction in case of … | E | Y | 7/1/2022 |
| | | INDIANAPOLIS | IN | 46250 | 6/22/2022 | Fire Safety | Egress Deficiencies | K | 222 | Add doors in an exit area that do not require the use of a key. | E | Y | 7/1/2022 |
| | | INDIANAPOLIS | IN | 46250 | 6/22/2022 | Fire Safety | Egress Deficiencies | K | 271 | Have exits that are accessible at all times. | E | Y | 7/1/2022 |
| | | INDIANAPOLIS | IN | 46250 | 6/22/2022 | Fire Safety | Egress Deficiencies | K | 291 | Install emergency lighting that can last at least 1-1/2 hours. | F | Y | 7/1/2022 |
| | | INDIANAPOLIS | IN | 46250 | 6/22/2022 | Fire Safety | Smoke Deficiencies | K | 321 | Ensure that special areas are constructed so that walls can… | D | Y | 7/1/2022 |
| | | INDIANAPOLIS | IN | 46250 | 6/22/2022 | Fire Safety | Smoke Deficiencies | K | 351 | Install an approved automatic sprinkler system. | D | Y | 7/1/2022 |
| | | INDIANAPOLIS | IN | 46250 | 6/22/2022 | Fire Safety | Smoke Deficiencies | K | 353 | Inspect, test, and maintain automatic sprinkler systems. | F | Y | 7/1/2022 |

| (X4) ID PREFIX TAG | SUMMARY STATEMENT OF DEFICIENCIES (EACH DEFICIENCY MUST BE PRECEDED BY FULL REGULATORY OR LSC IDENTIFYING INFORMATION) | ID PREFIX TAG | PROVIDER'S PLAN OF CORRECTION (EACH CORRECTIVE ACTION SHOULD BE CROSS-REFERENCED TO THE APPROPRIATE DEFICIENCY) | (X5) COMPLETION DATE |
|---|---|---|---|---|
| | Based on observation, record review and interview, the facility failed to ensure 1 of 1 Post Indicator Valve (PIV) was maintained in accordance with NFPA 25, Standard for the Inspection, Testing, and Maintenance of Water-Based Fire Protection Systems. LSC Section 9.7.5 requires all automatic sprinkler and standpipe systems required by this Code shall be inspected, tested, and maintained in accordance with NFPA 25, Standard for the Inspection, Testing, and Maintenance of Water-Based Fire Protection Systems. NFPA 25, Section 13.3.2.2 states the valve inspection shall verify that the valves are in the following condition: (1) In the normal open or closed position (2) Sealed, locked, or supervised (3) Accessible (4) Provided with correct wrenches (5) Free from external leaks (6) Provided with applicable identification This deficient practice could affect all residents in the facility. | K 0353 | K-353<br><br>1. On 11/22/17 the Maintenance Director inspected and replaced the outside post indicator valve to ensure compliance.<br><br>2. An audit will be completed by 12/9/17 by Administrator to ensure the facility sprinkler systems meets the requirement of the federal life safety code.<br><br>3. The Maintenance Director will be re-educated by 12/7/17 by the Regional Maintenance Director related to the requirements of the facility sprinkler system per life safety code. | 12/10/2017 |

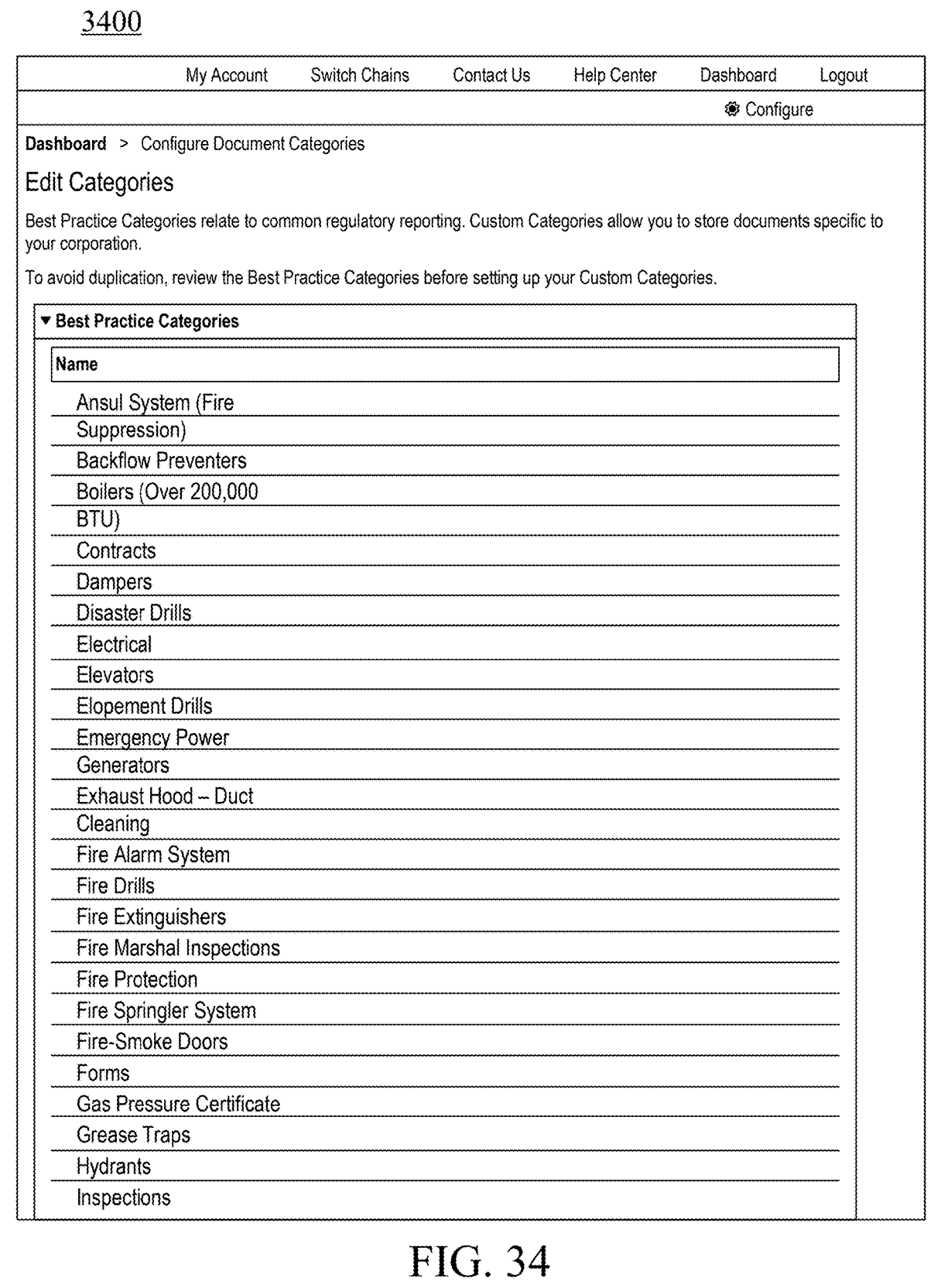

| My Account | Switch Chains | Contact Us | Help Center | Dashboard | Logout |

⚙ Configure

Dashboard > Configure Document Categories

Edit Categories

Best Practice Categories relate to common regulatory reporting. Custom Categories allow you to store documents specific to your corporation.

To avoid duplication, review the Best Practice Categories before setting up your Custom Categories.

▼ Best Practice Categories

| Name |
| --- |
| Ansul System (Fire Suppression) |
| Backflow Preventers |
| Boilers (Over 200,000 BTU) |
| Contracts |
| Dampers |
| Disaster Drills |
| Electrical |
| Elevators |
| Elopement Drills |
| Emergency Power Generators |
| Exhaust Hood – Duct Cleaning |
| Fire Alarm System |
| Fire Drills |
| Fire Extinguishers |
| Fire Marshal Inspections |
| Fire Protection |
| Fire Springler System |
| Fire-Smoke Doors |
| Forms |
| Gas Pressure Certificate |
| Grease Traps |
| Hydrants |
| Inspections |

FIG. 34

Figure 36:
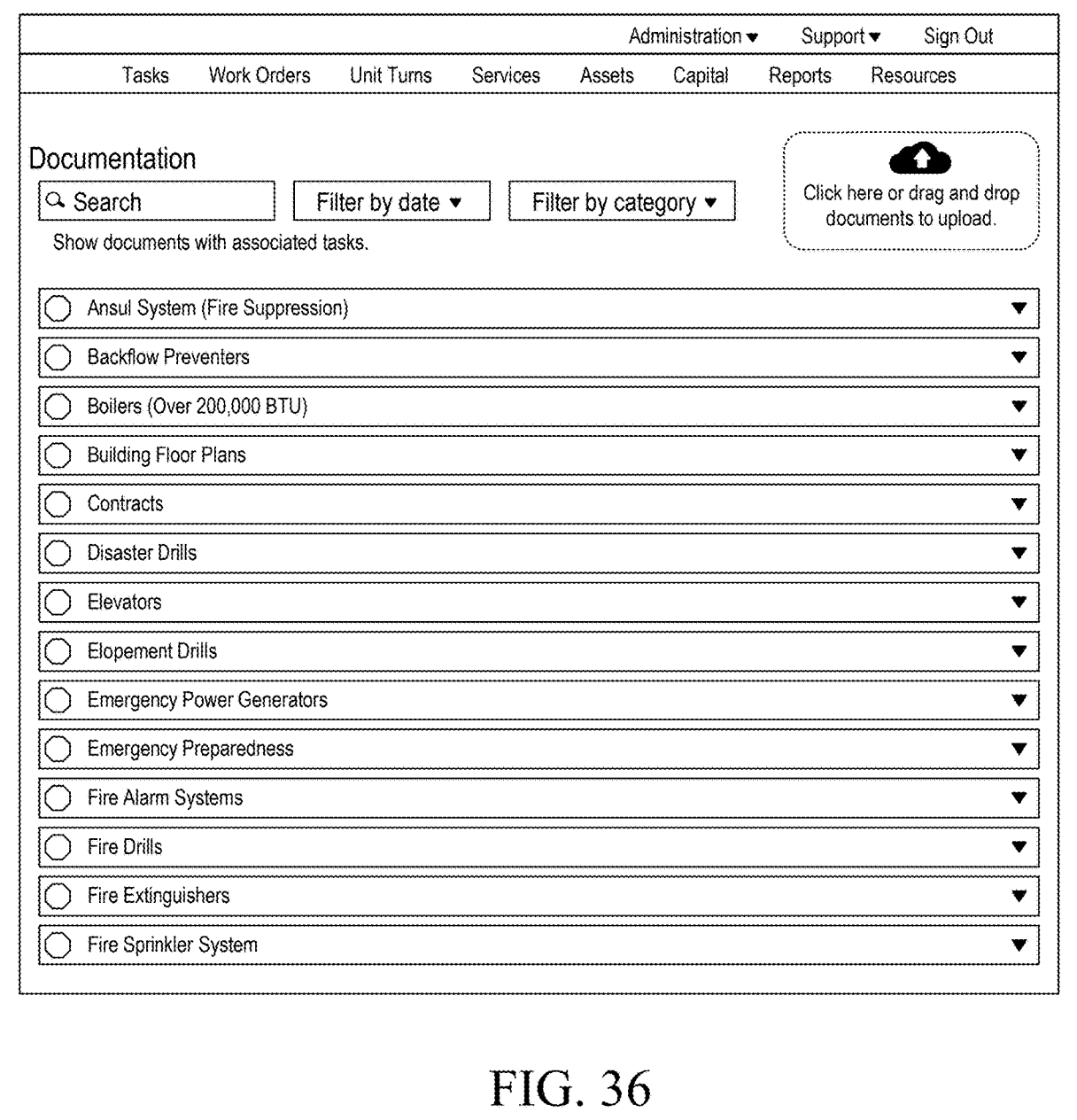

Administration ▼  Support ▼  Sign Out

Tasks  Work Orders  Unit Turns  Services  Assets  Capital  Reports  Resources

Documentation

🔍 Search  |  Filter by date ▼  |  Filter by category ▼

☁ Click here or drag and drop documents to upload.

Show documents with associated tasks.

○ Ansul System (Fire Suppression) ▼

○ Backflow Preventers ▼

○ Boilers (Over 200,000 BTU) ▼

○ Building Floor Plans ▼

○ Contracts ▼

○ Disaster Drills ▼

○ Elevators ▼

○ Elopement Drills ▼

○ Emergency Power Generators ▼

○ Emergency Preparedness ▼

○ Fire Alarm Systems ▼

○ Fire Drills ▼

○ Fire Extinguishers ▼

○ Fire Sprinkler System ▼

| | Administration ▼ | Support ▼ | Sign Out |

| Tasks | Work Orders | Unit Turns | Services | Assets | Capital | Reports | Resources |

Documentation

| 🔍 Search | | Filter by date ▼ | Filter by category ▼ |

Show documents with associated tasks.

Click here or drag and drop documents to upload.

◯ Ansul System (Fire Suppression)  ▲

| File Name | Associated Task | Assigned Date | Actions |
|---|---|---|---|
| Ansul System Inspection.pdf | Have Fire Suppression System inspected by outside contractor | 2023-03 | ⬇ |
| Ansul System Inspection.pdf | Have Fire Suppression System inspected by outside contractor | 2023-03 | ⬇ |
| Fire Sprinkler Inspection.pdf | Grease Containment | 2023-02 | ⬇ |
| Ansul System Inspection.pdf | Have Fire Suppression System inspected by outside contractor | 2023-02 | ⬇ |
| Ansul System Inspection.pdf | Have Fire Suppression System inspected by outside contractor | 2023-02 | ⬇ |
| Owner Inspection Checklist.pdf | | 2023-01 | ⬇ ✎ 🗑 |
| Ansul System Data Sheet.pdf | | 2022-12 | ⬇ ✎ 🗑 |
| Ansul System Diagram.PNG | | 2022-11 | ⬇ ✎ 🗑 |
| Owner Inspection Checklist.pdf | | 2022-10 | ⬇ ✎ 🗑 |
| Fire Drill Signature Sheet.pdf | Have Fire Suppression System inspected by outside contractor | 2022-09 | ⬇ |

| < 1 of 6 > | 1 – 10 out of 56 documents |

| ◯ Backflow Preventers | ▼ |
| ◯ Boilers (Over 200,000 BTU) | ▼ |
| ◯ Building Floor Plans | ▼ |

Life Safety Export

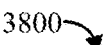Export Center

Export all reports documents from a given time frame through this form. Click into the individual report type links to view more details about the individual items within each type, download individual items, or batch download that type of item.

☑ Include Work History Report

☑ Include Logbook

☑ Include Documents

Start date

01/2022

End date

12/2023

Category

All                                                    ⌄

✓RUN REPORT        ✕CLEAR SETTINGS

FIG. 38

Figure 39:
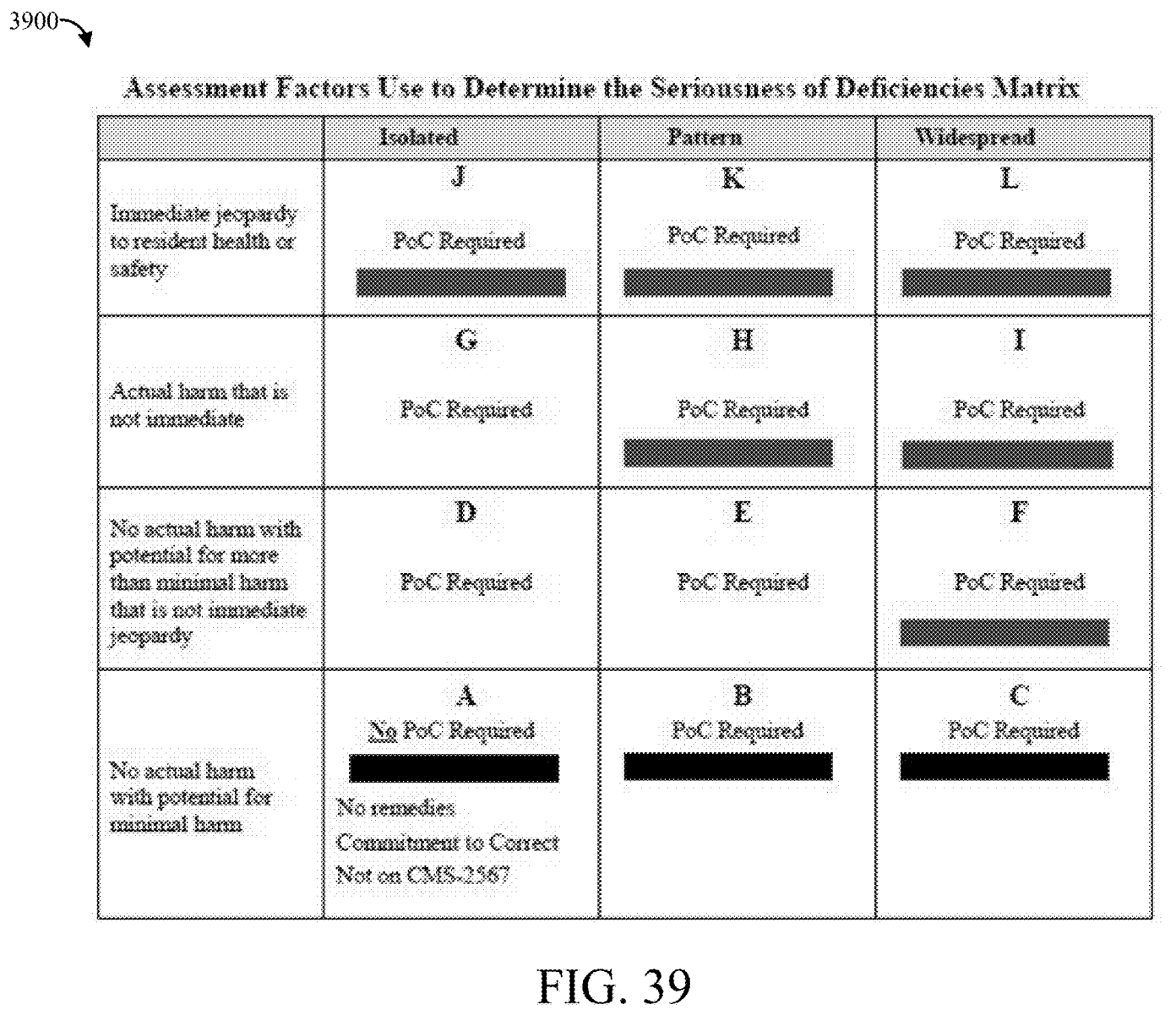

Assessment Factors Use to Determine the Seriousness of Deficiencies Matrix

| | Isolated | Pattern | Widespread |
|---|---|---|---|
| Immediate jeopardy to resident health or safety | J — PoC Required | K — PoC Required | L — PoC Required |
| Actual harm that is not immediate | G — PoC Required | H — PoC Required | I — PoC Required |
| No actual harm with potential for more than minimal harm that is not immediate jeopardy | D — PoC Required | E — PoC Required | F — PoC Required |
| No actual harm with potential for minimal harm | A — No PoC Required, No remedies, Commitment to Correct, Not on CMS-2567 | B — PoC Required | C — PoC Required |

ADAPTING DATA ALIGNMENT RECOMMENDATIONS TO CODE REVISIONS USING PENALTY-MATRICES

CROSS-REFERENCE TO RELATED APPLICATIONS

This application is a continuation-in-part of U.S. patent application Ser. No. 18/217,283, titled "Systems, Methods, and Media for Automatic Facility Compliance Document Generation," and filed on Jun. 30, 2023, the disclosure of which is incorporated herein by reference in its entirety.

BACKGROUND

Regulatory compliance technology has emerged as an essential component of enterprise information systems, driven by the proliferation of data-related regulations such as GDPR, HIPAA, and financial reporting mandates. As enterprises grow and operate in increasingly complex, distributed environments, the need for robust data standards becomes paramount to facilitate interoperability, data quality, and efficient information exchange. Effective data standards management involves the creation, maintenance, and enforcement of rules governing data formats, definitions, and usage, often spanning multiple departments, business units, or even external partners. Compliance mandates often dictate specific data standards, and enterprise information systems must be agile enough to implement these standards across distributed networks. Organizations increasingly rely on integrated solutions that combine data standards management, compliance automation, and enterprise-wide information systems to ensure both operational efficiency and regulatory adherence.

Moreover, compliance with various regulations and safety inspections that are required of certain facilities becomes a highly difficult task as the network of managed facilities grows across a large geographic area. Facility maintenance teams often struggle to maintain compliance with various complex and changing requirements, while also trying to balance providing quality service to residents and other personnel associated with different facilities. Thus, facility maintenance can become a costly endeavor, especially when an operator operating many facilities does not have efficient systems and methods for controlling costs and ensuring safe and compliant facility operations. Accordingly, new systems, methods, and media that can provide improved efficiencies in terms of facility management and operational compliance are desirable.

BRIEF DESCRIPTION OF THE DRAWINGS

FIG. 6 shows a flow diagram illustrating an example process for generating a simulated (mock) survey report for a facility, in accordance with some aspects of the disclosure.

FIG. 7 shows a flow diagram illustrating an example process for generating compliance documentation and assigning tasks to address compliance gaps, in accordance with some aspects of the disclosure.

FIG. 8 shows a flow diagram illustrating an example process for updating compliance documentation templates and compliance logic, in accordance with some aspects of the disclosure.

FIG. 9 shows a flow diagram illustrating an example process for generating an audit template used for a compliance audit, in accordance with some aspects of the disclosure.

FIG. 10 shows a flow diagram illustrating an example process for assigning tasks for performing to address compliance gaps, in accordance with some aspects of the disclosure.

FIG. 12 shows an example work order entry user interface that can be used by facility personnel to submit a work order, in accordance with some aspects of the disclosure.

FIG. 13 shows an example work order report that details work orders specific to life safety incidents for a facility, in accordance with some aspects of the disclosure.

FIG. 15 shows another example resident system user interface that can be used to submit maintenance requests via a resident engagement system, in accordance with some aspects of the disclosure.

FIG. 16 shows an example work order report that details work orders associated with maintenance requests submitted via a resident engagement system for a facility, in accordance with some aspects of the disclosure.

FIG. 17 shows an example work order that is created in accordance with an example nurse call device, in accordance with some aspects of the disclosure.

FIG. 18 shows an example work order report that details work orders associated with a nurse call system for a facility, in accordance with some aspects of the disclosure.

FIG. 19 shows an illustration of an example work history report associated with connected equipment for a facility, in accordance with some aspects of the disclosure.

FIG. 20 shows an example service request user interface for requesting maintenance and requesting quotes for maintenance service for a facility, in accordance with some aspects of the disclosure.

FIG. 21 shows an example planned maintenance user interface for managing testing, inspections, and maintenance for a facility, in accordance with some aspects of the disclosure.

FIG. 24 shows an example of a mock survey checklist user interface that can be used by facility personnel to gauge facility compliance, in accordance with some aspects of the disclosure.

FIG. 27 shows an example task explanation user interface that can be used by facility personnel to complete tasks for a facility, in accordance with some aspects of the disclosure.

FIG. 28 shows an example best practice task explanation user interface that can be used by facility personnel to complete tasks for a facility, in accordance with some aspects of the disclosure.

FIG. 29 shows an example best practice task logging user interface that can be used by facility personnel to document the results of performing a best practice task, in accordance with some aspects of the disclosure.

FIG. 31 shows an example task list user interface that can be used by facility personnel or surveyors to assess compliance gaps for a facility, in accordance with some aspects of the disclosure.

FIG. 32 shows an example citation report that details different citations issued by a regulatory entity, in accordance with some aspects of the disclosure.

FIG. 33 shows another example citation report that details a specific citation issued by a regulatory entity, in accordance with some aspects of the disclosure.

FIG. 34 shows an example best practice categories user interface that can be used by facility personnel to view best practices, in accordance with some aspects of the disclosure.

FIG. 36 shows an example compliance documentation overview user interface that can be used by facility personnel to view and manage compliance documents, in accordance with some aspects of the disclosure.

FIG. 37 shows another example compliance documentation overview user interface that can be used by facility personnel to view and manage compliance documents, in accordance with some aspects of the disclosure.

FIG. 38 shows an example mega pull user interface that can be used by facility personnel to grab all documentation and other inputs related to compliance parameters specified by the user, in accordance with some aspects of the disclosure.

FIG. 39 shows an example severity matrix that can be used to determine the severity of compliance gaps for a facility or organization, in accordance with some aspects of the disclosure.

DETAILED DESCRIPTION

Figure 1:
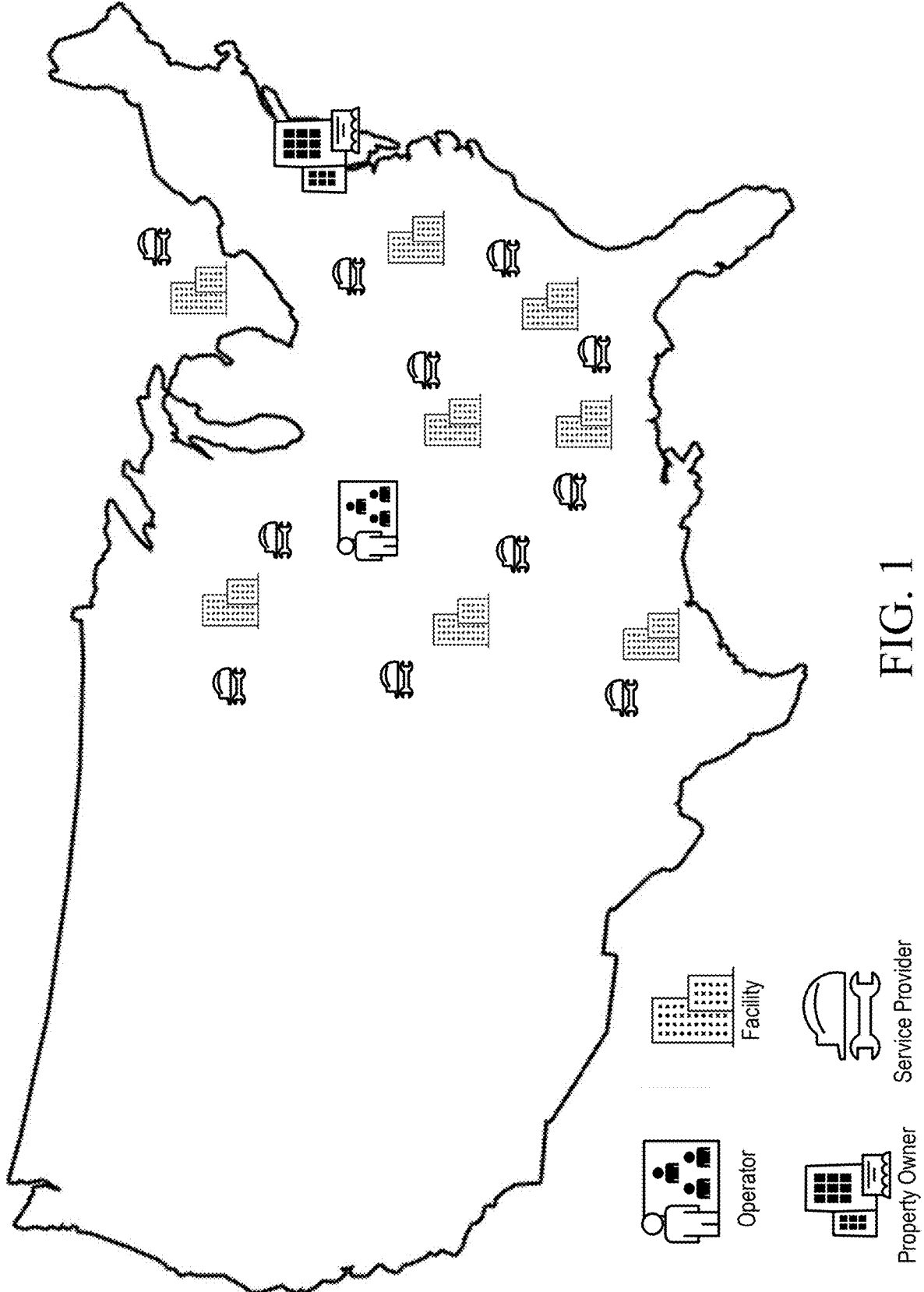
FIG. 1 shows an example of a geographically distributed network of facilities at which a service is managed by an operator, in accordance with some aspects of the disclosure.

Organizations face a persistent and complex challenge: managing compliance with diverse and evolving data standards across dispersed networks of entities. These entities, which may include hospitals, clinics, laboratories, and corporate parents, are often distributed across multiple geographic regions and legal jurisdictions. Each entity is subject to distinct regulatory codes, privacy mandates, and operational standards, which can change frequently and unpredictably.

The technical problem arises from the heterogeneity and fragmentation of data standards that govern operational practices, record-keeping, and data security. When regulatory authorities update or introduce new standards, each entity within a network must rapidly assess its own compliance posture, identify gaps, and implement changes. This process is complicated by the lack of a unified mechanism for mapping entity-specific requirements, prioritizing compliance tasks, and tracking progress. As a result, organizations often struggle with delayed responses, inconsistent implementation, and increased risk of enforcement actions or penalties.

Existing solutions are typically fragmented, siloed, or limited to static checklists that do not adapt to the dynamic regulatory landscape or the unique circumstances of each entity. These approaches fail to provide actionable, prioritized guidance tailored to the specific risks and obligations faced by each organization, leading to inefficiencies, compliance failures, and resource misallocation.

The present invention addresses this technical problem by introducing an automated platform that dynamically manages data alignment for multiple entities within a dispersed network. The platform leverages a template generation model to analyze current data standards, historical enforcement data, and predictive analytics. It then produces machine-readable data templates containing prioritized, entity-specific recommendations for achieving compliance. By automatically mapping each entity to the relevant portions of the applicable code of data standards and generating actionable, ranked tasks, the invention enables organizations to respond efficiently and effectively to regulatory changes. This not only normalizes compliance efforts across heterogeneous networks but also reduces the risk of enforcement actions, improves operational consistency, and streamlines resource allocation.

The present disclosure relates to systems and methods that manage data alignment for multiple entities operating within a dispersed network. Data alignment, as used herein, refers to the process of ensuring that an entity's operational data, policies, and practices conform to a code of data standards issued or endorsed by at least one governing authority. The platform automatically generates data-alignment recommendations—prioritized tasks instructing each entity how to modify its data or operations to satisfy the detected standards.

A dispersed network can include entities distributed across different geographic regions, legal jurisdictions, or organizational hierarchies, each subject to distinct regulatory codes or industry standards. An "entity" can be any organizational unit—such as a hospital, outpatient clinic, skilled-nursing facility, laboratory, or corporate parent—that operates under a set of data standards within the dispersed network. The term can also encompass non-healthcare organizations (e.g., pharmaceutical manufacturers, research institutes, or third-party service providers) when they are subject to the same compliance-management platform for regulatory alignment. For example, healthcare facilities located in separate states or countries can have to satisfy divergent privacy, security, and record-keeping mandates. The present platform normalizes such heterogeneity by mapping each entity to the applicable portion of the code of data standards and by producing entity-specific data-alignment recommendations.

The present invention provides a method for adapting data alignment recommendations across a dispersed network of entities in response to code changes in a set of data standards. The method is implemented using a template generation model that receives data standards input and generates a data template containing a plurality of data alignment recommendations. These recommendations are sorted according to an original ranking, which is determined by base scores assigned by the template generation model. The base scores reflect the greater likelihood of a data enforcement procedure—or a predicted data enforcement procedure (s), or additional data enforcement procedures—occurring against a given entity for a given data standard, based on historical data, or historical data input, and predictive analytics.

A "data template," as used herein, can refer to a machine-readable, structured output generated by the compliance-management platform that conditionally comprises a prioritized list of data-alignment recommendations tailored to a specific entity or group of entities within a dispersed network. The data template can include, for each recommendation, an associated ranking score, a description of the compliance task, relevant regulatory citations, and metadata such as urgency, responsible personnel, and due dates. For example, in the context of a skilled nursing facility responding to a change in infection-control standards, the data template can include: (1) "Update hand hygiene protocol documentation" (rank 1, due in 7 days, linked to CMS Tag F441), (2) "Conduct staff retraining on new PPE requirements" (rank 2, due in 14 days, linked to CDC guidelines), and (3) "Audit and report on linen-handling procedures" (rank 3, due in 21 days, linked to state health code), with each entry containing fields for task owner, completion status, and supporting references.

FIG. 1 shows an example of a geographically distributed network of facilities at which a service is managed by an operator. As shown in FIG. 1, an operator located in a particular geographic location can operate facilities in many different geographical locations. For example, the operator can provide access to living space (e.g., via leased units) and/or provide a service (e.g., assistance with various tasks, healthcare services, etc.) at the various facilities. In the context of senior living, an operator can operate many different facilities in different locations, and can provide multiple different types of services, sometimes within the same facility. The operator of the facilities can or can not own the property associated with the facilities. For example, one or more property owners can own the real property and/or structures associated with the facility, and can contract with an operator to operate a senior living facility providing one or more services at the property. The property owner can be any type of organization, such as a real estate investment trust (REIT) or other type of organization.

As part of a facility, the operator can be responsible for maintenance of facilities. The operator can hire one or more employees (sometimes referred to as a maintenance director) to supervise maintenance at a particular facility, or a group of closely located facilities. The maintenance director can be responsible for resolving requests for maintenance and/or repair to occupied units, ensuring that various assets, such as systems (e.g., heat, air conditioning, plumbing, electrical, etc.) are maintained in working order, and that other assets (e.g., carpet, doors, trim, countertops, appliances, etc.) are maintained in good repair. While a maintenance director can be capable of performing some maintenance, repair, and/or replacement, the maintenance director can need to hire outside contractors to perform certain tasks. Often, contractors operate in relatively small areas, and thus different facilities can not be able to use the same contractors. This can make it difficult for the operator to ensure that contractors that are retained are charging appropriately for services and performing satisfactorily.

Moreover, compliance with various inspection, testing, and documentation requirements (e.g., for compliance with the National Fire Protection Association (NFPA) 101 Life Safety Code, etc.) presents a difficult challenge for facility operators, including maintenance directors, that involves management of multiple different parties, paperwork, and changing regulations. Various survey processes are designed to identify gaps during building walk-throughs and documentation audits position surveyors to frequently grant citations in highly regulated facility spaces such as senior living facilities. The compliance documentation provided to the surveyor typically needs to be in a specified format that varies based on which agency the surveyor represents.

Senior living facilities, for example, can choose to maintain a life safety binder including paperwork that discloses proof that all required instances of inspections and testing have been completed on time and according to regulatory code. However, the manual tracking of compliance paperwork in a binder such as this can cause facility maintenance teams to struggle to maintain compliance with complex and changing regulatory requirements while also balancing serving the needs of senior living residents. Additionally, facility personnel can often be required to spend significant amounts of time and effort piecing together documentation one document at a time. Facility managers need systems that not only collect input and produce documentation needed for various different types of surveys and inspections, but they also need systems that can proactively identify compliance gaps and provide different types of proactive recommendations that can be followed by facility managers to improve the likelihood of compliance and reduce the risk of potential fines and other penalties. Moreover, facility managers need systems that can provide gains in terms of operational efficiency such that facility personnel can provide better overall care to facility residents while also achieving overall cost savings.

The systems, methods, and media described herein can provide single click functionality for performing a compliance audit and generating appropriate documentation in the correct format for various different types of surveys and inspections that can be required for a given facility. The format of the compliance documentation can be associated with a specific authority having jurisdiction (AHJ), for example. While most authorities having jurisdiction base their inspection, testing, and documentation requirements around common templates such as the NFPA 101 Life Safety Code standards, different authorities having jurisdiction can use different versions of the NFPA standards during surveying such that unique formatting requirements can be imposed. The compliance and audit functionality described herein can apply logic and risk scoring to provide a list of recommendations and/or tasks for completion to address different compliance gaps in prioritized order. The prioritization of tasks for completion can be based on several factors, including risk of citation, potential gains in efficiency, maintaining appropriate levels of care, and cost savings.

The systems, methods, and media described herein can further support integrations and act as a mechanism to collect specific data sets from different types of systems and compile the information to produce compliance documentation in the proper format for survey compliance for multiple regulating and accrediting bodies. For example, skilled nursing home facilities typically need to produce documentation in 2657 format to comply with the Centers for Medicare & Medicaid Services (CMS) Life Safety Code in order to qualify for Medicaid funding, and also need to create another set of documentation using Joint Commission standards and formatting to receive accreditation. Each regulating and accrediting body publishes complex requirements that are difficult to follow and often changing. Regulations are also so complex that organizations often see large variations in the interpretation of the code across different facilities, states, and surveyors. For example, one facility might receive a citation for a document that would be deemed compliant by a different surveyor. Adding to the complexity, surveyors typically are encouraged to issue a minimum number of citations over certain time periods, or an updated time period, thereby making it even more difficult for facilities to maintain 100% compliance. Surveyors can pick and choose the areas of the code to be audited based on historical facility performance and personal preferences.

The systems, methods, and media described herein can further track citations that are published by regulating bodies to identify geographical and surveyor specific trends. Then, using these trends, tasks can be prioritized in areas of the code that are most at risk for audit. Moreover, mock surveys can be generated to perform test audits to not only gauge current compliance with documentation standards overall, but also gain insights into areas that are most likely to be reviewed by the surveyor. Additionally, recommendations can be provided regarding steps for addressing gaps in prioritized order, and aids can be provided throughout the process such as training, testing, and inspection resources as well as qualified technicians that can be automatically dispatched via interactions with a user interface.

The systems, methods, and media described herein can utilize various databases to analyze changes in code, data inputs, internal audit results, compliance measures, and instances where citations were granted to produce a feedback loop to continue to improve recommendation, compliance document formatting, and future survey results. The documentation pulls can be aligned with specific authority having jurisdiction preferences, thereby making it easy for the surveyor to gauge compliance of a facility such that citations can be minimized. Also, built-in logic for considering house factors when providing recommendations on addressing gaps identified in an audit can be provided. The prioritization of recommendations can include current staffing, time since the last survey, weather conditions, and costs to complete various tasks. For example, the system can recommend that a technician should be dispatched to address a compliance gap that is at high risk for citation with an approaching survey window and a lack of staff to complete an appropriate task internally. At the same time, the system can recommend that the internal maintenance team at a facility should complete another task internally to save cost. Meanwhile, the audit can draw immediate attention to a lack of emergency plans being in place a month before a facility enters a hurricane season by alerting the executive director to bring leadership teams together to conduct a tabletop exercise in preparation. Recommendations can be provided based on most current datasets, thereby optimizing the use of time, money, and resources.

In addition to collecting needed datasets, the systems, methods, and media described herein can further empower personnel such as administrators, regulators, regional power users, corporate power users, and others with oversight of maintenance and environmental services performance with quality inputs and required timelines. Weekly reports and real-time alerts can be generated to proactively identify at risk facility teams that need coaching with poor inputs or gaps in compliance documentation. While documentation pull can be created by inspection, testing, and document uploads into the system, the system can also provide functionality for supporting several integrations that automate inputs to make it easier for facilities to comply with requirements from different authorities having jurisdiction.

Accordingly, the systems, methods, and media described herein can provide significant time savings by eliminating several steps involved with creating records by pulling and organizing documentation in various formats. Integrations can be implemented to streamline the input process to improve response times, produce staff efficiencies, and drive compliance with faster corrective actions. Organizations can rely on this functionality to keep up with changing regulatory environments by receiving systematic alerts and training on updates to regulatory code. The ecosystem and applied logic used in the auditing functionality can position facilities with the best possible use of internal and external staff resources while also considering risk and potential costs associated with different decisions.

Figure 2A:
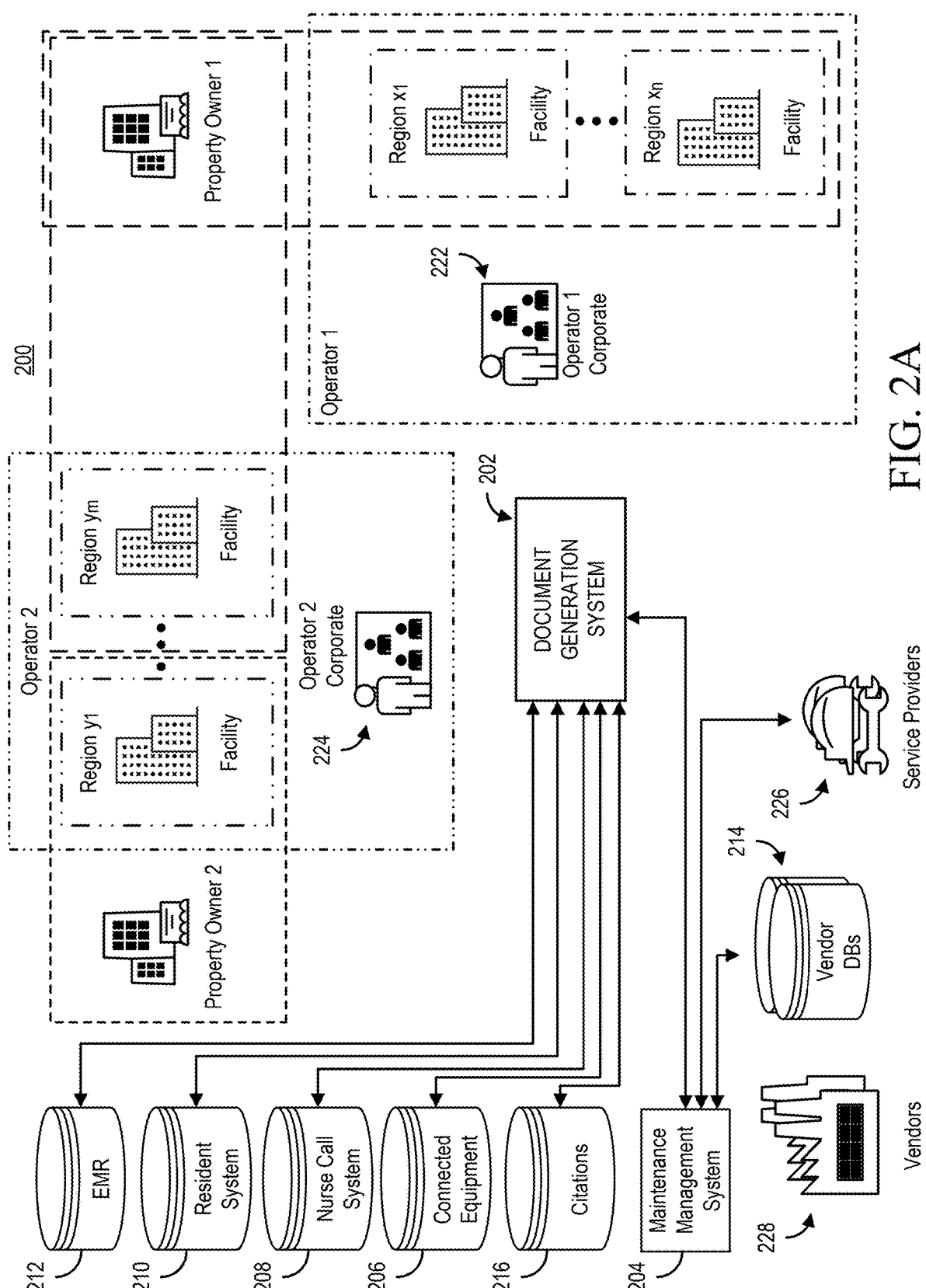
FIG. 2A shows a block diagram illustrating an example system for automatically generating compliance documentation for facilities associated with various operators and property owners, in accordance with some aspects of the disclosure.

FIG. 2A shows a block diagram illustrating an example system 200 for automatically generating compliance documentation for facilities associated with various operators and property owners. As shown in FIG. 2A, a document generation system 202 can communicate with and/or maintain a collection of various databases, including a connected equipment database 206, a nurse call system database 208, a resident system database 210, an electronic medical record (EMR) system database 212, and a citations database 216. Moreover, the document generation system 202 can communicate with a maintenance management system 204 and one or more vendor databases 214. The maintenance management system 204 can be provided with the document generation system 202 (e.g., as part of the same platform service offering) or can be provided separate from the document generation system 202. The maintenance management system 204 can communicate with and/or maintain a maintenance database that stores work order data for one or more facilities. The maintenance management system 204 can generate, prioritize, and schedule work orders based at least in part on data received from other systems and databases. It will be appreciated that each of the databases described can be implemented in various ways, including using various different types and configurations of databases.

It is important to note that the maintenance management system 204, the connected equipment database 206, the nurse call system database 208, the resident system database 210, the EMR system database 212, and the one or more vendor databases 214 can all represent separate data sources that can be associated with different entities or network entities (e.g., managed by and/or maintained by different entities, etc.). For example, the connected equipment database 206 can be maintained by one or more vendors of facility equipment and also the nurse call system database 208 can be maintained by one or more vendors of nurse call devices used in a facility. Accordingly, the integration of all the different data from these separate sources presents a technical challenge for facility stakeholders to address. In many existing systems, this data is not integrated into a single system such as the document generation system 202. Instead, facility stakeholders are often required to piece together disparate information from each of these separate sources and attempt to efficiently evaluate all of the separate data sources with respect to changing and complex regulatory environments.

Advantageously, the document generation system 202 and/or the maintenance management system 204 can pull in data from all of these separate sources in order to efficiently drive facility compliance. The document generation system 202 and/or the maintenance management system 204 can securely achieve this data integration through the use of separate application programming interfaces (APIs) for each separate data source. This can also be accomplished with periodic or scheduled file or data transfers using various protocols over a network. Also, it should be noted that one or more of the separate data sources can be combined and/or can be managed by the same entity, such that each of the data sources described with respect to the system 200 are not necessarily separate. In addition, data can be received from various sources through other methods. For example, documents can be manually uploaded by a user (e.g., scanning physical documents) or gathered from public sources, such as the Internet, using data scraping techniques that can then be similarly ingested using optical character recognition (OCR) techniques and stored in a database. Many different methods can be used, especially when gathering data from various sources using different types of systems. As an example, local and state level AHJs can not have open reporting systems and simply publish the documents online.

The maintenance management system 204 can maintain asset history data associated with various facilities, such as assets associated with a first operator 222 (e.g., operator 1), and/or a second operator 224 (e.g., operator 2). The maintenance management system 204 can include information about any suitable type of asset, such as assets that can be associated with a unit, such as walls, ceiling, trim, paint (e.g., wall paint), doors, windows, window treatments, floors, carpets, plumbing, electrical wiring, electrical outlets, a heating system, a cooling system, other heating, ventilation, and air conditioning (HVAC) equipment, detectors (e.g., smoke detectors, carbon monoxide detectors, etc.), fire extinguishers, appliances, cabinets, counter tops, sinks, toilets, shower, bath tub, garbage disposal, furniture, etc. The maintenance management system 204 can maintain information organized using any suitable technique or combination of techniques, for example using a relational database or a non-relational database.

The maintenance management system 204 can receive identifying information associated with an asset, and can store the identifying information in connection with metadata related to the asset in one or more databases. For example, a mobile device (e.g., computing device 330 described below in connection with FIG. 3) can scan a symbol (e.g., a barcode, a QR code, etc.) encoded with identifying information (e.g., an alphanumeric code), and can transmit the identifying information to the maintenance management system 204. In such an example, the mobile device can transmit information about the asset (e.g., an asset type, a semantically meaningful name, a location of the object, an indication of when the asset was installed, etc.). The maintenance management system 204 can also store information about assets that have been installed at a facility, and metadata related to the asset. Additionally, the maintenance management system 204 can store information about repairs and/or other maintenance performed in connection with an asset. For example, the maintenance management system 204 can store identifying information associated with various assets, such as unique identifying information, semantically meaningful name, an identification number associated with a type of asset (e.g., types of assets can be associated with a unique alphanumeric code), model information, serial number, lot information, manufacturer, etc.

Moreover, the maintenance management system 204 can store identifying information associated with a location of an asset, such as an address, a facility name, a room number, an apartment number, a corridor number, a type of facility (e.g., assisted living, independent living, memory care, skilled nursing, acute care, hospitality, etc.), etc. As yet another example, the maintenance management system 204 can store information associated with installation, maintenance, and/or repair of an asset, such as an installation time, a time in service (e.g., a time since the asset was installed). As still another example, the maintenance management system 204 can store information about a condition of the asset at a particular time (e.g., documented by an employee, documented by a contractor, etc.). In a more particular example, the condition of the asset can be based on one or more objective criteria, such as "new" when the asset is first installed, and/or one or more subjective criteria (e.g., based on input from a user). As a further example, the maintenance management system 204 can store information associated with a resident of a room, such as whether one or more residents uses any mobility assistance devices (e.g., a wheelchair, a motorized wheelchair, etc.), an age of the resident, a number of residents, etc. As another further example, the maintenance management system 204 can store information indicative of attributes of an asset, such as color, size, voltage, gas type (e.g., natural gas, propane, etc.), etc.

When an asset is serviced (e.g., installed, repaired, or replaced, and/or when maintenance is performed), a computing device (e.g., a mobile device) can provide information associated with the service to the maintenance management system 204. Additionally, maintenance personnel at a facility can submit new work orders to the maintenance management system 204. Maintenance personnel can submit any data with a work order, such as contractor documents, images, etc. to complete a work order. Then, the maintenance management system 204 can maintain historical work order data for a facility, such as maintaining data associated with each work order submitted and/or completed at a facility including where the incident occurred, what action was taken to address the incident, time to resolve the incident, cost associated with resolving the incident, etc. The maintenance management system 204 can access vendor databases 214 to order products and/or assess the availability of products for ordering (e.g., products from vendors 228) as well as to schedule service and/or assess the availability of service (e.g., services provided by service providers 226). The maintenance management system 204 can also automatically schedule maintenance personnel and/or service providers to receive delivery of the order and/or perform service (e.g., installation) or other tasks associated with the ordered products and components after delivery. The maintenance management system 204 can cause a notification to be provided to the service provider (or maintenance personnel) indicating that one or more items associated with the service have been procured, and an indication of where, when, how, etc., to obtain the items for use in performing service.

The maintenance management system 204 can use stored information to predict a useful life of a particular asset. For example, the maintenance management system 204 can determine an average useful life of a particular asset and/or type of asset based on a condition of similar assets over time in similar situations (e.g., in similar facilities, with residents having similar characteristics, etc.). The maintenance management system 204 can further include a purchasing system (or a separate purchasing system can be provided and integrated into the same platform as the maintenance management system 204 and the document generation system 202) for handling purchase orders for different products and components that can be required for maintenance and/or for addressing compliance gaps identifying by the document generation system 202.

The connected equipment database 206 can store a variety of different sensor data associated with equipment in a facility for real-time equipment management functionality (e.g., Internet of Things (IoT) sensor data). For example, the connected equipment database 206 can store live sensor data associated with HVAC equipment, refrigerators, water heaters, vital sign monitors, and other types of connected equipment in a facility. The sensor integration can be used to incorporate maintenance alerts and documentation of inspections for connected equipment. For example, the live sensor data can be used by the maintenance management system 204 to automatically generate work orders for maintenance personnel (e.g., when a sensor reading exceeds or falls below a certain threshold). The real time sensor data from the connected equipment database 206 not only helps maintenance personnel prioritize work for a facility, but it also helps the document generation system 202 generate appropriate documentation that can be required for equipment inspection and/or testing to meet certain requirements and regulations. The connected equipment database 206, using the real time sensor data, can accordingly facilitate the addressing of potential issues before they happen.

The document generation system 202 can leverage data from the various data sources shown as part of system 200, as well as additional data sources, to provide single click functionality for performing a compliance audit and generating appropriate documentation in the correct format for various different types of surveys and inspections that can be required for a given facility. The format of the compliance documentation generated by the document generation system 202 can be associated with a specific authority having jurisdiction. The document generation system 202 can apply logic and risk scoring to provide a list of recommendations and/or tasks for completion to address different identified compliance gaps in prioritized order. The document generation system 202 can prioritize tasks for completion based on several factors, including risk of citation, potential gains in efficiency, maintaining appropriate levels of care, and cost savings. The document generation system 202 can also perform additional functionality as described throughout the disclosure.

The connected equipment database 206 can be used to suggest changes to preventative maintenance schedules in order to extend the life of equipment and avoid failures. As more and more sensor data accumulates in the connected equipment database 206, the connected equipment database 206 can be used to drive even more powerful analysis and predictions. The data in the connected equipment database 206 can drive efficiencies with maintenance teams in identifying the most effective preventative maintenance schedules and recommendations for replacements. When sensors generate alerts, they can push data to the connected equipment database 206 and work records can be created. The data can include the specific system, the alert, the location, the data, appropriate levels for the sensor data, current levels of the sensor data, and cause of the alert. Various compliance documentation including for a Joint Commission survey, a CMS Life Safety survey, and Requirements of Participation can include testing records that show how various parameters associated with connected equipment are being monitored at a facility. For example, the connected equipment database 206 can be used to monitor water temperatures to prevent scolding, air temperatures to prevent food from spoiling, and air quality as part of infection prevention and control.

The nurse call system database 208 can store a variety of different data associated with nurse call devices installed in a facility, such as a senior living facility. The nurse call devices can include, for example, pendants, pull cord stations, call cord stations, universal transmitters, smoke detectors, temperature detectors, humidity detectors, water bugs, keypads, and fall pads, among other types of nurse call devices. The data from nurse call system database 208 can be used to provide a wireless system with a rules engine for alerting and reporting. For example, alerts and reports can be generated based on low battery signals, tamper detection signals, missing devices (e.g., left 900 MHz zone), threshold violations, abnormal frequency fluctuations patterns (e.g., any unusual frequency deviations in any machine, machines have certain defined frequencies within certain ranges, similar to how the human body has heartbeat, and any unusual deviation from the natural rhythm/frequency can indicate that there is a problem in the system/machine somewhere that needs assessment/repair), and other types of alerts and reports. The data from the nurse call system database 208 can be used by the maintenance management system 204 to automatically generate work orders in response to alerts such that maintenance personnel for a facility addresses the alerts as soon as possible. This functionality can help ensure that the proper messages get to the proper maintenance teams that can spend most of their time interacting with the maintenance management system 204 to manage work order queues as opposed to interacting with a nurse call system. The work orders and various data associated with the completion of the work orders can be maintained by the document generation system 202 and/or the maintenance management system 204. The data of work orders associated with a request can be used by the document generation system 202 for preparing documentation for compliance inspection purposes.

Accordingly, the integration of the data from the nurse call system database 208 into the document generation system 202 and/or the maintenance management system 204 can provide convenience to maintenance teams that would typically be required to access a separate nurse call system to address alerts, run reports, identify errors, and proceed to take appropriate action (e.g., in resident rooms that require attention). The integration of the nurse call system database 208 thereby eliminates several steps in this process and allows maintenance teams to receive alerts from nurse call devices automatically without having to pull reports from another system. As a result, the nurse call alerts can be added to the maintenance team's everyday workflow for managing work orders and non-scheduled tasks, thereby allowing for more efficient maintenance operations where issues are properly prioritized based on urgency and location within the facility. Additionally, the integration of the data from the nurse call system database 208 provides a mechanism for managing nurse call devices reactively as opposed to forcing a set schedule to replace components such as batteries. Instead of replacing all nurse call device batteries every six months, for example, the integration of the data from the nurse call system database 208 can allow maintenance teams to save time and money by only replacing batteries when failures occur or before they are predicted to occur.

Moreover, the integration of the data from the nurse call system database 208 can drive maintenance teams to replace components more quickly and, in cases where replacement components are needed, maintenance teams can simply click a button within the document generation system 202 and/or the maintenance management system 204 immediately initiate an order (and document the order) for the parts instead of having to contact one or more vendors and spend significant time and effort to place one or more orders for the replacement components. Certain compliance inspections can require preparation and review of documents specific to the inspection of nurse call system devices in a facility. For example, the CMS Requirements of Participation currently include rules related to nurse call system inspection as part of F-Tag 919. Integration of the data from the nurse call system database 208 can allow the document generation system 202 to automatically create documentation showing inspections and testing performed at a facility such that maintenance teams can save significant time and effort on logging details every month. The integration of the data from the nurse call system database 208 can also add a level of accountability to the management of the nurse call system alerts and the responsiveness of the maintenance team to addressing the nurse call system alerts.

The resident system database 210 can store a variety of data associated with maintenance requests submitted by residents and/or by family members of residents. For example, at a senior living facility, a family member (e.g., a child of an elderly person) can submit a maintenance request (e.g., for the air conditioning, television, etc.) for a resident of the senior living facility, and the maintenance request can be stored in the resident system database 210. Maintenance requests can be submitted by residents and/or by family members of residents through a mobile application, through a web application, or through various devices/systems in the resident's unit, for example. The resident system associated with the resident system database 210 can provide residents with integrated in-unit technology to provide self-service capabilities. For example, the resident system can allow residents to view community calendars (e.g., social events, meals, etc.), view food menus, view activities, view special events, etc.). The resident system can also provide family members of residents with better efficiency by assuring family members that services will be completed for residents based on interactions with the resident system without requiring the family members to call the facility. The resident system can provide updates via a resident portal interface such that residents and family members can get status updates and see when requests (and/or associated work orders) have been completed.

Additionally, the resident system can provide improved efficiency for maintenance teams because several steps (e.g., communication with an intermediary) can be eliminated from various maintenance processes to address resident concerns. The maintenance teams can gain immediate visibility into maintenance requests via notifications. Also, various data associated with the resident portal can be stored in the resident system database 210 such that it can be used by the document generation system including the name of the resident, the date, the location where work is needed, and any other descriptive data associated with a maintenance request. Examples of maintenance requests that can be submitted and stored via the resident system database can include problems with nurse call devices, HVAC systems, door hazards, trip hazards, and television problems to name just a few examples. The integration of the data from the resident system database 210 can be used by the maintenance management system 204 to automatically generate work orders based on the requests for the maintenance team to complete, and various data associated with the completion of the work orders can be maintained by the document generation system 202 and/or the maintenance management system 204. Data for work orders associated with a request can be used by the document generation system 202 for preparing documentation for compliance inspection purposes.

The EMR system database 212 can be associated with an EMR platform and can store data associated with maintenance requests submitted by facility staff responsible for handling medical procedures associated with facility residents. The integration of the data from the EMR system database 212 can then be used by the maintenance management system 204 in order to automatically generate work orders for the maintenance team to complete, and various data associated with the completion of the work orders can be maintained by the document generation system 202 and/or the maintenance management system 204. The integration of the EMR system database 212 provides convenience for clinical teams that spend most of their time updating medical records within an EMR system and eliminates the need for them to transition to a different system to create a work order. Similarly, the integration of the EMR system database 212 provides improved efficiency for maintenance teams in that maintenance teams do not have to navigate to a separate system to evaluate potential maintenance issues associated with medical records but instead have immediate visibility into the work that is needed. Data can be pushed back to the EMR system database 212 such that clinical teams can assess the status of work orders and view progress.

The citations database 216 can store a variety of data associated with citations issued by various entities. The integration of citation data from the citations database 216 can allow the document generation system 202 and the maintenance management system 204 to provide recommendations and generate tasks based on identified compliance gaps that are at high risk of leading to a citation being issued to a given facility. The citations database 216 can store historical citation data (e.g., publicly available data) from different locations (e.g., different states, counties, countries, etc.) and from different entities (e.g., different surveyors, government agencies, etc.). The citations database 216 can be leveraged to analyze zones, locations, dates, citation comments, and other citation-related data to gauge probability of areas of surveyor focus. The citations database 216 can also be leveraged to indicate current surveyor interpretation of regulatory code and to make changes to logic, input requirements, recommendation, etc. for user interactions.

Various approaches to identifying citation trends can be implemented, such as using various types and combinations of machine learning and artificial intelligence models. The identified trends can be leveraged to highlight areas for review based on citations being issued in real time. In some cases, the data in the citations database 216 can be limited by the public release of citation data, such that there can be approximately a 3-month delay period. Alternatively, citation data can be manually entered by facility staff members and/or other personnel such that the citation data leveraged using the citations database 216 is more current. Manual entry of data into the citations database 216 can also provide further context to the citation data, such as various metadata including surveyor notes (e.g., as shown in FIG. 33) covering various details about each citation. This metadata can not be available when gathering data from public sources and other integrations. Manual entry of citation data can be accomplished by user input via a computing device into a form, or semi-automated entry of citation data recognized from a scanned citation document.

With interdepartmental communication being a significant challenge in terms of facility management, the integration of the EMR system database 212 can provide automation with real time updates that eliminates the need for in-person, email, and phone call updates regarding the status of work orders. The resulting gains in efficiency can improve the average time to address work requests and ultimately position clinical teams to provide better care to residents. When the clinical staff submits a request for maintenance, the EMR platform can capture a variety of data including the name of the requestor, the data, the location where the work is needed (e.g., building, area, room, etc.), and a description of the request (e.g., problem, equipment information, etc.). The EMR system in some examples can receive a severity/ priority associated with the request and store this data in the EMR system database 212 as well. In some examples, the EMR system can also automatically determine the severity/ priority associated with the request based on the request data and description. Then, the document generation system 202 and/or the maintenance management system 204 can maintain various data associated with the handling of the request, such as time to complete, work order closing date, cost associated with any parts needed, etc. Examples of requests that can be submitted through the EMR system and accessed via the integration with the EMR system database 212 can include problems with exit lights, operation of doors, fire extinguishers, detectors, blockage in hallways, etc. Certain inspections such as CMS requirements can focus heavily on these types of life safety and fire protection work records showing that problems identified were resolved properly and within a reasonable amount of time.

Figure 2B:
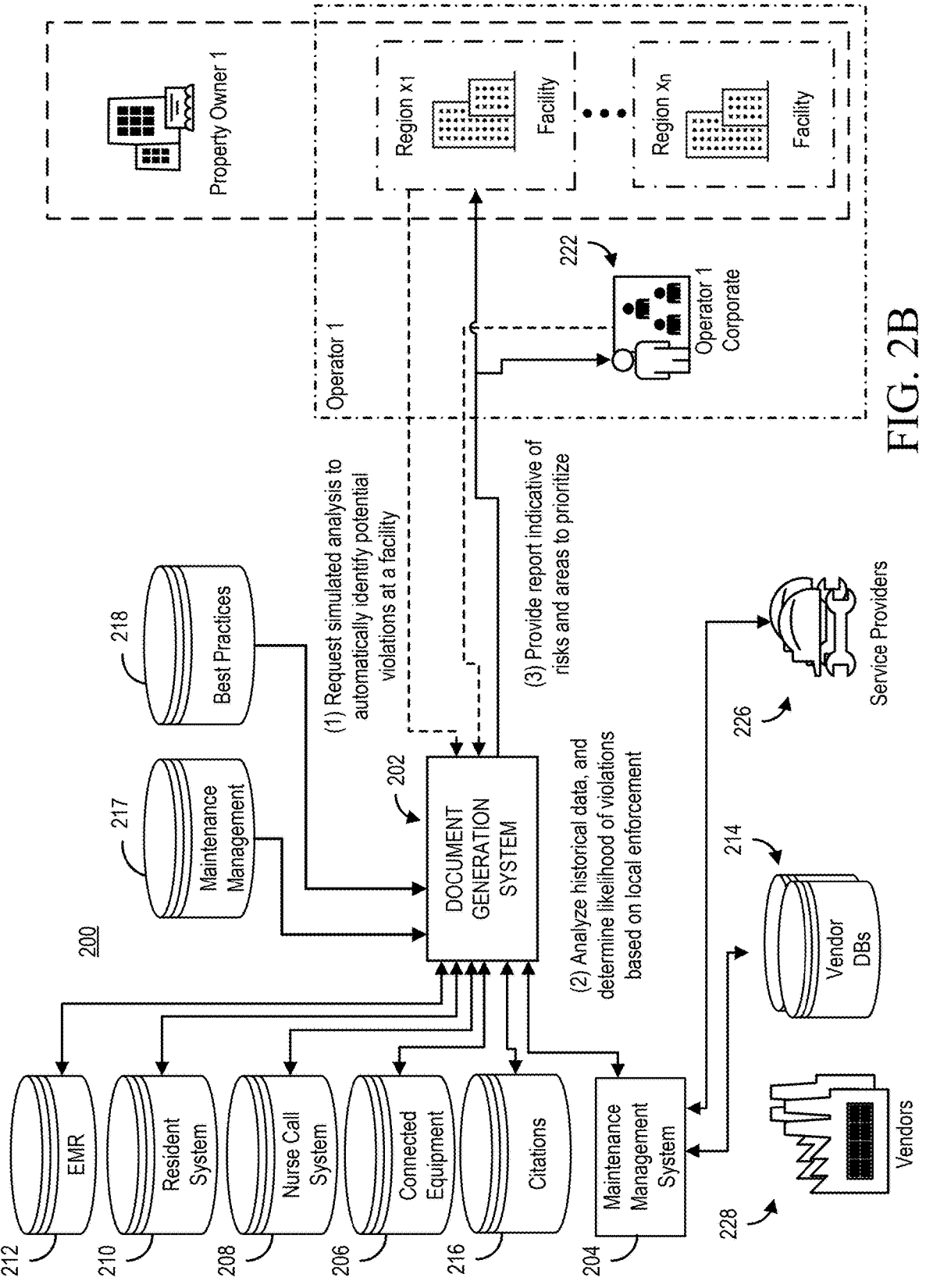
FIG. 2B shows another block diagram illustrating additional components of the system for automatically generating compliance documentation for facilities associated with various operators and property owners of FIG. 2A, in accordance with some aspects of the disclosure.

FIG. 2B shows another illustration of the example system 200 including data flow for requesting a simulated compliance analysis. Also shown in FIG. 2B are two additional data sources containing data that can be integrated with the document generation system 202 and/or the maintenance management system 204: a maintenance management database 217 and a best practices database 218. As shown, a request for a simulated analysis can be submitted by the first operator 222 for a facility located in a first region to the document generation system 202. Upon receiving the request for the simulated analysis (e.g., a simulated compliance inspection) from the first operator 222, the document generation system 202 can analyze historical data (e.g., from the various integrated sources described herein) to determine the likelihood of potential compliance violation based on local enforcement of regulations. Then, the document generation system 202 can provide a report indicative of risks and areas to prioritize to better comply with regulations back to the first operator 222. Further details regarding simulated analysis are described below.

The integration of the maintenance management database 217 can allow for the management of testing, inspection, maintenance, and repairs. In cases where compliance gaps are identified by the document generation system 202, maintenance teams can immediately dispatch a technician via a user interface (e.g., a user interface provided by a software platform including the document generation system 202 and/or the maintenance management system 204) to perform work to close the compliance gap and eliminate the compliance gap that is at risk for citation. The maintenance management database 217 can store various data associated with connecting facility needs and available capabilities within a service provider network (e.g., service providers 226) to streamline the process of reaching out to vendors (e.g., vendors 228) to provide services and/or products. The user interface can provide management functionality across all types of service events, thereby giving maintenance teams a single platform to request service, monitor inspections, and secure needed documentation (e.g., CMS-compliant compliance documentation of testing, inspection, maintenance, and repairs of equipment). Service records can be created within the maintenance management database 217 that detail various aspects of services performed for a facility.

Further, the maintenance management database 217 can store various data related to the managing, scheduling, and fulfillment of testing and maintenance inspections being performed by outside contractors. The maintenance management database 217 can store tasks on the facility work schedule that provide visibility into scheduled dates and completed work information including time to completion, equipment services (e.g., type of equipment, specific unit identifier), tests done, maintenance done, replacement part information, and other information. Additionally, all documentation related to the work done can be stored in the maintenance management database 217 and made visible within the task history, thereby eliminating the need for maintenance to track down and physically store documentation that can ultimately be needed for compliance inspection purposes.

The maintenance management database 217 can further store data related to different service dispatching recommendations that are generated and provided to facilities (e.g., by maintenance management system 204). The recommendations for service can be provided based on price, performance, rating, arrival times, and other possible factors. Recommendations can be vetted such that only the highest quality providers are recommended to facilities. Moreover, service providers (e.g., service providers 226) can access the maintenance management database 217 to view their own performance metrics in real time via live dashboards presented via a user interface. Repairs can differ from testing, inspection, and maintenance in that there can be different requirements for documenting any equipment failures and corrective actions taken to resolve equipment failures.

The maintenance management system 204 can use the data in the maintenance management database 217 to evaluate requests for service that are submitted by users to align the needs of the facility with the most qualified technician. The maintenance management system 204 can then allow the dispatcher and the technician to actively engage in the scheduling and routing of work, which can include the triggering of automated technician links. Upon receiving a request for service, the maintenance management system 204 can present an open event on a user interface and proceed to generate notifications that automatically alert facility teams with estimated time of arrival of the technician along with displaying the detailed updates as progress on the work is made. The real time notifications can keep maintenance teams informed throughout the process, including when work is completed, and invoicing is generated. As events change in the field, updates can be made visible via the user interface on a service request timeline.

The maintenance management system 204 can offer customizable not-to-exceed dollar amounts (NTEs) that allow companies to designate when approval is needed if service requests hit a certain threshold dollar amount. The maintenance management system 204 can send automated notifications to the maintenance team to inform them of the NTE allowing them to either approve or decline the service request. At the same time, the maintenance management system 204 can send notifications to regional approvers allowing them to stop the work and request a quote based on the circumstances of the work as it progresses, thereby providing additional controls around the service being performed. As service requests are initiated and completed, the maintenance management system 204 can automatically capture a detailed description of the work completed. The description can cover requirements that include a full list of assets with unique identifiers that were tested, as well as failures and corrective actions taken to address failures. Contractor inspections in some applications can contribute to 25% or more of the documentation required for various compliance inspections, and the data associated with contractor inspections and other outside services performed for a facility can be maintained in the maintenance management database 217. The data in the maintenance management database 217 can be provided to the document generation system 202 and/or the maintenance management system 204 for preparing documentation for compliance inspection purposes.

The integration of the best practices database 218 can allow facility staff to identify and check off best practice tasks as they are performing simulations (e.g., mock surveys), inspections, testing, and other miscellaneous tasks related to compliance. The best practices database 218 can store a variety of data associated with best practices for complying with various standards and regulations for different types of facilities and different locations. Once best practice tasks are completed by facility personnel, datasets can be stored in the best practices database 218 to help log work history records and meet compliance documentation requirements. The data stored in the best practices database 218 can include the name of the person or the names of the people that completed the work, the date the work was completed, pass/fail records, the location where the work was performed, and a detailed summary of the work that was done that is formatted to align with various specifications as defined by different regulations. The best practices database 218 can be used to maintain a best practices library including one or more tasks for each testing, inspection, and maintenance requirement associated with different compliance inspections such as CMS surveys and Joint Commission surveys.

The best practices database 218 can include knowledge built up from industry experts and state surveyors that can be used to create a library of life safety tasks and materials that can be tailored to different facility compliance standards. Tasks can be structured with the best practices database 218 to drive compliance with NFPA 101 standards, for example. Users can rely on the best practices database 218 to manage changing regulations and complex life safety code with expertise delivered in simplified explanations and checklists (e.g., from different entities such as the Joint Commission, CMS, the American Health Care Association (AHCA), the Occupational Safety and Health Administration (OSHA), etc.). As more and more facilities input data into the document generation system 202 and/or the maintenance management system 204, the data for a variety of facilities (e.g., tens of thousands of facilities) can be used such that best practices database 218 can provide more and more accurate recommendations regarding how long certain tasks should take, how tasks should be prioritized based on trends with citations, surveyors, risk, continuum of care, etc. The best practices database 218 can be used to track changes in public code as well as changes in citations and surveyor interpretation of code in order to modify the feedback loop for users and place higher priority and specific tasks and instructions that need adjustments.

The best practices database 218 can be leveraged to provide an interactive reporting dashboard user interface that provides regional and corporate oversight into facility performance on tasks and recommended training courses. The dashboard can highlight overdue and missed instances and weekly scorecards can be automatically sent (e.g., emailed) to supervisors, among other possible reporting functionality. The best practices can be presented in various forms to different users via user interfaces, such as a prioritized task list user interface presented to maintenance personnel to follow and enter designated inputs that can then be logged and used in the generation of compliance documentation. The user interface can also present instructions for explaining how to follow best practice tasks (e.g., including a video explanation, text explanation, etc.). The instructions can be tailored to the specific equipment and standards for a given facility. Moreover, the best practices database 218 can be leveraged to generate logbook documentation that can be included in compliance documentation. Additional best practice tasks can be added to the best practices database 218 and changes can be made to existing best practice tasks in the best practices database 218 responsive to changing regulations.

An example of a best practice task is the weekly exercise of a generator with no load, where routine checks on the generator should be performed and entries should be created in the best practices database 218 that comply with CMS K-Tag 918 and E-Tag 0041. The data logged in this example can include the make, model, serial number, and location or the generator, as well as generator readings specific to a start time, end time, main fuel level, dry tank fuel level, water temperature, radiator water level, battery water level, lubricating oil level, oil pressure, belts/hoses, and battery powered lighting. Another example of a best practice task is the weekly testing of the operation of doors, locks, gates, and alarms complying with CMS K-Tag. In this example, the data logged can include the date, location, a pass/fail record, and a corrective action taken in response to a failure. Yet another example of a best practice task is the annual inspection of fire doors in a facility. In this example, the best practice can include qualifying users to perform the annual inspection responsive to watching a training video. After completing the training video, a training certificate can be generated and included in the data logged for the task. The training certificate can include a date the training was completed and the name of the trained staff member. The best practice task can also provide for a digital signature entry (e.g., via a touch screen interface) or uploading of a signed document (e.g., captured with a camera integrated with a mobile computing device, such as a smartphone or tablet).

Still a further example of a best practice task is the monthly performance of a fire drill with an uploaded copy of a drill signature sheet that complies with CMS K-Tag 712. The data logged in this example can include a date, a start time, an end time, a location, a person that initiated the drill, participants of the drill, response time, details regarding a 911 follow-up call, resident headcount, staff headcount, visitor headcount, equipment functional statuses, visible audio device statuses, fire panel performance, fire/smoke damper performance, ventilation system shut down status, corrective actions, external weather conditions, remarks/comments provided by the person that initiated the drill, etc. In this example, users can upload signed sheets or provide digital signatures (e.g., via a touch screen interface) after completing the drill to meet requirements.

Figure 2C:
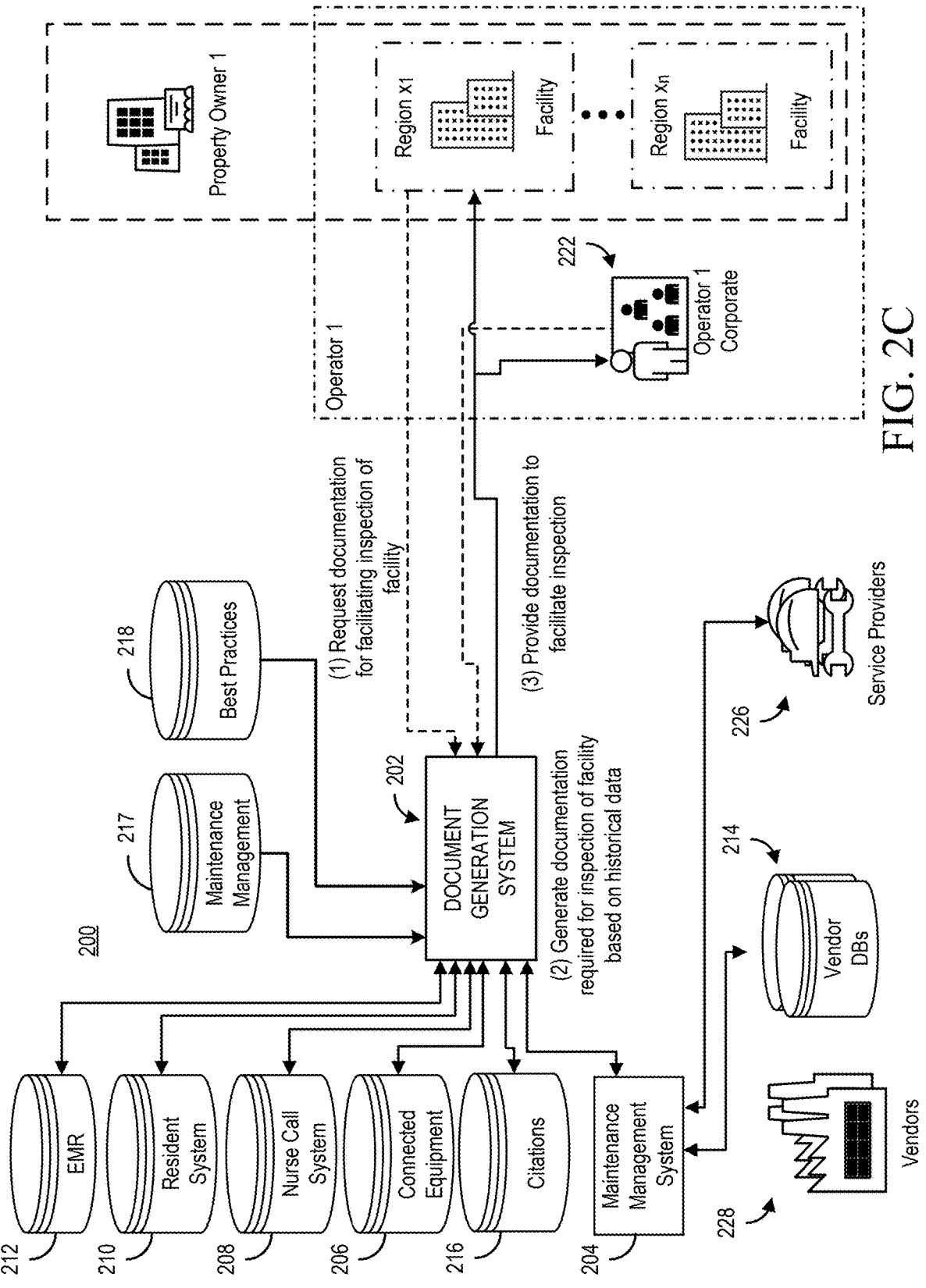
FIG. 2C shows another block diagram illustrating further components of the system for automatically generating compliance documentation for facilities associated with various operators and property owners of FIG. 2A, in accordance with some aspects of the disclosure.

FIG. 2C shows yet another illustration of the example system 200 including data flow for requesting compliance documentation. As shown, a request for documentation for facilitating inspection of a facility (e.g., a compliance inspection) can be submitted by the first operator 222 to the document generation system 202. Then, the document generation system 202 can generate documentation (e.g., compliance documentation) that is required for inspection of the facility based on historical data from the various data sources described herein. Finally, the document generation system 202 can provide the generated compliance documentation back to the first operator 222 such that the first operator 222 can use the compliance documentation to facilitate the inspection of the facility.

The outputs generated by the document generation system 202 and/or the maintenance management system 204 based on the data retrieved from the various data sources including the connected equipment database 206, the nurse call system database 208, the resident system database 210, the EMR system database 212, the citations database 216, the maintenance management database 217, the best practices database 218, the one or more vendor databases 214, one or more databases maintained by the document generation system 202 and/or the maintenance management system 204 (including a purchasing system database), and/or other types of databases containing data generated by different systems can take various forms. For example, the outputs can include a mock (simulated) survey and associated report, automatic optimization of maintenance tasks and other types of tasks, automatic document generation (e.g., compliance documentation), citation data feedback, automatic generation of plans of correction, actual data corrections made by entities in response to code changes, purchasing system actions, enhancement of quality input recognition functionality and document recognition functionality, reduction of insurance premiums, and other potential outputs such as described throughout the disclosure.

Users can perform mock survey exercises using the document generation system 202 and/or the maintenance management system 204 designed to mimic an actual compliance inspection (survey). The mock survey can be used to gauge the compliance with different standards (e.g., NFPA standards) and in turn address different areas at risk for citation. Users of a certain level (e.g., facility administrator or regional) can have access to such functionality allowing them to run an analysis or a report at any time, thereby providing an easy way to spot check performance with or without providing any notice to the maintenance team. The document generation system 202 can use a rules engine (e.g., compliance logic) including rules developed based on one or more standards to generate documentation in a format that draws attention to non-compliant sections. For example, a mock survey report can identify potential compliance gaps that could result in CMS citation tags (e.g., K-Tags) that need action, similar to a report card. The document generation system 202 can provide recommendations on how to address compliance gaps in prioritized order based on factors such as the risk of citation, cost, continuum of care, and other factors. The user can receive several prioritized options to address different conflicts including internal training and performance of inspection activities, quick replacement parts or products, and dispatching of technicians.

As facility personnel and/or the service providers 226 take action to address identified compliance gaps, the document generation system 202 can automatically document the actions to fill in compliance gaps and bring the facility closer to compliance. Different types of users (e.g., executive directors, regional users, corporate users, maintenance director, etc.) can subscribe to receive notifications on compliance gaps, including notifications indicating when gaps have been resolved, thereby enabling proactive monitoring of compliance activities. Different user interfaces provided by the document generation system 202, such as detailed below, can provide visibility into facility performance with respect to addressing compliance gaps and results of an actual compliance inspection. The user interfaces can include, for example, a dashboard that displays counts or percentages of the current identified unaddressed gaps or the identified unaddressed gaps over a specified time period.

The document generation system 202 can store historical recommendations and measure success over time based on actual citations received by the facility. Tasks can be prioritized and assigned based on a variety of different factors. For example, the document generation system 202 can use associated citation(s), survey windows, citation trends, surveyor trends, geographical trends, current staffing levels, staffing certifications, staffing expertise, effect on levels of care, potential for evacuation, preparedness, cost of using internal staff compares to external service providers, number of issues identified, ability to address issues simultaneously, corporate standards and approvals, effort to address compliance gaps, and/or other data and factors. The document generation system 202 can also generate purchase orders that can be placed with the vendors 228 to address identified compliance gaps. The maintenance management system 204 can offer customizable NTEs that allow companies to designate when approval is needed if a purchase order hits a certain threshold dollar amount. The maintenance management system 204 can send automated notifications to the maintenance team (or a separate designated approval user) to inform them of the NTE allowing them to either approve or decline the purchase.

The document generation system 202 can perform pattern recognition on various inputs provided by different users (e.g., inputs typed into tasks and logs by staff) to determine whether inputs fall inside or outside of an expected range. If an output falls outside of an expected range, the document generation system 202 can determine that staff might be "pencil whipping" or otherwise not performing tasks in an appropriate manner. The document generation system 202 can also look for repeat inputs that can have been copy and pasted and can not be accurate. Different users such as administrators, regional users, and corporate users can subscribe to notification such that they are notified when poor input quality is detected by the document generation system 202 so the issue can be addressed at the facility level to reduce the risk of compliance violations for the facility. Similarly, the document generation system 202 can perform quality recognition on physical documents that are uploaded to the document generation system 202 to identify incorrect or improper document uploads, flag unrecognizable documents, and recognize and pull key data from documents. The notification can include a report displaying the count or percentage of detected incorrect, improper, or unexpected inputs, and/or uploaded documents by user or facility. The report can also be displayed in a dashboard, for example.

Moreover, the document generation system 202 can be used to reduce insurance premiums for facilities. The output documentation provided by the document generation system 202 can be provided to insurers to demonstrate compliance with various regulations and therefore lower insurance risk for facilities. Insurance companies can use risk score modeling to determine insurance premiums for facilitates and, if facilities cannot properly document various activities related to maintenance and general facility operation, the end result can be higher insurance premiums. For example, the document generation system 202 can be used to document things like type and age of roofing, parking lot, and windows, risk hazard assessments (e.g., likelihood of a flood, hurricane, wildfire, etc.), maintenance and repair activities, and other operational parameters of facilities.

Referring now to FIG. 2A-2C, the compliance management system can enable automated ranking and prioritization of compliance recommendations via a template-generation model and enforcement model. The system can include a template-generation model configured to ingest the code of data standards and output a data template that ranks the data-alignment recommendations according to first ranking scores. Complementing this component is an enforcement model that consumes historical enforcement data, updated historical enforcement data, or historical enforcement data input (e.g., inspection reports, penalty notices, and regulator surveyor notes), to produce a penalty matrix. The penalty matrix contains weights corresponding to predicted data-enforcement procedures likely to be initiated by the governing authority against a given entity for a given data standard.

The template generation model is configured to process both the current and updated version of the code of data standards. When a code change is detected—such as an amendment, addition, or deletion of a rule—the model compares the updated version with the prior version to identify affected data standards. The model then generates revised data alignment recommendations, which are sorted according to a revised ranking that reflects the impact of the code change on each entity's risk profile.

A "change" in the code of data standards, as referenced herein, can be defined as any modification—whether an addition, deletion, or revision—that substantively affects the requirements, obligations, or procedures applicable to an entity's operations. The compliance-management platform can detect such changes by comparing an updated version of the code with a previously stored version using a hybrid comparison algorithm that combines syntactic diffing and semantic analysis. For instance, the platform can first apply a line-by-line diff engine to identify textual edits, and then use a semantic similarity threshold (e.g., cosine similarity below 0.85) to flag changes that alter the meaning or compliance impact of a provision. As a concrete example, if the original code required "weekly staff training on infection control" and the updated code specifies "bi-weekly staff training on infection control and PPE usage," the system can detect both the frequency change and the addition of PPE requirements as substantive changes, triggering updates to the relevant data-alignment recommendations for susceptible entities, or a set of susceptible entities, in the data template.

Upon receiving notification of an updated data standard, the system can identify similar data standards by employing a similarity model. The similarity model can receive data standard input and can output similarity scores that quantify the degree of similarity between the updated data standard and other standards in the system. These similarity scores can enable the system to focus its analysis on standards that are most likely to be affected by the update, thereby improving the relevance and accuracy of subsequent recommendations.

Ranks within the data template can be assigned by the template-generation model based on a calculated risk metric for each entity and data standard. The risk metric can incorporate both the likelihood that a data enforcement procedure will occur and the severity of potential enforcement actions, where likelihood can be quantified as a probability score and severity can be quantified based on penalty magnitude, regulatory impact, or other relevant factors.

The risk metric can be derived from historical enforcement data and penalty matrix weights, which can reflect the frequency and/or severity of past penalties. In some implementations, the risk metric can be compared against a given threshold (e.g., an enforcement threshold). The mathematical relationship between risk and rank can be such that higher risk scores, reflecting both high likelihood and/or greater severity, correspond to higher (i.e., more urgent) ranks in the data template.

For example, if Entity A has a 0.75 probability of receiving a citation for infection control and Entity B has a 0.40 probability for the same standard, the recommendation for Entity A can be assigned rank 1 and for Entity B rank 2. If a change in the code increases the risk for Entity B—such as a new requirement for PPE documentation—its likelihood score can rise to 0.80, resulting in Entity B's recommendation moving to rank 1 and Entity A's to rank 2. This dynamic reordering ensures that the most at-risk entities and standards, considering both likelihood and severity, are prioritized for compliance action in response to regulatory changes.

Figure 2D:
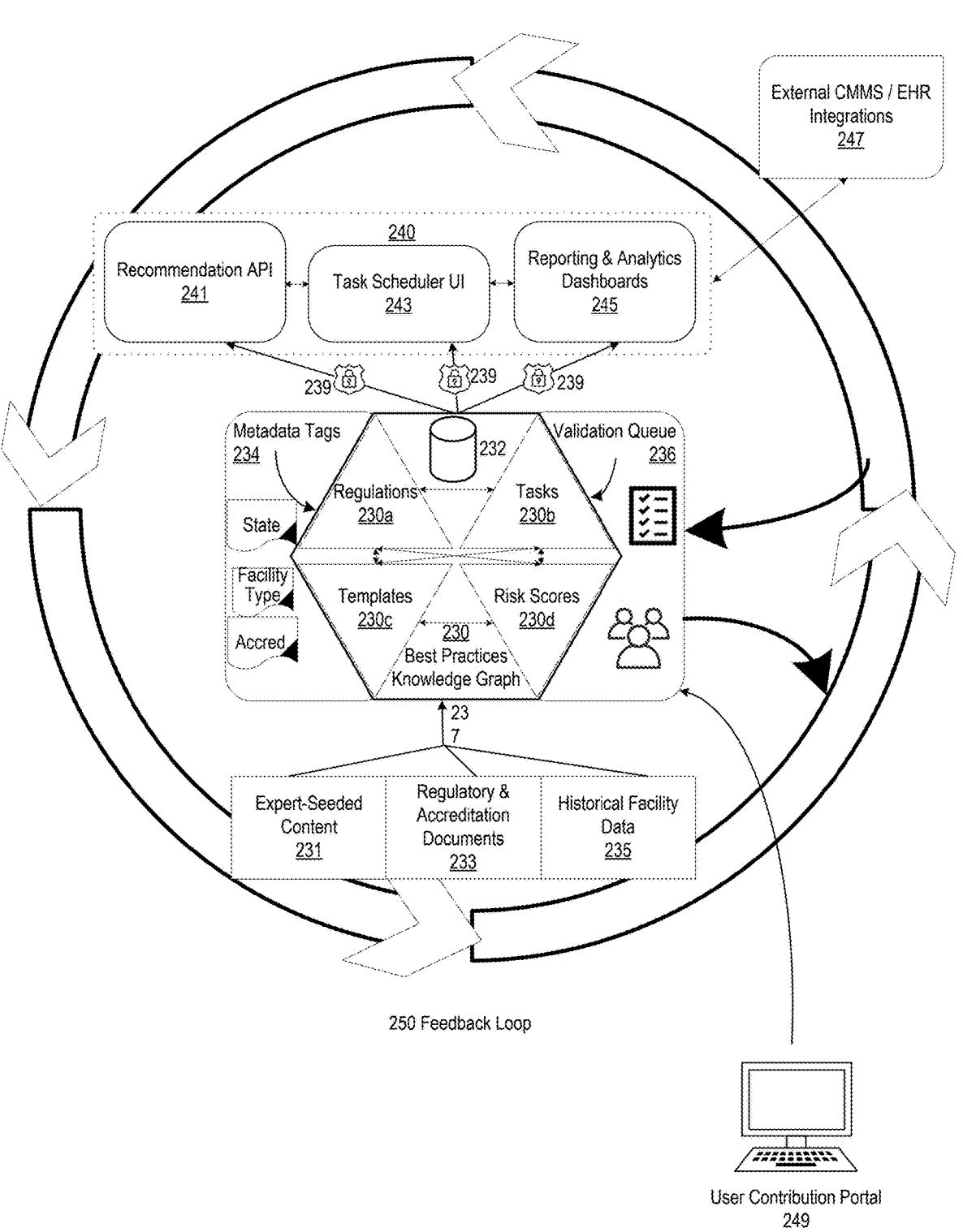
FIG. 2D shows a block diagram illustrating an example best practices knowledge graph, in accordance with some aspects of the disclosure.

FIG. 2D shows a block diagram illustrating an example best practices knowledge graph 230, in accordance with some aspects of the disclosure. The best practices knowledge graph 230 can exist as a core layer in a larger system, as illustrated by the figure, where it is configured to receive data from data sources, for example, Expert-Seeded Content 231, Regulatory & Accreditation Documents 233, and Historical Facility Data 235.

In some implementations, the best practices knowledge graph 230 is architected as a directed, multi-layered graph structure, enabling granular connections between nodes representing regulations 230a, tasks 230b, templates 230c, and risk scores 230d. Links in the graph 230 can include directional, representing workflows or dependencies (e.g., regulation→task→outcome), and the multi-layering can permit encapsulation of complex relationships (e.g., hierarchical risk models, exceptions, or jurisdictional overlays). For example, in a hospital setting, a compliance workflow for infection control could begin at a regulatory node for CMS guidelines, flow to a task node for hand hygiene checks, and connect to outcome nodes recording monthly audit results supporting both traceability and real-time analytics. As new compliance data types (such as policy exceptions or educational modules) emerge, the multi-layered graph architecture can enable seamless insertion and cross-linking without disrupting existing structure.

The best practices knowledge graph 230 can aggregate and structure data coming from diverse sources, including expert-seeded content 231, regulatory and accreditation documents 233, and historical facility data 235. Expert-seeded content 231 can include best practice guidelines authored by clinical experts and imported as the initial rules for a healthcare compliance system, ensuring domain expertise forms the basis for subsequent recommendations.

In some implementations, expert-seeded content 231 forms an initial, authoritative layer of the knowledge graph 230. To ensure provenance and authoritative tracking, each best practice guideline or workflow contributed by subject matter experts can be version-controlled, with metadata capturing the original author, revision date, and rationale for updates. For example, when Joint Commission releases a new standard for patient falls, the compliance officer can update the expert-seeded node and preserve the historical guideline, ensuring later audits can review prior recommendations against their operational context. Version control functionality can also allow rollback of changes if new standards are rescinded, preserving historical compliance accuracy.

These data sources are introduced into the system through an intake process 237, which can support ETL (Extract, Transform, Load) routines as well as NLP (Natural Language Processing) ingestion. These checks can scan for missing entries, anomalous timestamps, and inconsistent formats, flagging problematic records before transformation occurs. Validated data can be assigned a data integrity score, which can be tracked in the audit trail 232. For example, equipment maintenance logs lacking technician signatures receive a lower integrity score and enter a validation queue for review. This preemptive validation can ensure only high-quality data enters the best practices knowledge graph 230, directly supporting reliable analytic outputs.

The ETL component within intake process 237 can be executed through a series of automated or scheduled routines. For example, the "Extract" phase can involve connecting to various source systems—such as internal facility databases, maintenance management records, electronic medical record (EMR) systems, or public regulatory data repositories—using secure APIs, batch uploads, or direct database queries. For example, each night the system could run an extraction script that retrieves facility incident logs and inspection results from integrated databases.

During the "Transform" phase, the intake process 237 can normalize the incoming data formats, cleans inconsistencies, maps fields to the system's schema, and enriches the records with metadata. For example, disparate records regarding equipment maintenance from multiple facilities are standardized to a common format and tagged with metadata such as location, equipment type, and inspection date. The "Load" phase can commit cleaned and mapped data to the system's core data store, which can include the best practices knowledge graph 230. This makes the data available for cross-referencing, analytic processing, and triggering compliance workflows. For example, after nightly loading, new survey results and citations can become searchable and actionable in dashboards or analysis modules.

In addition to structured ETL processing, the intake process 237 can handle unstructured or semi-structured content using NLP ingestion. For unstructured text, the intake process 237 can leverages domain-tuned natural language processing models. Instead of using generic text analysis, regulatory notices or surveyor narrative notes can be parsed using healthcare lexicon models—improving extraction accuracy for compliance tasks. For example, when parsing new CDC COVID guidelines, entity recognition algorithms map terms like "isolation protocol" directly to graph nodes in regulations 230a, tasks 230b, and templates 230c. To ensure terminological consistency, metadata tags 234 extracted from documents can be algorithmically validated against standardized regulatory dictionaries (such as state code repositories), preventing misclassification and supporting precise filtering during operational queries. For example, the intake process 237 can parse documents (e.g., regulatory notices, accreditation manuals, or surveyor narrative notes). The intake process 237 can employ NLP models to extract compliance requirements and actionable tasks from uploaded PDFs of new government guidelines. Named entity recognition and phrase extraction algorithms identify key regulatory sections, deadlines, and responsible departments from the text, mapping them to the corresponding sub-nodes in the knowledge graph (e.g., regulations 230a and tasks 230b).

The intake process 237 can support manual entry through user interfaces that allow staff to contribute context-specific data, scan surveyor notes, or upload historical documents directly into the system. These inputs are again subjected to transformation and enrichment—either through automated metadata tagging or NLP-driven classification—before being loaded into the core repository for the best practice knowledge graph 230. Manual data entry, supported by intake process 237 user interface modules, can incorporate real-time validation prompts. For example, when staff upload surveyor notes or historical citations, the form can automatically check for missing fields, incorrect formats, and logical inconsistencies before submission. For example, if a compliance manager omits the inspection date for a fire drill, the UI can flag the omission and require correction before allowing the upload, improving the accuracy and completeness of manually contributed compliance records.

The intake process 237 can be scheduled to run to continually refresh the best practices knowledge graph 230 with the latest audit findings and data from facility logs, or it can be manually triggered by compliance managers when substantial new regulatory requirements are published. For example, to address high-volume data environments, the intake process 237 can support incremental ETL updates. Only new or changed records can be processed in each refresh cycle, dramatically improving system performance and reducing redundant load on storage and compute resources. In some implementations, nightly ETL runs in large hospital chains can ingest only new incident logs or updated policy documents since the previous cycle, optimizing bandwidth and accelerating the update of the best practices knowledge graph 230.

The best practices knowledge graph 230 can include sub-nodes, which in some implementations include regulations 230a, tasks 230b, templates 230c, and risk scores 230d. These interconnected components serve as the building blocks for actionable compliance management. For example, regulations 230a can store links to specific state healthcare statutes, while tasks 230b could represent routine safety checks scheduled by the system, and templates 230c can detail standardized forms used for incident reporting within the facility. Risk scores 230*d*, calculated from historical incident data 235, can allow managers to prioritize compliance actions based on real-time risk assessments. The best practices knowledge graph 230 can be architected for extensibility, allowing the addition of new node types. Beyond standard regulations 230*a*, tasks 230*b*, templates 230*c*, and risk scores 230*d*, the schema can support insertion of nodes for compliance learning modules, policy exceptions, or emergent risk factors. For example, when a new cybersecurity risk emerges, the best practices knowledge graph 230 can add a "cyber alert" node linked to all affected regulatory and operational processes, ensuring rapid dissemination and workflow adaptation.

To ensure the integrity and traceability of updates within the knowledge graph 230, the system can include an audit trail 232. In some implementations, the audit trail 232 provides robust version control, so updates or recommendations—such as a change prompted by new government guidelines—can be logged with a timestamp and the source of the modification. This is critical for regulated industries where compliance history can be subject to inspection. In some implementations, the audit trail 232 tracks not only data changes, but also granular user actions (e.g., creation, update, deletion, annotation). Each recommendation update can be logged along with user credentials, timestamps, and contextual metadata. For example, when a compliance officer edits a protocol based on a new regulation, the audit trail can record the action for future review or external audits—supporting transparency and accountability for regulated institutions.

Additionally, metadata tags 234 are integrated throughout the knowledge graph 230 to support dynamic tailoring of recommendations. Metadata tags 234 can affect how the best practices knowledge graph 230 dynamically tailors recommendations for individual entities across a compliance network. For example, each node in the knowledge graph 230 can be systematically assigned one or more metadata tags by embedding structured attributes—such as entity type (e.g., similar entity types, or entity characteristics), jurisdiction, and oversight body. Metadata tags 234 can be assigned as indexed properties directly within the node during creation or update, using automated extraction and mapping from source documents and facility profiles to support precise filtering and contextual recommendations. Metadata tags 234 can capture essential attributes, such as the type of entity (e.g., skilled nursing facility, hospital, assisted-living center), jurisdictional scope (federal, state, local), and identifiers for relevant oversight bodies (for example, CMS or Joint Commission). Metadata tags 234 can employ hierarchical structures to enable granular filtering of graph nodes. Rather than simple flat tags, facility types or jurisdiction labels can be sub-categorized (e.g., hospital→pediatric→critical care). During compliance queries, the best practices knowledge graph 230 can compare these layered attributes against facility profiles, surfacing only the most contextually relevant recommendations.

In some implementations, metadata tags 234 are directly embedded in the data structure of nodes within the best practices knowledge graph 230. As a result, recommendations or actionable items in the graph can be contextually bound to scenarios or entities to which they apply. When a facility profile is created—consisting of its type, geographic location, capacity, regulatory requirements, and relevant accrediting authorities—the system can use these profile attributes to filter the knowledge graph nodes. The inference engine can then systematically compare the facility's characteristics against the metadata tags of each node, rapidly selecting only those recommendations that exactly match the facility's context.

For example, consider a compliance recommendation for "Monthly Fire Drill Documentation" assigned to a node in the graph. The metadata tags on this node may include entity type (e.g., skilled nursing facility), location (e.g., California), oversight body (e.g., California Department of Public Health), and accreditation requirement (e.g., Joint Commission). When the system profiles a facility meeting all these criteria, the corresponding recommendation is surfaced, while nodes from the best practices knowledge graph 230 lacking this match are excluded from consideration. In this way, metadata tags 234 guide the automated, precise mapping of compliance recommendations to each facility's unique regulatory landscape.

Metadata tags 234 can include properties such as facility type (e.g., "Acute Care Hospital"), state (e.g., "California"), or specific accreditation (e.g., "Joint Commission"), enabling the system to deliver customized recommendations suited to each operating environment. For example, when a policy update applies only to pediatric facilities in Florida, the metadata tags ensure the update impacts only the relevant nodes.

Quality control is enhanced by the inclusion of a validation queue 236, allowing subject matter experts to review proposed changes to the knowledge graph prior to publication. In some implementations, updates submitted to this queue 236 can originate from a user contribution portal 249, which empowers staff to flag outdated practices or suggest improvements based on field experience—such as submitting an enhanced emergency checklist after an actual incident. In some implementations, the validation queue 236 is designed for collaborative expert review. Proposed changes (e.g., updated emergency protocols or suggestions from staff via the contribution portal 249) can be annotated, commented on, and debated by multiple subject matter experts before approval. For example, after an incident, two emergency nurses and a compliance manager can jointly review and annotate a new fire safety checklist proposal, with all discussion and annotations retained for audit trail provenance.

Once validated, the best practices knowledge graph 230 is operationalized for real-time queries 239 to a service layer 240. As used herein, "operationalized" means that the knowledge, standards, or recommendations from the best practices knowledge graph 230 can be transformed into specific, executable actions—such as tasks, procedures, or workflows—that can be performed, tracked, and managed directly by users through a platform, ensuring that abstract compliance rules are put into real-world practice and monitored for completion. In addition to providing task schedules and recommendations, the service layer 240 can issue notifications or alerts when compliance actions are overdue or incomplete. For example, if fire drill documentation is not uploaded by the scheduled deadline, the system can flag the noncompliance and notify responsible staff through the task scheduler 243 and analytics dashboard 245*d*. This automated alerting promotes timely adherence to regulatory requirements. For example, a compliance officer can use real-time queries 239 to ensure current role-based access control meets the latest cybersecurity protocols, referencing regulatory requirements automatically ingested into the graph. The service layer 240 connects the knowledge graph with practical interfaces, such as a recommendation API 241 for delivering prioritized interventions, a task scheduler UI 243 for assigning compliance responsibilities, and reporting and analytics dashboards 245*d* that visualize performance trends and risk profiles over time.

In some implementations, interoperability is supported by service layer 240 connections to external CMMS (Computerized Maintenance Management Systems) or EHR (Electronic Health Record) systems 247. This allows, for example, a hospital's asset management platform to sync maintenance schedules with emerging regulatory requirements captured in the knowledge graph 230, using REST protocols or webhooks for seamless data exchange. The service layer 240 can support interoperability by featuring an adapter layer that translates between external system formats (e.g., EHR, CMMS, asset management). When a hospital's maintenance management system tracks equipment repairs in a proprietary format, the adapter layer can convert these records into standardized schema for integration into the best practices knowledge graph 230. This ensures compliance data is consistently captured and actionable across diverse IT infrastructures.

Continuous improvement is achieved through a feedback loop 250 that harnesses an auto regulatory monitor for daily scrape and difference operations. This mechanism compares incoming data with existing knowledge nodes, identifying discrepancies and incorporating validated changes directly into the graph. For example, if a new OSHA guideline is detected online overnight, the feedback loop 250 ensures the system not only updates the relevant regulatory node, but also generates a new compliance task and updates reporting templates, thus keeping the facility's protocols aligned with the most current standards.

A best practices knowledge graph stores recommended compliance actions and their relationships to underlying standards. The disclosed technology can employ a data-alignment knowledge repository (DLKR) stored in memory of the compliance-management platform. In some implementations, the DLKR maintains a structured collection of data-alignment recommendations that are each mapped to one or more provisions of a code of data standards applicable to healthcare-facility entities. The repository organizes the recommendations by regulatory framework, facility type, and jurisdiction so that the platform can produce a targeted data template for a given entity operating within the dispersed network. Individual recommendations cover activities such as equipment-maintenance schedules, documentation checklists, staff-training protocols, and procedural safeguards that align the entity's operational data with the governing code of data standards.

The DLKR can be implemented as a knowledge graph whose nodes represent individual data-standard clauses and higher-level compliance topics, and whose edges encode relationships among the corresponding data-alignment recommendations. Parent nodes can denote umbrella regulatory sections, while child nodes denote specific tasks required for alignment. Edge semantics include: (i) causal links between misalignment and potential data-enforcement procedures, (ii) temporal dependencies defining recommended execution order, and (iii) prerequisite links identifying tasks that must be completed prior to others. Traversal of this graph enables the platform's template-generation model to surface interconnected requirements spanning multiple operational domains of a healthcare entity and to flag latent conflicts or gaps.

Each node in the knowledge graph carries metadata tags that reference (a) entity-type categories (e.g., skilled nursing facility, hospital, assisted-living center), (b) jurisdictional scope (federal, state, local), and (c) oversight body identifiers associated with the corresponding portion of the code of data standards. These tags allow the platform to filter the DLKR quickly when constructing an entity-specific data template so that only recommendations relevant to the entity's operational context are ranked by the template-generation model.

A facility profile—comprising entity type, geographic location, capacity metrics, and accreditation obligations—is compared against the metadata tags to select candidate recommendations. The comparison is executed by the platform's inference engine so that the resulting first ranking scores reflect only those recommendations whose tags match the facility profile. Size-based metrics in the profile (e.g., bed count, staffing levels) further refine the candidate set, and accreditation fields constrain the selection to oversight bodies governing the entity.

The DLKR supports a modular architecture in which discrete regulatory modules correspond to distinct oversight bodies named in the code of data standards. An entity can activate a Centers-for-Medicare-and-Medicaid-Services module, a Joint-Commission module, or any combination thereof. Each module bundles its own cluster of knowledge-graph nodes, documentation templates, and procedural guidance. Independent module updating allows the platform to incorporate revisions to one regulatory framework without disturbing other modules or requiring wholesale retraining of the template-generation model.

The platform further exposes an administrator configuration interface through which entity personnel append supplemental attributes—such as the absence of on-site pharmacy services, reliance on external laundry providers, or possession of specialized medical devices—to the facility profile. These attributes dynamically update the metadata-tag filtering described above, thereby ensuring that the updated data template generated for the entity accurately reflects its individualized operational constraints and removes recommendations that are inapplicable. The interface presents contextual guidance explaining how each selected attribute modulates the resulting set of data-alignment recommendations.

Figure 2E:
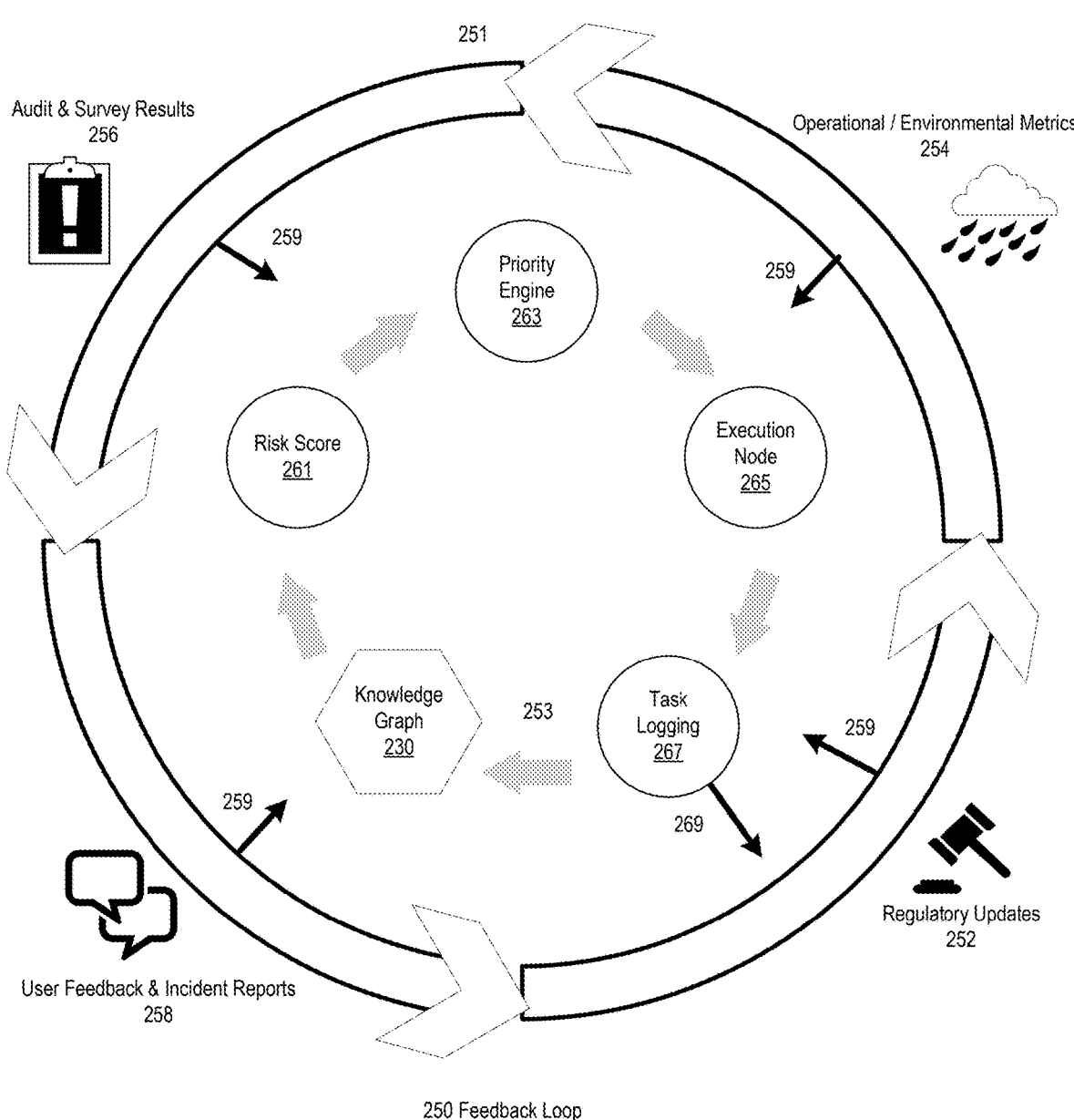
FIG. 2E shows a block diagram illustrating an example feedback loop of a best practices knowledge graph, in accordance with some aspects of the disclosure.

FIG. 2E shows a block diagram illustrating an example feedback loop 250 of a best practices knowledge graph 230, in accordance with some aspects of the disclosure. This feedback loop is designed to support adaptive, data-driven compliance management in dynamic operational environments. The loop is composed of two main cycles: a data intake cycle 251 and a knowledge graph update cycle 253.

The data intake cycle 251, represented as the outer circle, can collect data from a diversity of sources that are crucial for keeping compliance recommendations relevant and effective. In some implementations, these sources include Audit & Survey Results 256, Operational or Environmental Metrics 254, Regulatory Updates 252, and User Feedback & Incident Reports 258. For example, Audit & Survey Results 256 can involve the ingestion of annual regulatory compliance surveys completed at a healthcare facility, which may highlight areas such as emergency preparedness deficiencies. Operational or Environmental Metrics 254 can capture real-time data streams like staffing levels, equipment work orders, or localized weather events—such as receiving a notification if a nursing unit falls below minimum staffing thresholds due to unplanned absences. Regulatory Updates 252 can include the automated intake of new or amended standards from agencies such as CMS; for example, the system can detect when CMS updates infection control protocols and triggers new recommendations. User Feedback & Incident Reports 258 can record staff-reported incidents—concretely, a nurse submitting a report about a medication administration error, which the system uses to highlight potential process gaps.

The ingestion of this data is managed through an upload process 259. In some implementations, the upload process 259 can support real-time updates for critical incidents, nightly batch uploads of recurring metrics, or manual entry by compliance managers. For example, a safety officer can immediately upload a fire code violation report after an incident occurs; at the same time, automated surveys and regulatory updates are batched overnight to ensure that recommendations remain current. Within the upload process 259, automated file format recognition can allow the feedback loop 250 to detect and convert a variety of document types, including scanned paper records, PDFs, and images. For example, when a technician scans a handwritten inspection log, the loop 250 can detect the type, extracts structured details via OCR, and normalize the record for storage in the knowledge graph 230. This promotes inclusivity for legacy data sources and paper-based compliance documentation.

Once data is collected, it informs the inner knowledge graph update cycle 253. The knowledge graph update cycle 253 can include one or more specialized nodes, each contributing to the operationalization and refinement of recommendations. The risk score node 261 quantifies risk using methods (e.g., Weighted-Sum Scoring, or Bayesian Risk Models). For example, if successive audit results indicate frequent infection-related citations, the risk score node 261 can elevate infection control priorities across similar facilities. The priority engine 263 employs optimization solvers (e.g., Linear Programming solver, integer programming, mixed-integer programming solver, greedy algorithm, constraint programming solver, or multi-objective solver) to generate a ranked order of compliance tasks, factoring in urgency and resource availability. For example, after a rise in documented slips and falls, the priority engine can move floor safety checks to the top of the dynamic schedule. The execution node 265 translates these priorities into specific action items and schedules tailored to each facility. The task logging node 267 records task completion and captures outcome data, for example, by logging that monthly fire drills have been conducted, including the date, participants, and any corrective follow-up required. These solvers can model the scheduling process by assigning each task variables representing urgency—like regulatory deadlines or imminent inspections—and constraints, including staffing, budget, or equipment limits. For example, a mixed-integer programming (MIP) solver can maximize overall risk reduction while ensuring scheduled tasks do not exceed the facility's weekly available staff hours. Constraint programming can enforce dependencies, such as requiring prerequisite training before a procedure can be implemented, while multi-objective solvers can simultaneously minimize compliance risk and operational costs. Heuristic methods can enable rapid, real-time scheduling by prioritizing tasks with imminent deadlines and grouping those with similar resource requirements for efficiency. For example, the system can employ a genetic algorithm (a multi-objective solver) to evolve task schedules that minimize predicted citation risk while adhering to budget and workforce constraints, dynamically updating priorities as new data is ingested.

Outcomes from the task logging node 267 can reciprocally inform the data intake cycle 251 by providing real-time, structured feedback on the completion and effectiveness of compliance-related tasks. As facility personnel complete and log various activities—such as equipment inspections, employee training, or regulatory corrective actions—the platform can record essential details like pass/fail outcomes, timestamps, the staff responsible, and supporting documentation. This comprehensive outcome data becomes a valuable input for the data intake cycle 251, enabling the platform to aggregate and normalize information along with other operational and regulatory data sources. For example, if the task logging node records repeated failures in weekly generator tests, this information is directly fed into the data intake cycle, prompting the system to flag a heightened compliance risk related to emergency preparedness. As a result, subsequent recommendations can prioritize generator maintenance and targeted staff retraining. In some implementations, this reciprocal, closed-loop feedback ensures the intake cycle remains continuously updated with real-world operational results, allowing the platform to dynamically refine risk assessments, adjust priority scores, and generate more accurate, evidence-based compliance recommendations.

In some implementations, the execution node 265 and task logging node 267 can enforce geolocation stamping and verification of compliance actions. For example, when a staff member completes an emergency lighting check, the submission interface captures the physical location via GPS and cross-verifies against supporting documentation (e.g., timestamped photos), ensuring actions are precisely logged and spatially validated. This feature supports thorough compliance verification, especially in geographically distributed facilities.

The feedback loop 250 can allow outcomes from executed interventions to further refine the recommendations and improve the underlying knowledge base. For example, if auditing and logging show that revised hand hygiene protocols consistently reduce infection rates, the system can leverage these results to elevate related process improvements in future dynamic task lists. In some implementations, model retraining is automatically initiated at regular intervals or triggered by significant new findings, thus maintaining the adaptive accuracy and relevance of the compliance recommendations provided.

In some implementations, the task logging node 267 and the data intake cycle 251 enable automatic export of feedback data to external regulatory authorities via secure APIs or standardized data feeds. For example, after completing a CMS-required monthly generator test, the outcome can be automatically pushed from the knowledge graph 230 to state health department systems, reducing manual reporting burdens and enhancing transparency.

Model retraining within the feedback loop 250 can be triggered not only by ongoing intake of operational results but also by external events (e.g., annual regulatory updates, release of new standards, or major incident findings). For example, when CMS issues revised guidelines for infection control, the model retraining cycle can be automatically initiated, updating risk scores 230d and generating refreshed recommendation sets without manual intervention.

In some implementations, the feedback loop 250 includes an auto regulatory monitor that conducts daily "scrape and difference" operations to detect compliance-critical changes in external regulatory sources. When a significant discrepancy or urgent update (such as a newly published OSHA standard) is detected, the monitor can trigger alerts to compliance officers, facilitating rapid review and action. The affected regulatory nodes 230a and associated tasks 230b can be updated, and notifications propagated throughout the impacted facilities.

In some implementations, the feedback loop 250 tightly couples the template-generation model and the enforcement model to iteratively adjust recommendations and risk scores using a feedback loop encompassing live data and enforcement outcomes. Initially detected weights can adjust the first ranking scores to obtain adjusted scores—or a new set of adjusted scores, or new sets of adjusted scores—thereby producing an updated data template. As entities respond to the recommendations and as real-world enforcement outcomes accumulate, the historical enforcement data can be refreshed. The enforcement model then recomputes the penalty matrix, and any residual error between successive and previous iterations drives further weight tuning, enabling the platform to converge toward increasingly accurate recommendations and mitigating an initial error.

By integrating the template-generation model, the enforcement model, and the penalty-driven feedback loop, the compliance-management platform can provide each entity with an automated, continuously updated roadmap for maintaining data alignment. The platform's ability to detect changes in the code of data standards, reprioritize recommendations via adjusted scores, and monitor post-remediation enforcement trends materially reduces manual compliance overhead and enhances enforcement-readiness across the dispersed network.

In some implementations, the compliance-management platform includes an enforcement-model feedback loop (EMFL) executed by the feedback loop 250 module. The EMFL continuously refines the penalty matrix and the adjusted scores used by the template-generation model by ingesting two principal data streams: (i) historical enforcement data comprising citation reports issued by a governing authority (e.g., predicted data enforcement procedures, previous remediation efforts, recurring enforcement procedures, or future enforcement procedures), and (ii) operational-telemetry data produced by the entity's facility-management systems.

Citation reports arrive in heterogeneous formats—structured electronic submissions, semi-structured PDFs, and unstructured narrative text captured via optical-character-recognition. The feedback-loop module parses each report to extract (a) the violated data standard, (b) scope and severity ratings, and (c) free-text surveyor observations. Parsed elements are normalized into the historical-enforcement-data store and mapped to corresponding nodes in the data-alignment knowledge repository.

Concurrently, the module streams operational-telemetry data that include staffing ratios, incident-report counts, environmental readings, work-queue completion rates, and asset-maintenance forecasts. These metrics extend the context in which the EMFL estimates the likelihood that a data-enforcement procedure will be initiated against the entity for a given data standard.

In some implementations, the enforcement-model feedback loop (EMFL) can be instantiated as a reinforcement-learning (RL) policy engine in which each data-alignment recommendation operates as an "action" selected from a current policy. Post-survey outcomes yield numerical rewards—positive for citation-free inspections and negative for violations—enabling the RL engine to update its policy coefficients and converge on task sequences that maximize cumulative compliance performance.

To preserve data confidentiality across the dispersed network, an optional federated-learning (FL) layer allows individual entities to train local model replicas on private operational data in some implementations. Only encrypted gradient vectors are transmitted to a central aggregator, which computes a weighted average to produce a privacy-preserving global model subsequently redistributed to the entities.

In some implementations, an anomaly-detection service complements the EMFL by applying unsupervised models—such as isolation forests and autoencoder neural networks—to streaming operational metrics (staffing ratios, incident counts, asset-failure predictions). Spikes in reconstruction error flag latent compliance risks and trigger real-time alerts via the monitoring utilities.

In some implementations, A time-series-forecasting component leverages ARIMA pipelines for linear temporal trends and LSTM recurrent layers for non-linear dependencies. In some implementations, forecasted citation probabilities feed forward into the priority-scoring engine, raising or lowering penalty-matrix weights for future inspection windows.

A collaborative-filtering recommender examines historical remediation efficacy across entities having similar facility profiles. In some implementations, matrix-factorization techniques uncover latent dimensions—such as staffing acuity or infection-control complexity—that correlate with success, thereby personalizing recommendation rankings in the updated data template.

In some implementations, parallel clustering analytics (k-means, hierarchical) can group entities into peer cohorts based on location, service lines, and citation patterns. Within a cohort, the platform automatically propagates high-impact remediation templates while suppressing tasks irrelevant to that cohort's regulatory context.

In some implementations, output vectors from the RL, FL, anomaly-detection, forecasting, recommender, and clustering subsystems are funneled into the penalty matrix as feature channels. Weight-balancing routines normalize the influence of each channel to avoid domination by any single analytical viewpoint.

A priority-scoring engine within the feedback-loop module computes or revises the adjusted scores by applying a weighted algorithm whose factors include risk rating, temporal urgency, and resource availability. Bayesian-network layers within the engine learn conditional-probability tables that capture inter-dependencies—for example, between staffing shortages and infection-control deficiencies—thereby producing more accurate penalty-matrix weights.

To accommodate qualitative inputs (e.g., "moderate cost," "low staff availability"), the engine employs fuzzy-logic controllers that convert linguistic variables into numeric membership values. These values feed into the weighted algorithm so that subjective resource constraints are quantitatively reflected in the updated data template.

When multiple, and sometimes conflicting, objectives must be optimized—such as minimizing compliance risk while limiting budget impact—the priority-scoring engine invokes multi-objective optimization routines. Genetic-algorithm operators (selection, crossover, mutation) evolve task-scheduling populations toward Pareto-optimal solutions, whereas linear-programming solvers offer deterministic alternatives when constraints are strictly defined.

The weighting coefficients that drive the priority-scoring engine are subject to machine-learning refinement across the dispersed network. Reinforcement-learning logic rewards coefficient sets that correspond with successful avoidance of citations and penalizes those that do not, thereby updating the penalty-matrix weights used in subsequent iterations of the EMFL.

Figure 3:
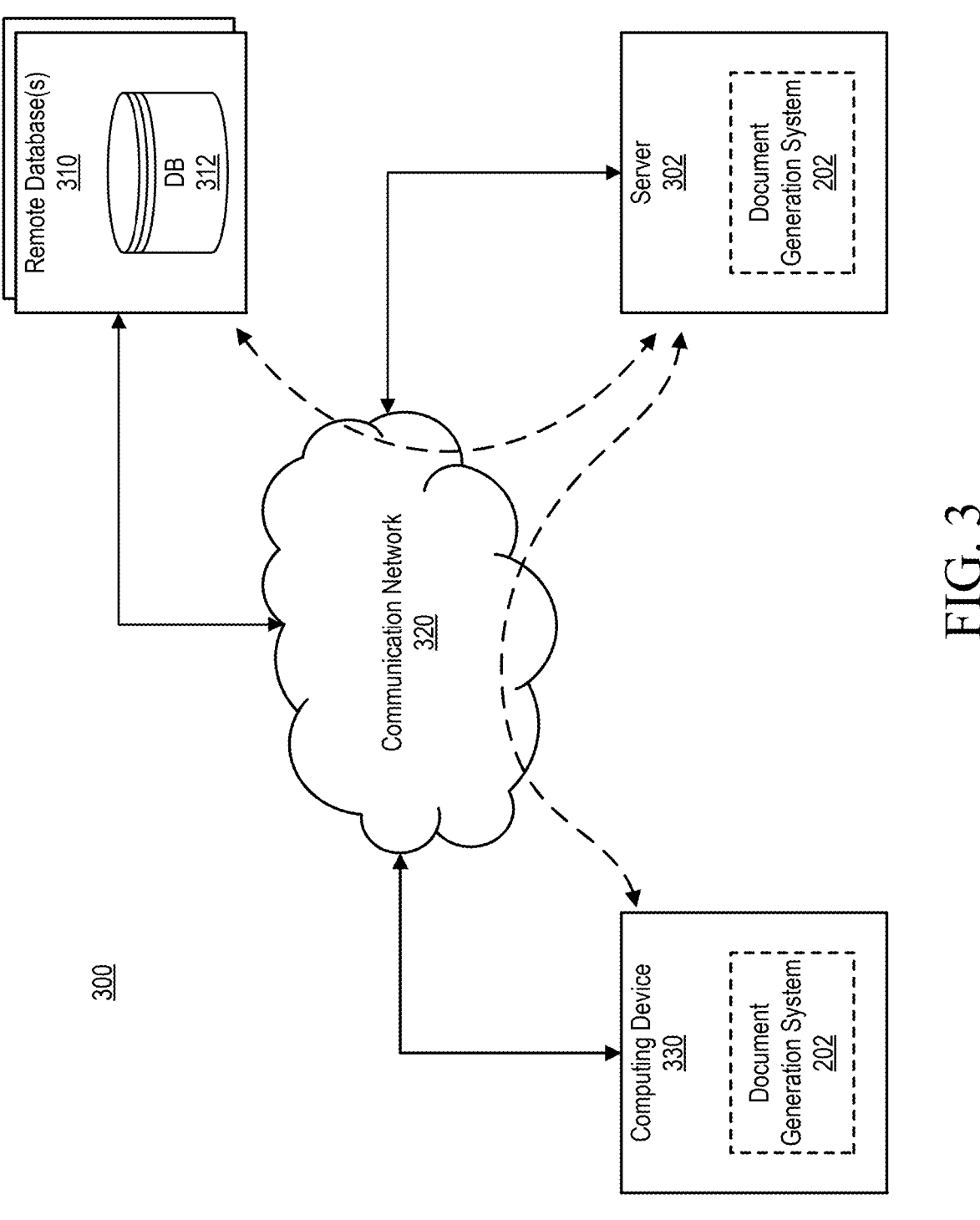
FIG. 3 shows a block diagram illustrating another example system for automatically generating compliance documentation for facilities associated with various operators and property owners, in accordance with some aspects of the disclosure.

FIG. 3 shows a block diagram illustrating an example system 300 for automatically generating compliance documentation for facilities associated with various operators and property owners. The system 300 provides an example hardware and networking implementation of the document generation system 202 described above, however it will be appreciated that the systems described herein, including the document generation system 202 and the maintenance management system 204, can be implemented using a variety of different hardware and networking implementations. As shown in FIG. 3, the system 300 includes a server (or other processing unit) 302 that can execute one or more applications to provide access to the document generation system 202. As noted, the document generation system 202 can be used by facility personnel to automatically generate various types of documents, recommendations, tasks, etc. for assisting facility personnel with compliance with various different regulations and other requirements. The server 302 is shown to be connected to a computing device 330 and one or more remote databases 310 via a communication network 320.

Communication network 320 can be implemented using any suitable communication network or combination of communication networks. For example, communication network 320 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, WiMAX, 5G NR, etc.), a wired network, etc. Communication network 320 can be a local area network (LAN), a wide area network (WAN), a public network (e.g., the Internet, which can be part of a WAN and/or LAN), a private or semi-private network (e.g., a corporate or university intranet), any other suitable type of network, or any suitable combination of networks. Communications links shown in FIG. 3 can each be any suitable communications link or combination of communications links, such as wired links, fiber optic links, Wi-Fi links, Bluetooth links, cellular links, and the like.

Server 302 and/or computing device 330 can be any suitable computing device or combination of devices, such as a desktop computer, a laptop computer, a smartphone, a tablet computer, a wearable computing device, one or more server computers (e.g., in a data center), a virtual machine being executed by a physical computing device, one or more containers executed by a computing device (e.g., a virtual machine, a physical computing device, etc.), etc. The server 302 and/or the computing device 330 can communicate with the database server 310 via the communication network 320. The database server 310 can be configured to manage a database 312 that can include various different information. For example, the database 312 can be the connected equipment database 206, the nurse call system database 208, the resident system database 210, etc. as discussed above. In accessing the document generation system 202, the computing device 330 and/or the server 302 can present different user interfaces associated with the document generation system 202 (and/or the maintenance management system 204) to different users.

Communications transmitted over communication network 320 and/or communication links shown in FIG. 3 can be secured using any suitable technique or combination of techniques. For example, communications transmitted to and/or from server 302, computing device 330, and/or database server 310 can be encrypted using any suitable technique or combination of techniques. For example, communication between two or more computing devices associated with communication network 320 (e.g., server 302, computing device 330, database server 310, Domain Name System (DNS) servers, one or more intermediate nodes that serve as links between two or more other devices, such as switches, bridges, routers, modems, wireless access points, and the like) computing devices can be carried out based on Hypertext Transfer Protocol Secure (HTTPS). As another example, communications can be carried out based on Transport Layer Security (TLS) protocols and/or Secure Sockets Layer (SSL) protocols. As yet another example, communications can be carried out based on Internet Protocol Security (IPsec) protocols. As still another example, a virtual private network (VPN) connection can be established between one or more computing devices associated with computing network 320.

One or more techniques can be used to limit access to communication network 320 and/or a portion of communication network 320. For example, computing devices attempting to connect to the network and/or transmit communications using the network can be required to provide credentials (e.g., a username, a password, a hardware-based security token, a software-based security token, a one-time code, any other suitable credentials, or any suitable combination of credentials). Security techniques can be applied to any suitable portion of a communication network that interacts with computing devices. For example, security techniques can be used to implement a secure Wi-Fi network (which can include one or more wireless routers, one or more switches, and the like), a secure peer-to-peer network (e.g., a Bluetooth network), a secure cellular network (e.g., a 3G network, a 4G network, a 5G network, and the like, complying with any suitable standard(s), such as CDMA, GSM, LTE, LTE Advanced, WiMAX, 5G NR, and the like), and the like.

Figure 4:
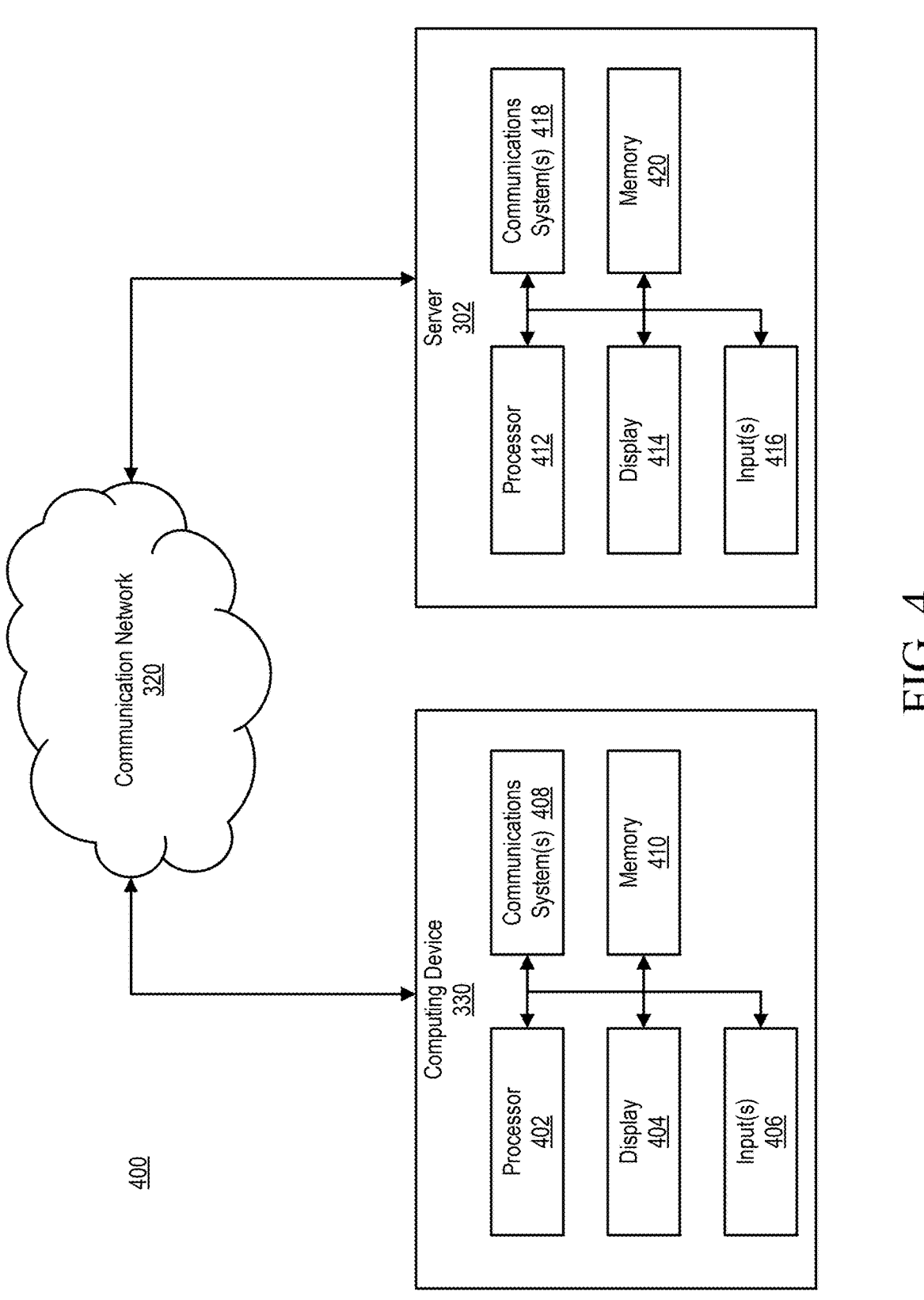
FIG. 4 shows a block diagram illustrating example hardware that can be used to implement the system of FIG. 3, in accordance with some aspects of the disclosure.

FIG. 4 shows an example of additional hardware that can be used to implement the server 302 and the computing device 330. As shown in FIG. 4, computing device 330 can include a processor 402, a display 404, one or more inputs 406, one or more communication systems 408, and/or memory 410. The processor 402 can be any suitable hardware processor or combination of processors, such as a central processing unit (CPU), a graphics processing unit (GPU), etc. The display 404 can include any suitable display devices, such as a computer monitor, a touchscreen, a television, and the like. The inputs 406 can include any suitable input devices and/or sensors that can be used to receive user input, such as a keyboard, a mouse, a touchscreen, a microphone, a camera, etc.

The communications systems 408 can include any suitable hardware, firmware, and/or software for communicating information over communication network 320 and/or any other suitable communication networks. For example, the communications systems 408 can include one or more transceivers, one or more communication chips and/or chip sets, and the like. In a more particular example, communications systems 408 can include hardware, firmware and/or software that can be used to establish a Wi-Fi connection, a Bluetooth connection, a cellular connection, an Ethernet connection, and the like.

The memory 410 can include any suitable storage device or devices that can be used to store instructions, values, and the like, that can be used, for example, by processor 402 to present content using display 404, to communicate with server 302 via communications system(s) 408, etc. Memory 410 can include any suitable volatile memory, non-volatile memory, storage, or any suitable combination thereof. For example, memory 410 can include random-access memory (RAM), read-only memory (ROM), electrically erasable programmable read-only memory (EEPROM), one or more flash drives, one or more hard disks, one or more solid state drives, one or more optical drives, and the like. The memory 410 can have encoded thereon a computer program for controlling operation of computing device 330. The processor 402 can execute at least a portion of the computer program to present content (e.g., user interfaces, tables, graphics, and the like), receive content from server 302, transmit information to server 302, etc.

The 302 can be implemented using one or more servers 302 (e.g., functions described as being performed by server 302 can be performed by multiple servers acting in concert) that can include a processor 412, a display 414, one or more inputs 416, one or more communications systems 418, and/or memory 420. The processor 412 can be any suitable hardware processor or combination of processors, such as a CPU, a GPU, etc. The display 414 can include any suitable display devices, such as a computer monitor, a touchscreen, a television, etc. The inputs 416 can include any suitable input devices and/or sensors that can be used to receive user input, such as a keyboard, a mouse, a touchscreen, a microphone, and the like.

The communications systems 418 can include any suitable hardware, firmware, and/or software for communicating information over communication network 320 and/or any other suitable communication networks. For example, the communications systems 418 can include one or more transceivers, one or more communication chips and/or chip sets, etc. In a more particular example, the communications systems 418 can include hardware, firmware and/or software that can be used to establish a Wi-Fi connection, a Bluetooth connection, a cellular connection, an Ethernet connection, etc.

The memory 420 can include any suitable storage device or devices that can be used to store instructions, values, and the like, that can be used, for example, by processor 412 to present content using display 414, to communicate with one or more computing devices 330, etc. The memory 420 can include any suitable volatile memory, non-volatile memory, storage, or any suitable combination thereof. For example, memory 420 can include RAM, ROM, EEPROM, one or more flash drives, one or more hard disks, one or more solid state drives, one or more optical drives, and the like. The memory 420 can have encoded thereon a server program for controlling operation of server 302. The processor 412 can execute at least a portion of the server program to transmit information and/or content (e.g., results of a database query, a portion of a user interface, textual information, graphics, etc.) to one or more computing 330, receive information and/or content from one or more computing devices 330, receive instructions from one or more devices (e.g., a personal computer, a laptop computer, a tablet computer, a smartphone, etc.), and the like.

Figure 5:
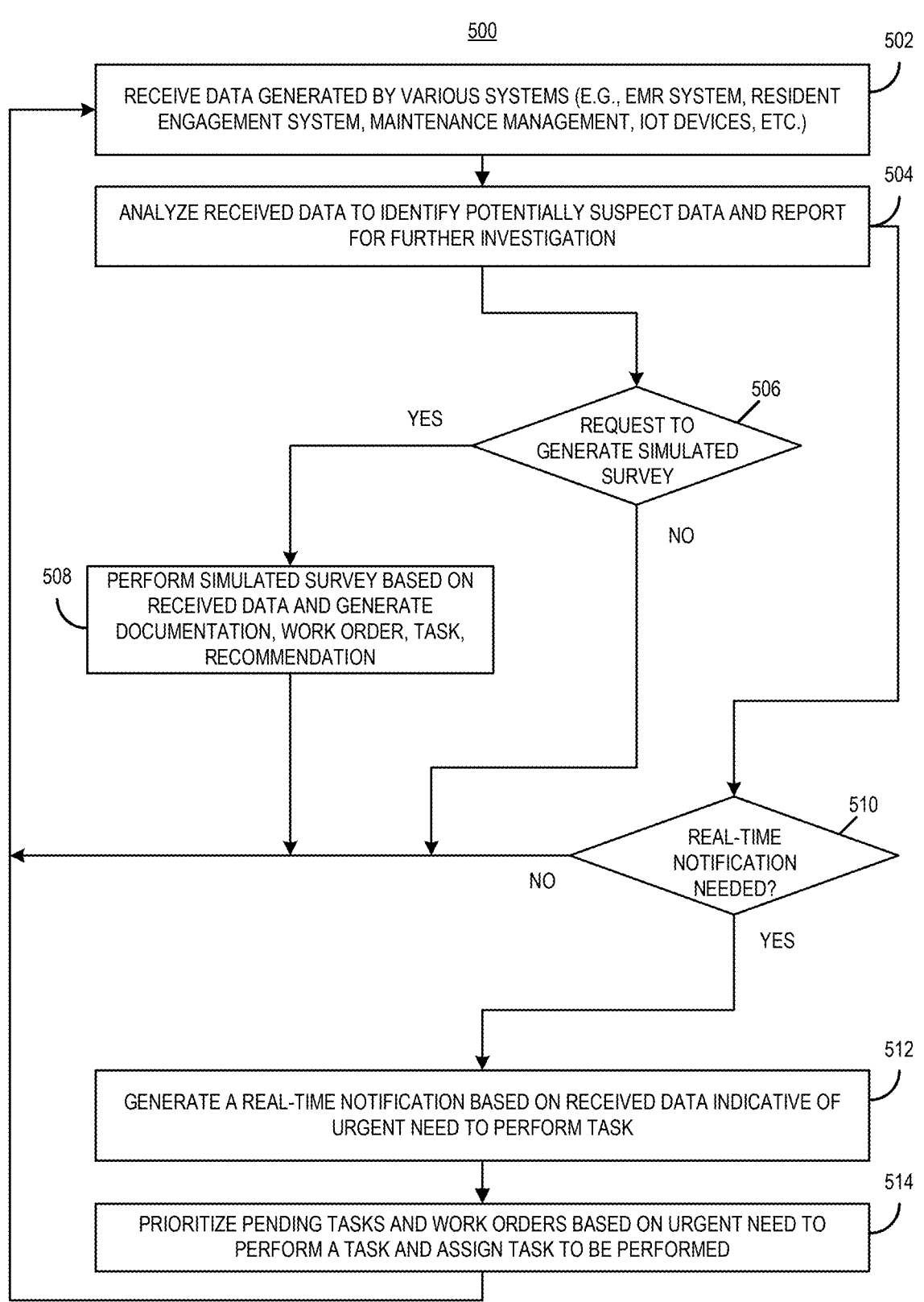
FIG. 5 shows a flow diagram illustrating an example process for evaluating compliance of a facility, in accordance with some aspects of the disclosure.

FIG. 5 shows a flow diagram illustrating an example process 500 for evaluating compliance of a facility. Process 500 can be performed by the document generation system 202 and/or the maintenance management system 204 to improve efficiency for a variety of different compliance-related procedures. For example, process 500 can generate a simulated (mock) survey for a facility, generate compliance documentation, work orders, tasks, and recommendations for a facility, generate notifications for providing to facility personnel, and prioritize different tasks for performing to reduce facility citation risk. Process 500 can advantageously integrate data from a variety of different data sources to provide an integrated solution that encompasses important information for facilitating compliance of one or more facilities with different regulatory requirements. As a result, efficiency can be provided for facility personnel and management, and conditions for residents, occupants, users, etc. of the facilities can be improved.

At 502, process 500 can receive data from different, separate data sources that are generated by various systems. For example, process 500 can receive data from the connected equipment database 206, the nurse call system database 208, the resident system database 210, the EMR system database 212, the citations database 216, the maintenance management database 217, the best practices database 218, the one or more vendor databases 214, one or more databases maintained by the document generation system 202 and/or the maintenance management system 204 (including a purchasing system database), and/or other types of databases containing data generated by different systems. Process 500 can securely integrate data from the separate data sources at 502 using separate application programming interfaces (APIs) for each separate data source. The integration of all the data sources at 502 can allow process 500 to securely evaluate a variety of different information relevant to the compliance of one or more facilities.

At 504, process 500 can analyze the received data to identify potentially suspect data and report for further investigation. For example, process 500 can analyze all the data from the separate sources relative to one or more compliance documentation templates and/or relative to compliance logic (e.g., a set of rules, a model, etc.) to identify one or more compliance gaps for one or more facilities. The compliance document templates and/or the compliance logic can be based on different regulations such as the NFPA 101 Life Safety Code, CMS Life Safety Code, and other requirements such as instituted by the Joint Commission, insurance companies, and other AHJs. The templates and logic can use different data received at 502 as inputs to identify compliance gaps and generate compliance documentation. The compliance documentation can be printed for inclusion at a facility (e.g., in a life safety binder) to be reviewed by a surveyor.

At 508, if a request to generate a simulated (mock) survey has been received (506), process 500 can perform a simulated survey based on the data received at 502. For example, process 500 can generate a mock survey report that draws attention to non-compliant sections and/or gaps, and includes recommendations and/or tasks for completion to improve compliance. The mock survey report can be designed to mimic an actual compliance inspection (survey). The mock survey report can include a list of identified compliance gaps and the corresponding recommendations and tasks for completion to address the compliance gaps. The mock survey report can also rank, group, and otherwise prioritize tasks for completion to address the compliance gaps, as well as provide detailed explanations for completing various tasks.

At 508, process 500 can further generate appropriate compliance documentation in accordance with the request, as well as generate work orders, tasks, and/or recommendations in accordance with one or more compliance gaps identified during the compliance document generation process. For example, process 500 can generate various documents needed for different compliance inspections such as a Joint Commission survey, a state surveyor survey, an insurance broker survey, or a Centers for Medicare and Medicaid Services survey. Process 500 can generate the compliance documentation by populating one or more documentation templates associated with one or more authorities having jurisdiction over the compliance inspection using the data received at 502. At 512, if a real-time notification is needed (510), process 500 can generate a real-time notification based on the data received at 502 to indicate an urgent need to perform a task to address one or more compliance gaps. The notification can be provided to facility personnel and/or to the service providers 226 in a variety of manners. For example, the notification can be provided as a text message, a push notification, an e-mail message, a phone call, or another similar type of notification. The ability to provide a notification in real-time can help reduce the risk of citation and reduce the risk of various types of problems that can occur for one or more facilities. The notification can also cause the maintenance management system 204 to generate a work order and/or a task.

At 514, process 500 can prioritize pending tasks and/or work orders based on the urgency of the tasks and assign tasks to be performed. For example, process 500 can generate a score for each task and/or work order based on a variety of factors. A base score can first be associated with each task, where the base score can be representative of the general importance of the task. For example, tasks that have a higher importance in terms of life safety (e.g., replacing batteries in nurse call devices, moving potential walking hazards, etc.) can be associated with a higher base score than tasks with a lower importance in terms of life safety. The base scores can be configured in a variety of manners depending on the type of facility, type of survey, and other factors. Then, and adjusted score can be calculated for each task by incrementing or decrementing the base score. The adjusted score can be calculated based on a variety of factors such as citation data trends, regional factors, type of facility, etc. The adjusted scores can be calculated automatically and/or can be calculated based on manual user adjustments, for example. Other possible approaches to prioritizing tasks based on the urgency of the tasks can be implemented. Then, the tasks can be assigned (e.g., to facility personnel and/or to the service providers 226) for completion. Process 500 can assign the tasks by sending a notification to personnel assigned to the task, creating a work order, etc.

FIG. 6 shows a flow diagram illustrating an example process 600 for generating a simulated (mock) survey report for a facility. Process 600 can be performed by the document generation system 202 and/or the maintenance management system 204 to simulate an actual survey (compliance inspection) that can be performed at a given facility. By simulating the actual survey, facility personnel can prepare for the actual survey and identify potential areas of concern that need to be addressed before the actual survey occurs. This functionality provided by process 600 can not only help facility personnel and management comply with various complex and changing regulations, but it can also help residents and other users of the facility by providing better facility services and maintenance of equipment in the facility.

At 602, process 600 can receive a compliance documentation template. For example, process 600 can receive a compliance documentation template associated with a specific AHJ and/or a specific type of survey selected by a user. At 604, process 600 can receive updated instructions for identifying and/or prioritizing potential sources of citations. For example, process 600 can receive user inputs provided via an administrative tools user interface such as described below with respect to FIG. 23. At 606, process 600 can receive citation history data for one or more authorities having jurisdiction associated with the mock survey report. For example, process 600 can receive citation data from the citations database 216.

At 608, process 600 can identify potential sources of citation based on the instructions received at 604, the citation data received at 606, and other input data received from various input data sources. For example, process 600 can evaluate the instructions received at 604, the citation data received at 606, and data retrieved from one or more of the connected equipment database 206, the nurse call system database 208, the resident system database 210, the EMR system database 212, the citations database 216, the maintenance management database 217, the best practices database 218, the one or more vendor databases 214, and/or one or more databases maintained by the document generation system 202 and/or the maintenance management system 204 (including a purchasing system database) to identify potential sources of citation.

At 610, process 600 can prioritize and assign tasks to be completed based on the identified potential sources of citation at 608. For example, process 500 can generate a score for each identified potential source of citation based on the potential scope and severity of the citation. For example, potential sources of citation associated with life safety risks (e.g., restoring loss of communication in nurse call devices, moving potential walking hazards, etc.) can be associated with a higher score (e.g., in part based on an associated citation, such as CMS citation tag with a corresponding scope and severity). The scores can be calculated based on a variety of factors such as citation data trends, regional factors, facility factors such as the facilities prior citations (e.g., prioritizing prior citations by increasing the associated potential source's score), and other possible factors. Then, tasks can be assigned (e.g., to facility personnel and/or to the service providers 226) for completion to address the potential sources of citation by sending notifications to personnel assigned to the task, creating work orders, submitting maintenance requests, etc.

At 612, process 600 can generate a simulated survey report identifying predicted citations that would be issued based on the current data. For example, the simulated survey report can identify one or more citation likely to be issued to the facility if a real survey were to take place at the facility. At 614, process 600 can cause the simulated survey report to be presented to a user (e.g., facility manger, etc.) via a user interface on a user device (e.g., the computing device 330). The user can then view the simulated survey report via the user interface, download the simulated survey report via the user interface, send the simulated survey report via the user interface, print the simulated survey report via the user interface, etc. The facility can use the simulated survey report to prepare for an actual survey and to facilitate compliance with various complex and changing regulations.

FIG. 7 shows a flow diagram illustrating an example process 700 for generating compliance documentation and assigning tasks to address compliance gaps. Process 700 can be performed by the document generation system 202 and/or the maintenance management system 204 to generate appropriate compliance documentation for a facility. The types of compliance documentation can not only include various documents needed for an actual compliance inspection (survey), but it can also include various documents needed after an actual compliance inspection is performed, such as plan of correction documents. The functionality provided by process 700 can provide improvements in efficiency for facilities that need to comply various complex and changing regulations by automatically integrating data from various sources and automatically generating appropriate compliance documentation needed by the facility.

At 702, process 700 can receive one or more compliance documentation templates for generating appropriate compliance documentation. For example, process 700 can identify one or more appropriate compliance documentation templates based on a request received from a user for the compliance documentation. The request can identify a specific AHJ and/or a specific type of survey selected by the user. At 704, process 700 can populate the compliance documentation templates using data received from multiple sources. For example, process 700 can populate the one or more compliance documentation templates using data retrieved from one or more of the connected equipment database 206, the nurse call system database 208, the resident system database 210, the EMR system database 212, the citations database 216, the maintenance management database 217, the best practices database 218, the one or more vendor databases 214, and/or one or more databases maintained by the document generation system 202 and/or the maintenance management system 204 (including a purchasing system database). At 706, process 700 can generate compliance documentation that can be used to facilitate a compliance inspection (e.g., a survey) by a particular AHJ based on the populated compliance documentation templates.

At 708, process 700 can receive one or more citations from an AHJ that performs a compliance inspection using the compliance documentation generated at 706. For example, a surveyor can use the compliance documentation generated at 706 to perform a compliance inspection and identify one or more compliance gaps for the facility. Based on the compliance gaps, the surveyor can issue citations for the facility. At 710, process 700 can generate a plan of correction based on the one or more citations received from the AHJ that performs the compliance inspection. The plan of correction can include one or more tasks for performing by facility personnel and/or by the service providers 226 to address any identified compliance gaps. In some cases, the plan of correction can be required to be submitted to the one or more AHJs after a certain time period elapses after a compliance inspection is completed (e.g., 10 days). Process 700 can automatically generate appropriately formatted plan of correction documents including detailed plans to address each deficiency in the citations, measures in place at the one or more facilities to ensure the deficiencies are not recurring, monitoring procedures being used to ensure the deficiencies are not recurring, and other potential information that can be required to be included in the plan of correction. As tasks are completed, the information associated with the formatted plan of correction documents can be updated accordingly (e.g., description of task done, date of completion, etc.).

At 712, process 700 can automatically prioritize the tasks included in the plan of correction (e.g., based on priority scoring of tasks). Process 700 can also automatically assign different tasks included in the plan of correction to appropriate personnel (e.g., based on capabilities associated with personnel) at 712. For example, process 700 can prioritize different tasks in the plan of correction to address the deficiencies (e.g., by scoring and ranking tasks based on the scores), and assign the tasks to facility personnel and/or to the service providers 226 for completion within a certain time period outlined in the plan of correction. Process 700 can further notify different individuals (e.g., via push notification, text message, e-mail, etc.) of any tasks they have been assigned. Tasks can be automatically assigned to internal personnel or external contractors depending at least in part on capabilities, skills, priority, schedule, etc. of internal personnel.

FIG. 8 shows a flow diagram illustrating an example process 800 for updating compliance documentation templates and compliance logic. Process 800 can be performed by the document generation system 202 and/or the maintenance management system 204 to update various compliance documentation templates, audit templates, and compliance documentation logic based on a variety of factors. For example, changes to regulatory code can require changes to be made to compliance documentation templates that are populated by the document generation system 202 to automatically generate different types of compliance documentation logic for a compliance inspection. Additionally, changes in public citation data trends and other types of trends can create certain weightings for different factors for different facilities that can lead to adjustments in logic (e.g., rules) and/or templates. The functionality provided by process 800 allows the document generation system 202 and/or the maintenance management system 204 to adapt to changing regulatory environments and provide improved efficiency for facility personnel and inspecting entities alike.

At 802, process 800 can receive citations issued to one or more facilities (e.g., all connected facilities) using the document generation system 202. For example, citations issued to facilities can be uploaded to the document generation system 202 by facility personnel or citations can be issued electronically to facilities by surveyors and accessed via the document generation system 202. The citations can be uploaded by a given facility shortly after the citations are issued such that the document generation system 202 has access to up-to-date information. At 804, process 800 can receive public citation data and de-duplicate the public citation data to remove data corresponding to the citations received at 802. For example, process 800 can receive public citation data from the citations database 216. At 806, process 800 can identify citation data trends for one or more AHJs based on the public citations data and/or for one or more locations corresponding to one or more facilities. For example, process 800 can identify citation data trends associated with a specific type of compliance inspection such as a Joint Commission survey, a state surveyor survey, an insurance broker survey, or a Centers for Medicare and Medicaid Services survey. Process 800 can also identify citation data trends for a specific facility or group of facilities, and/or for a specific region or grouping of regions, or citation data trends for a specific surveyor.

At 808, process 800 can use the citation data trend information to update compliance documentation templates and/or instructions for identifying and/or prioritizing potential sources of citations. For example, process 800 can update compliance documentation templates to make sure certain information associated with a given facility (e.g., documentation of certain maintenance activities related to fire safety, life safety, etc.) is included automatically in the compliance documentation generated for the facility. Process 800 can also make changes to compliance documentation logic (e.g., to change rules, or a given threshold) and scoring logic to place added emphasis on identifying and correcting certain compliance gaps that can be at high risk for citation based on the citation data trends.

FIG. 9 shows a flow diagram illustrating an example process 900 for generating an audit template used for a compliance audit. Process 900 can be performed by the document generation system 202 and/or the maintenance management system 204 such that inspecting entities including surveyors and insurers can use the document generation system 202 and/or the maintenance management system 204 to facilitate compliance inspections. Process 900 can generally analyze aggregate facility data to identify trends, generate different recommendations based on the trends, and generate compliance documentation including audit templates that can then be used by the inspecting entities to complete compliance audits. The functionality provided by the document generation system 202 and/or the maintenance management system 204 via process 900 can provide improved efficiency for inspecting entities.

At 902, process 900 can aggregate potential sources of citations that are identified during simulated (mock) surveys of multiple facilities. For example, process 900 can aggregate potential sources of citations identified during simulated surveys of multiple facilities in a region of interest or of multiple facilities that share a common characteristic. At 904, process 900 can analyze the aggregated data indicative of the potential sources of citations to identify trends in the potential sources of citations identified during the simulated surveys. For example, process 900 can determine that certain violations related to fire safety, life safety, equipment maintenance, etc. are common in a certain region or among a certain type of (or similar) facility. At 906, process 900 can identify areas for improvement based on the trends. For example, process 900 can identify life safety risks stemming from nurse call device functionality as an area for improvement based on the trends in the potential sources of citations identified during the simulated surveys, or trends in data standard enforcement.

At 914, process 900 can cause a user interface to be presented to a user via a user device (e.g., the computing device 330) that identifies the trends and/or areas for improvement. The user interface can also present to the user via the user interface different recommendations associated with the trends and/or areas for improvement. For example, responsive to identifying life safety risks stemming from nurse call device functionality as an area for improvement based on the trends in the potential sources of citations identified during the simulated surveys, the user interface can recommend the user (e.g., a surveyor or an insurer) that greater emphasis should be placed on nurse call device functionality when inspecting facilities in a region of interest. As a result, the user can be more likely to issue citations related to nurse call device functionality which can lead to better compliance with nurse call device regulations in the region of interest.

At 908, process 900 can receive a user input from a user (e.g., a surveyor or an insurer) via a user interface presented on a user device (e.g., the computing device 330), where the user input is indicative of a desired output format for an audit template. For example, the user can be a surveyor working for the Joint Commission, and can provide a user input indicating a desired output format for the audit template that is in accordance with Joint Commission survey standards. At 910, process 900 can generate an appropriately formatted audit template (or generate multiple audit templates) based on the user input. Process 900 can also generate the appropriately formatted audit template(s) based on the identified areas for improvement and trends.

At 912, process 900 can present the audit template(s) to the user via the user interface. The user can then use the audit template(s) to complete a compliance audit for one or more facilities. The user can print the audit template, send the audit template, and otherwise manage the audit template generated and provided via the user interface at 912. The user interface can be the same user interface that presents the trend and the recommendation at 914. For example, the user can use the audit template by providing user inputs via the user interface to issue citations for different compliance violations. The user can also view a compliance checklist for a compliance audit including various compliance inspection tasks and perform various additional tasks using the audit template.

FIG. 10 shows a flow diagram illustrating an example process 1000 for automatically assigning tasks for performing to address compliance gaps. Process 1000 can be performed by the document generation system 202 and/or the maintenance management system 204 such that inspecting entities including surveyors and insurers can use the document generation system 202 and/or the maintenance management system 204 to assign tasks to be completed as a result of a compliance audit. Process 1000 can generally receive tasks to be performed based on either a real survey or a simulated (mock) survey, score the tasks, and then assign the tasks for performance. The functionality provided by the document generation system 202 and/or the maintenance management system 204 via process 1000 can provide improved efficiency for inspecting entities and quicker resolution of actual and potential compliance violations.

At 1002, process 1000 can receive one or more tasks to be performed. For example, process 1000 can receive tasks to be performed as a result of a real survey (e.g., a compliance audit) or a simulated (mock) survey. The tasks can be associated with identified compliance violations and/or identified compliance gaps, for example. At 1004, process 1000 can associate each of the received tasks with a base score. The base score can be representative of the general importance of the task. For example, tasks that have a higher importance in terms of life safety (e.g., replacing batteries in nurse call devices, moving or repairing potential walking hazards, etc.) can be associated with a higher base score than tasks with a lower importance in terms of life safety (e.g., in part based on an associated citation, such as CMS citation tag with a corresponding severity). The base scores can be configured in a variety of manners depending on the type of facility, type of survey, and other factors.

At 1006, process 1000 can calculate an adjusted score for each task based on various adjustment factors. For example, process 1000 can calculate an adjusted score for each task that positively or negatively affects (e.g., increments or decrements) the base score based on a variety of factors such as citation data trends, regional factors, seasonality factors, type of facility, priorities of the inspecting entity, (e.g., AHJ), whether "backups" exist at the facility (e.g., backup equipment or systems that can be used while primary equipment or systems are being repaired), staffing trends such as workforce turnover, levels (insufficient staffing, training, etc.), etc. The adjusted scores can be calculated in a variety of manners relative to the base scores, such as being calculated automatically and/or being calculated based on manual user adjustments. At 1008, process 1000 can rank the tasks based on the adjusted scores for each task. For example, the task with the highest adjusted score can be ranked first, followed by tasks with subsequently lower adjusted scores in order of adjusted score. Prioritization of tasks can also be accomplished using a variety of probabilistic models (e.g., data alignment prioritization algorithms, including statistical models such as Bayesian models, survival analysis, risk assessment models, or machine learning models such as a probabilistic neural network). For example, a model that determines a probability that a particular citation will occur based on various factors discussed above weighted by a severity level for that citation. In this manner, process 1000 can dynamically rank tasks based on various factors such that tasks can be flexibly prioritized for completion in the appropriate manner.

At 1010, process 1000 can group tasks based on one or more factors. For example, the tasks can be grouped based on factors including but not limited to physical proximity (e.g., grouped by area or building within a facility, grouped by facility, grouped by region, etc.), related tasks (e.g., same task type such as HVAC, fire safety, etc.), level of skill required to complete the task, and other factors. At 1012, process 1000 can assign the tasks to be performed by internal staff (e.g., facility employees) and/or by external service providers (e.g., the service providers 226). For example, tasks matching the capabilities of the internal staff at a facility can be grouped together, and tasks that are outside the capabilities of the internal staff can also be grouped together. Then, the tasks can be appropriately assigned to the internal staff and to the service providers 226. In assigning the tasks, process 1000 can send a notification to appropriate personnel detailing the assignment. Process 1000 can also assign tasks by generating work orders, service requests, etc.

Figure 11:
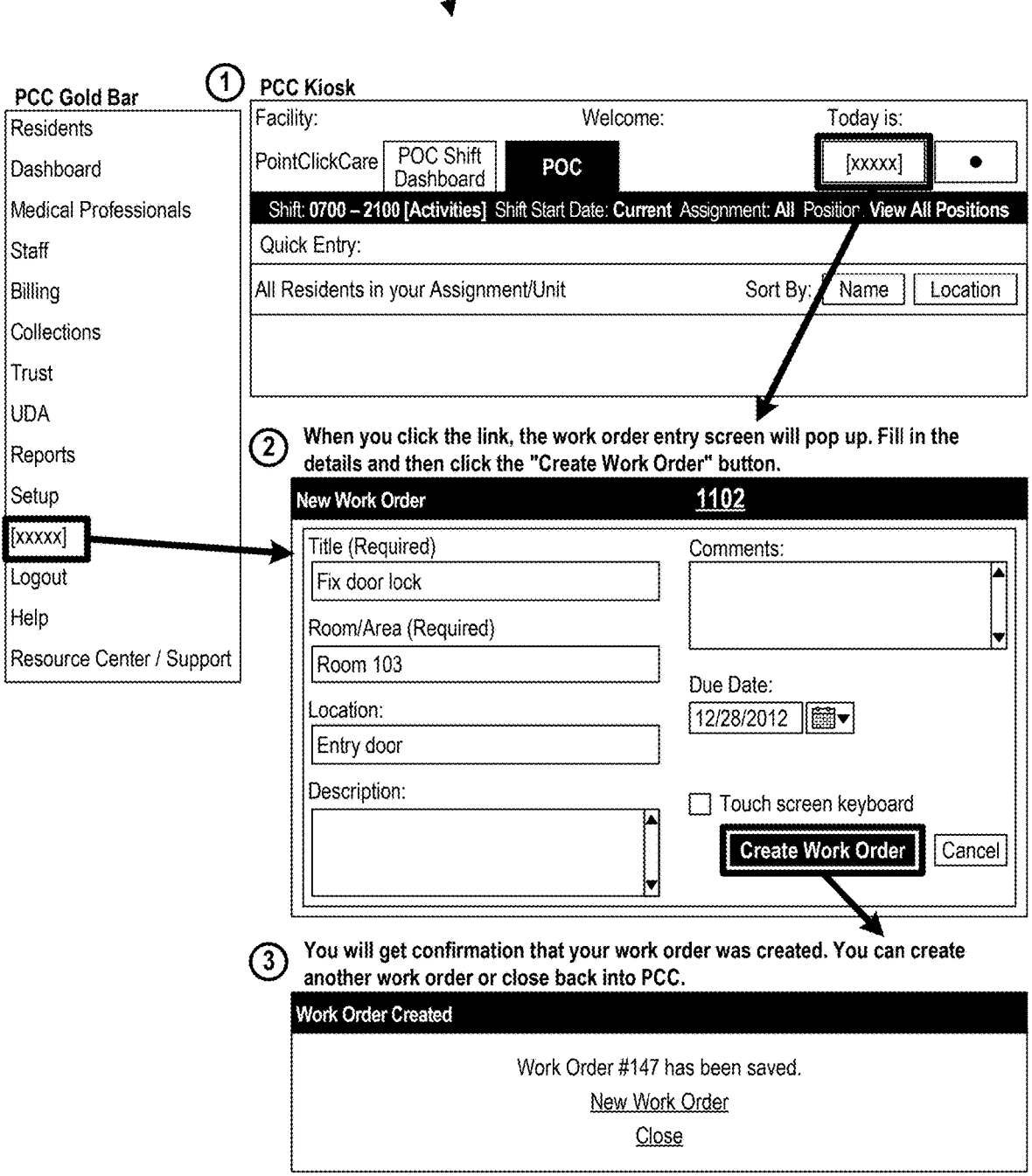
FIG. 11 shows example user interfaces for submitting a work order via an electronic medical records (EMR) system, in accordance with some aspects of the disclosure.

FIG. 11 shows example user interfaces for submitting a work order via an electronic medical records (EMR) system. In the example shown in FIG. 11, the EMR system can present an EMR user interface 1100 with a selectable user interface element including a link that, upon selection by a user, causes a work order entry window 1102 to launch on the user interface. Via the work order entry window 1102, the user can then submit a work order that can be stored in the EMR system database 212 and accessed by the document generation system 202 and/or the maintenance management system 204. The work order can then be assigned to maintenance personnel, for example, and data associated with the work order can be stored for use in the generation of compliance documentation and identification of compliance gaps. The ability to enter work orders via an EMR system user interface such as the EMR user interface 1100 shown in FIG. 11 can provide convenience for clinical teams that spend most of their time updating medical records by eliminating the need for them to transition to a different system to create a work order.

FIG. 12 shows an example work order entry user interface 1200 that can be used by facility personnel to submit a work order. The document generation system 202 and/or the maintenance management system 204 can cause the work order entry user interface 1200 to be presented to a user via the computing device 330, for example. The work order entry user interface 1200 includes a variety of fields, some of which can be required and some of which can not be required. A work order submitted via the work order entry user interface 1200 can identify a person assigned to complete the work order, a person that requested the work order, a building associated with the work order, an area in the building associated with the work order, a due date for the work order, a category for the work order, a priority level for the work order, equipment identification, and other information associated with the work order. Via the work order entry user interface 1200, the user can upload images and documents that can be associated with the work order, add any comments associated with the work order, and select one or more people to receive notifications about the work order. All of this data and other data can be stored in a database maintained by the maintenance management system 204, for example, such that it can be used by the document management system 202 for the generation of compliance documentation and identification of compliance gaps.

FIG. 13 shows an example work order report 1300 that details work orders specific to life safety incidents for a given facility. The document generation system 202 and/or the maintenance management system 204 can generate the work order report 1300 and cause the work order report 1300 to be presented on a user interface to a user via the computing device 330, for example. More specifically, the work order report 1300 identifies work orders specific to life safety incidents that were solved at a facility over a time period of one month. The work order report 1300 identifies, for each work order, a location, a work order identifier (e.g., a number), a work order title, a priority level, an area of the facility, a category, a time spent, and a person and/or entity that spent time on the work order. The work order report 1300 can be generated based on data accessed via one or more databases such as the resident system database 210, a database maintained by the maintenance management system 204, and other databases as detailed herein. Work order reports similar to the work order report 1300 shown in FIG. 13 can be used by the document generation system 202 to generate compliance documentation for a variety of different types of compliance inspections and identification of compliance gaps.

Figure 14:
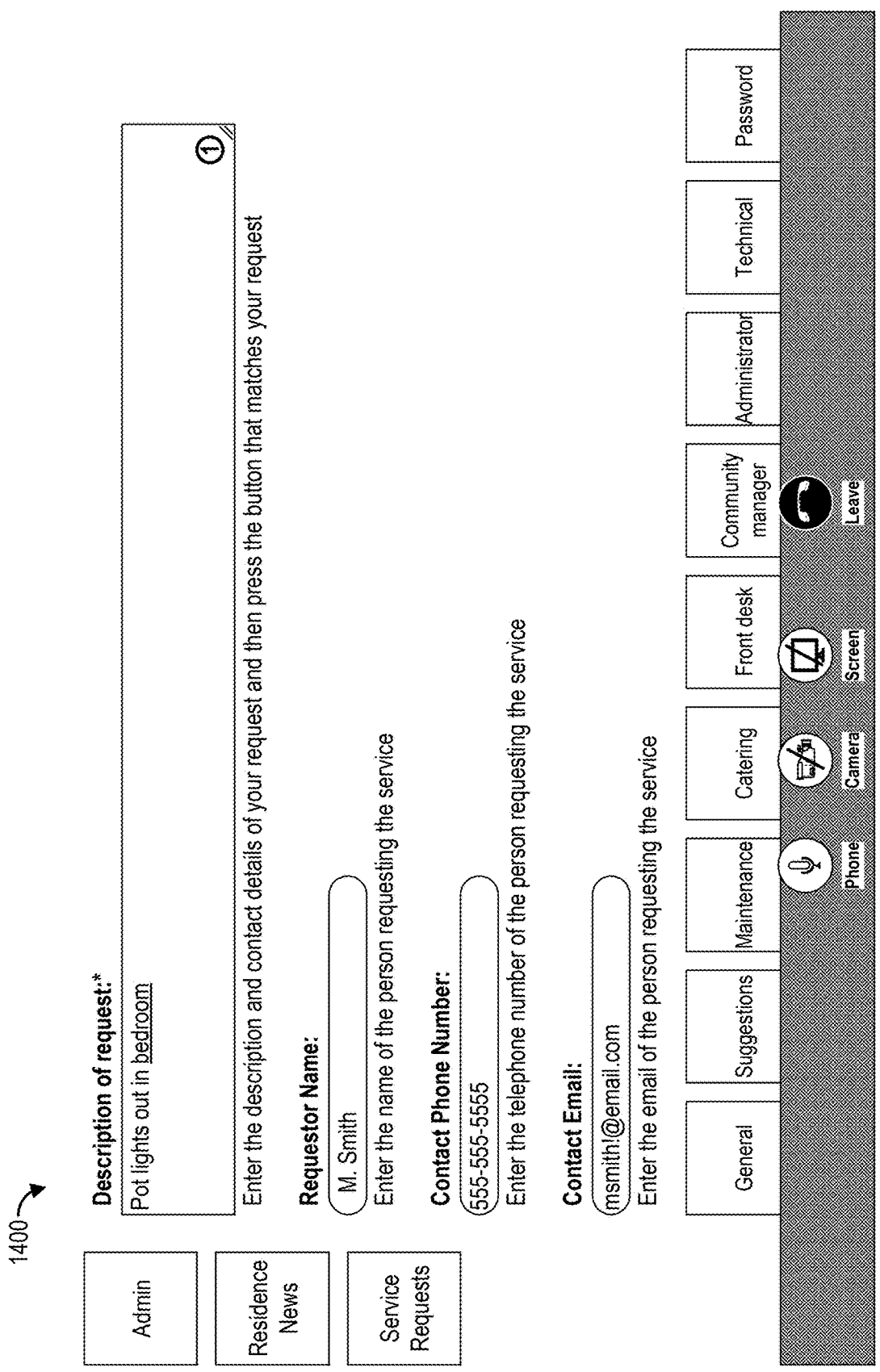
FIG. 14 shows an example resident system user interface that can be used to submit maintenance requests via a resident engagement system, in accordance with some aspects of the disclosure.

FIG. 14 shows an example resident system user interface 1400 that can be used to submit maintenance requests via a resident engagement system. For example, as discussed above, residents of a senior living facility, as well as family members of the residents of the senior living facility, can submit maintenance requests via a resident engagements system. Data associated with maintenance requests submitted via the resident engagement system can be stored in the resident system database. The resident system user interface 1400 shows an example of a user interface that can be presented to residents and/or family members of residents for submitting such maintenance requests. As shown in FIG. 14, the resident system user interface 1400 includes various fields and tabs, including fields for entering a description associated with the maintenance request, a requestor name associated with the maintenance request, a contact phone number for the maintenance request, and a contact email for the maintenance request.

FIG. 15 shows another example resident system user interface 1500 that can be used to submit maintenance requests via a resident engagement system. For example, residents of a senior living facility, as well as family members of the residents of the senior living facility, can submit maintenance requests via a resident engagement system. Different information associated with maintenance requests submitted via the resident engagement system can be stored in the resident system database 210. The resident system user interface 1500, as shown in FIG. 15, includes various fields and tabs, including fields for entering a description associated with the maintenance request, an indicator of who the maintenance request is submitted on behalf of, and a contact phone number for the maintenance request. The tabs on the resident system user interface 1500 can be selected for different categories of service, such as air conditioning (shown as selected), appliances, carpet, computer, etc.

FIG. 16 shows an example work order report 1600 that details work orders associated with maintenance requests submitted via a resident engagement system for a given facility. The document generation system 202 and/or the maintenance management system 204 can generate the work order report 1600 and cause the work order report 1600 to be presented on a user interface to a user via the computing device 330, for example. The work order report 1600 shows work orders associated with resident requests over a time period of one month for the facility. For a senior living facility, via the resident engagement system, a family member (e.g., a child of an elderly person) can submit a maintenance request (e.g., for the air conditioning, television, etc.) for a resident of the senior living facility, and the maintenance request can be stored in the resident system database 210. In the work order report 1600, a variety of information associated with each work order resulting from a maintenance request can be included, such as s summary (e.g., no flushing on toilet in master bathroom), a description, a priority level, an area name (if applicable), a location, a category, a person/entity that submitted the maintenance request, a status, an open data and time, a closed data and time, a person/entity that closed the work order, a duration the work order was open for, and a person/entity that initiated the work order (e.g., based on the maintenance request submitted via the resident engagement system). The work order report 1600 can also include information related to costs of completing work. The document generation system 202 can use the work order report 1600 for various purposes in terms of compliance document generation and other compliance functionality as described herein.

FIG. 17 shows an example work order 1700 that is created in accordance with an example nurse call device 1702. Data associated with the work order 1700 that is created based on the nurse call device 1702 can be accessed via the nurse call system database 208, for example. The work order 1700 as shown in FIG. 17 is generated responsive to detecting a loss in communication between a router and the nurse call device 1702. As a result of the loss in communication, signals generated by the nurse call device 1702 can not properly be received (e.g., by the maintenance management system 204), and therefore the resident associated with the nurse call device 1702 can be at risk. In response to detecting the loss in communication, the document generation system 202 and/or the maintenance management system 204 can send an alert to maintenance personnel such that maintenance personnel can access the work order 1700. As shown in FIG. 17, maintenance personnel can be required to fill in different fields associated with the work order 1700 (e.g., area, notes, images, comments, etc.), and some or all of the fields associated with the work order 1700 can be automatically filled in depending on the type of work order. The work order 1700 can then be accessed (e.g., via the nurse call system database 208) by the document generation system 202 for various purposes in terms of compliance document generation and other compliance functionality as described herein.

FIG. 18 shows an example work order report 1800 that details work orders associated with a nurse call system for a given facility. The document generation system 202 and/or the maintenance management system 204 can generate the work order report 1800 and cause the work order report 1800 to be presented on a user interface to a user via the computing device 330, for example. More specifically, the work order report 1800 details a variety of information about work orders specific to nurse call system errors that were resolved at the facility over a time period of one month. The document generation system 202 and/or the maintenance management system 204 can access the data needed to generate the work order report 1800 via the nurse call system database 208, for example. For each work order, the work order report 1800 details a work order identifier, a summary, a description, a priority level, an area type, an area name, a location, a category, a status, an open date and time, a closed date and time, a duration, and a person/entity that initiated the work order. The work order report 1800 can further provide details related to costs associated with resolving each work order. The document generation system 202 can use the work order report 1800 for various purposes in terms of compliance document generation and other compliance functionality as described herein.

FIG. 19 shows an illustration of an example work history report 1900 associated with connected equipment for a given facility. The document generation system 202 and/or the maintenance management system 204 can generate the work history report 1900 and cause the work history report 1900 to be presented on a user interface to a user via the computing device 330, for example. More specifically, the work history report 1900 shows work history related to water heater inspections that have occurred at the facility within the past 12 months. The document generation system 202 and/or the maintenance management system 204 can access the data needed to generate the work history report 1900 via the connected equipment database 206, for example. For each entry in the work history report 1900, a variety of data associated with work performed can be included, such as a due date, a category, a task description, a task completion, and other details. The work history report 1900 as shown includes selectable user interface elements (e.g., links, etc.) that can be selected by the user to either edit the work history records or view additional details regarding the work history records. The work history report 1900 can be printed, exported to a specific file format, etc. for further viewing and digesting. Moreover, the document generation system 202 can use the work history report 1900 for various purposes in terms of compliance document generation and other compliance functionality as described herein.

FIG. 20 shows an example service request user interface 2000 for requesting maintenance and requesting quotes for maintenance service for a facility. The maintenance management system 204 can cause the service request user interface 2000 to be presented to a user via the computing device 330, for example. As shown, the service request user interface 2000 includes a variety of selectable user interface elements associated with different categories of equipment. In the example service request user interface 2000 as shown in FIG. 20, the selected category is commercial kitchen equipment, and selectable user interface elements are presented for food equipment, reach-in refrigeration equipment, garbage disposal equipment, walk-in cooler and walk-in freezer equipment, dishwasher equipment, water equipment, grease trap equipment, and stainless-steel equipment. The service request user interface 2000 provides an example of a building services interface that can be presented by the maintenance management system 204. Various types of maintenance services that are scheduled via the service request user interface 2000 can be performed by maintenance personnel and documented in the maintenance management database 217, for example. Then, the document generation system 202 can use the data from the maintenance management database 217 for various purposes in terms of compliance document generation and other compliance functionality as described herein.

FIG. 21 shows an example planned maintenance user interface 2100 for managing testing, inspections, and maintenance for a facility. The maintenance management system 204 can cause the planned maintenance user interface 2100 to be presented to a user via the computing device 330, for example. For example, the planned maintenance user interface 2100 can be used to manage contracted services performed for the facility. As shown, the planned maintenance user interface 2100 documents various planned maintenance services for the facility, including kitchen hood clearing, fire alarm testing, and emergency and exit lighting testing services. The planned maintenance user interface 2100 shows a visual indication regarding the status of each maintenance service task (e.g., a green colored checkmark if completed, a white colored checkmark if not completed) so the user can easily identify maintenance tasks that need to be completed for various purposes.

The planned maintenance user interface 2100 also includes different visual indications showing whether planned maintenance tasks are required for regulatory purposes and whether documentation is required for regulatory purposes. These visual indicators can be interactive user interface elements that, in response to selection by a user, cause the planned maintenance user interface 2100 to display the relevant regulatory information and required documentation for a particular planned maintenance task, along with the steps being done to complete the maintenance task. The planned maintenance user interface 2100 can also present additional data related to planned maintenance tasks, such as a title, a description, personnel the task is assigned to, costs associated with the planned maintenance tasks, a due date (or indication that the task is past due), and other information. The planned maintenance user interface 2100 can be used by various facility personnel to facilitate handling of maintenance activities and documentation of maintenance activities for compliance document generation and other compliance functionality as described herein. The data associated with the planned maintenance activities can be stored in the maintenance management database 217, for example.

Figure 22:
FIG. 22 shows an example interactive reporting dashboard user interface for one or more facilities, in accordance with some aspects of the disclosure.

FIG. 22 shows an example interactive reporting dashboard user interface 2200 for one or more facilities. The maintenance management system 204 can cause the interactive reporting dashboard user interface 2200 to be presented to a user via the computing device 330, for example. The interactive reporting dashboard user interface 2200, as shown, provides regional and corporate oversight into facility performance on tasks and recommended training courses. The interactive reporting dashboard user interface 2200 highlights overdue and missed instances (e.g., late and skipped) that needed to be addressed for compliance and/or other purposes. The interactive reporting dashboard user interface 2200 can provide operators such as the first operator 222 and the second operator 224 with an overview of facility performance across a collection of facilities, for example. The interactive reporting dashboard user interface 2200 can include selectable user interface elements selectable by the user to view further details (e.g., specific to a given facility, specific to a task type, etc.) regarding overdue tasks and/or regulatory tasks that require attention. The interactive reporting dashboard user interface 2200, as shown, also provides an indicator of overdue tasks that are greater than 30 days overdue and a visual breakdown of late and skipped tasks by month. The interactive reporting dashboard user interface 2200 can help drive compliance for the one or more facilities by providing insight into facility performance on tasks at the regional and corporate levels, for example.

Figure 23:
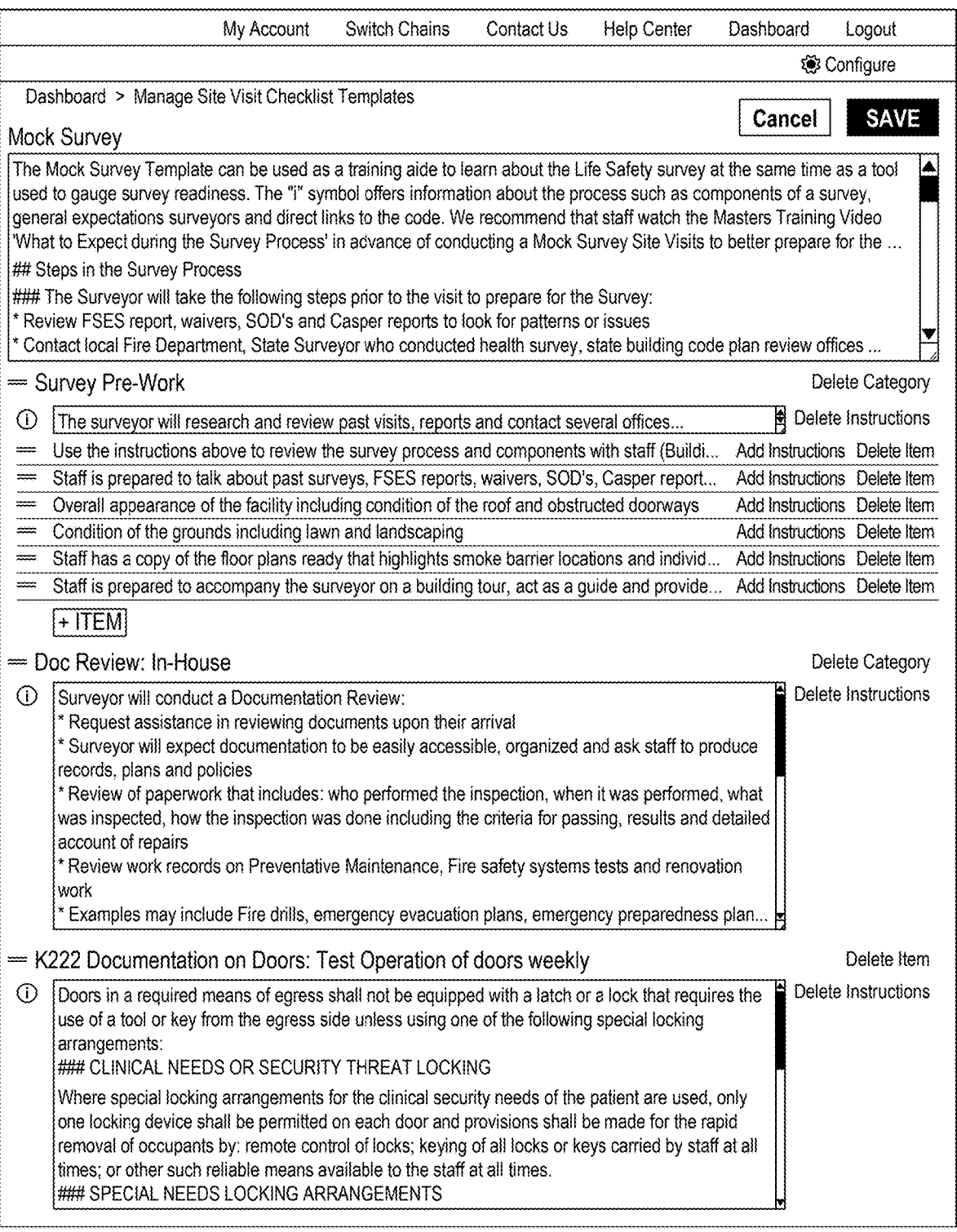
FIG. 23 shows an example administrative tools user interface that can be used by facility personnel to manage templates for compliance document generation, in accordance with some aspects of the disclosure.

FIG. 23 shows an example administrative tools user interface 2300 that can be used by facility personnel to manage templates for compliance document generation. The document generation system 202 can cause the administrative tools user interface 2300 to be presented to a user via the computing device 330, for example. The administrative tools user interface 2300 can allow the user to update various compliance documentation templates as described herein for various purposes. For example, the administrative tools user interface 2300 can be used to update compliance documentation templates to account for changes in public citation data trends. Via the administrative tools user interface 2300, the user can add or edit instructions and explanations for completing different tasks, and the user can also insert various types of training materials (e.g., videos, etc.). The templates managed via the administrative tools user interface 2300 can then be populated using data from various sources (e.g., the different databases detailed above) to automatically generate compliance documentation for a facility and to perform other compliance-related functionality as described herein. In FIG. 23, the administrative tools user interface 2300 shows an example template for a mock survey, however it will be appreciated that various types of templates can be edited and managed in a similar manner.

FIG. 24 shows an example of a mock survey checklist user interface 2400 that can be used by facility personnel to gauge facility compliance. The document generation system 202 can cause the mock survey checklist user interface 2400 to be presented to a user via the computing device 330, for example. The mock survey checklist user interface 2400 can be presented responsive to a selection of a checklist tab 2402 as shown near the top of the mock survey checklist user interface 2400. The mock survey checklist user interface 2400 includes a checklist of different tasks for performing by facility personnel to prepare for a compliance audit (survey). The checklist includes different tasks for survey pre-work as well as different tasks for document reviews. For example, the survey pre-work tasks are shown to include making sure the staff is prepared to talk about past events (e.g., surveys, reports, waivers, etc.), checking the overall appearance of the facility (including condition of the roof and obstructed doorways), and making sure the staff has a copy of the floor plans for the facility ready. The tasks for documents reviews include reviewing K222 documentation for operation of doors, reviewing K347 documentation on detectors, and reviewing K345 documentation on fire alarms, for example. The mock survey checklist user interface 2400 includes various selectable user interface elements for adding notes associated with different tasks and for viewing further details about different tasks in the checklist.

Figure 25:
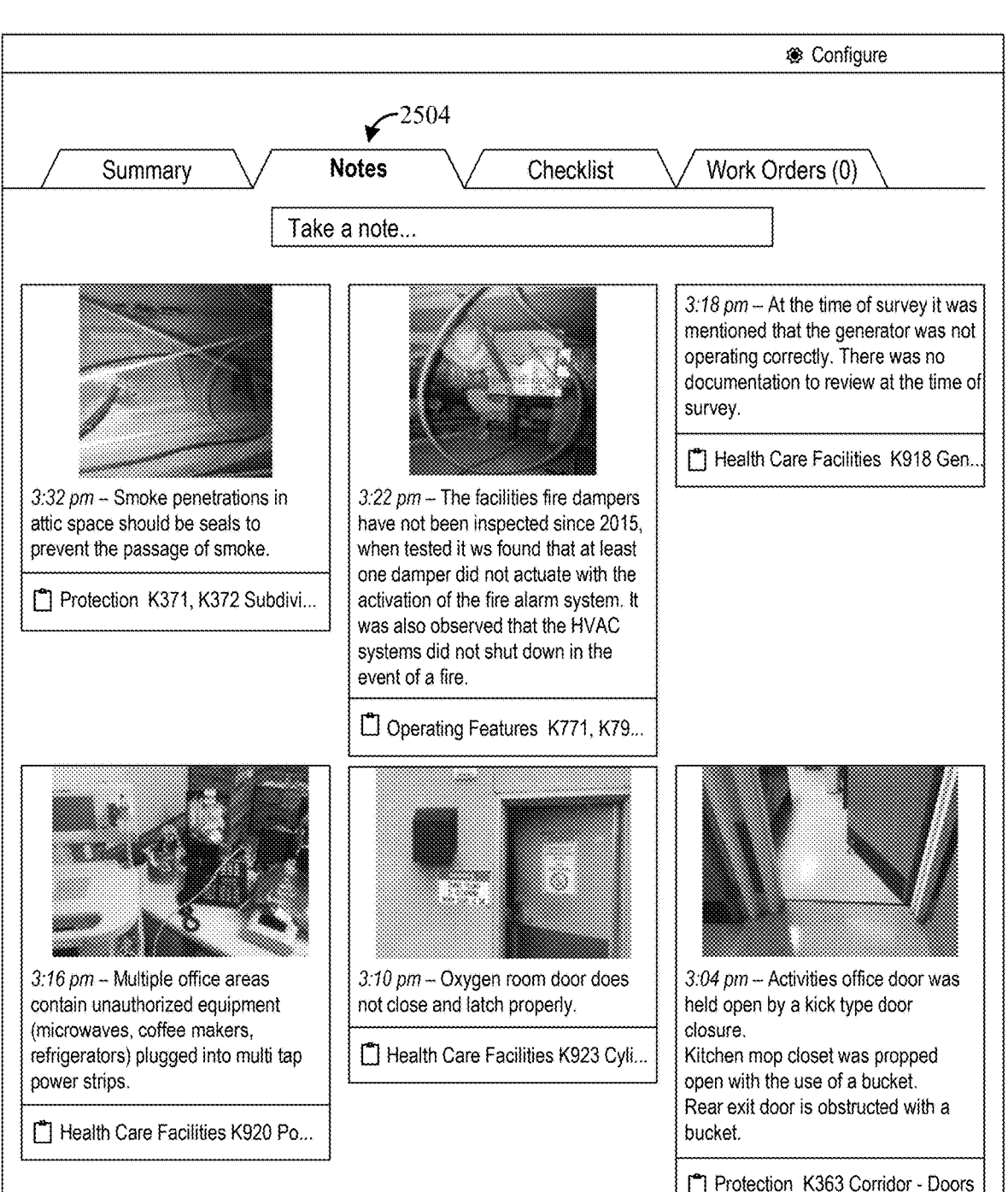
FIG. 25 shows an example mock survey notes user interface that can be used by facility personnel to record various details about a facility for compliance purposes, in accordance with some aspects of the disclosure.

FIG. 25 shows an example mock survey notes user interface 2500 that can be used by facility personnel to record various details about a facility for compliance purposes. The document generation system 202 can cause the mock survey notes user interface 2500 to be presented to a user via the computing device 330, for example. The mock survey notes user interface 2500 can be presented responsive to a selection of a notes tab 2504 as shown near the top of the mock survey notes user interface 2500. Via the mock survey notes user interface 2500, the user can add a variety of different types of notes associated with a facility while performing a mock survey. As shown in FIG. 25, the notes can include captured photos with potential K-tags or other types of tags related to facility compliance. The notes entered via the mock survey notes user interface 2500 can serve as a potential data source when generating compliance documentation for various types of compliance inspections. The notes entered via the mock survey notes user interface 2500 can also be used to guide maintenance actions to resolve potential issues and help reduce citation risk in the event of a compliance inspection.

Figure 26:
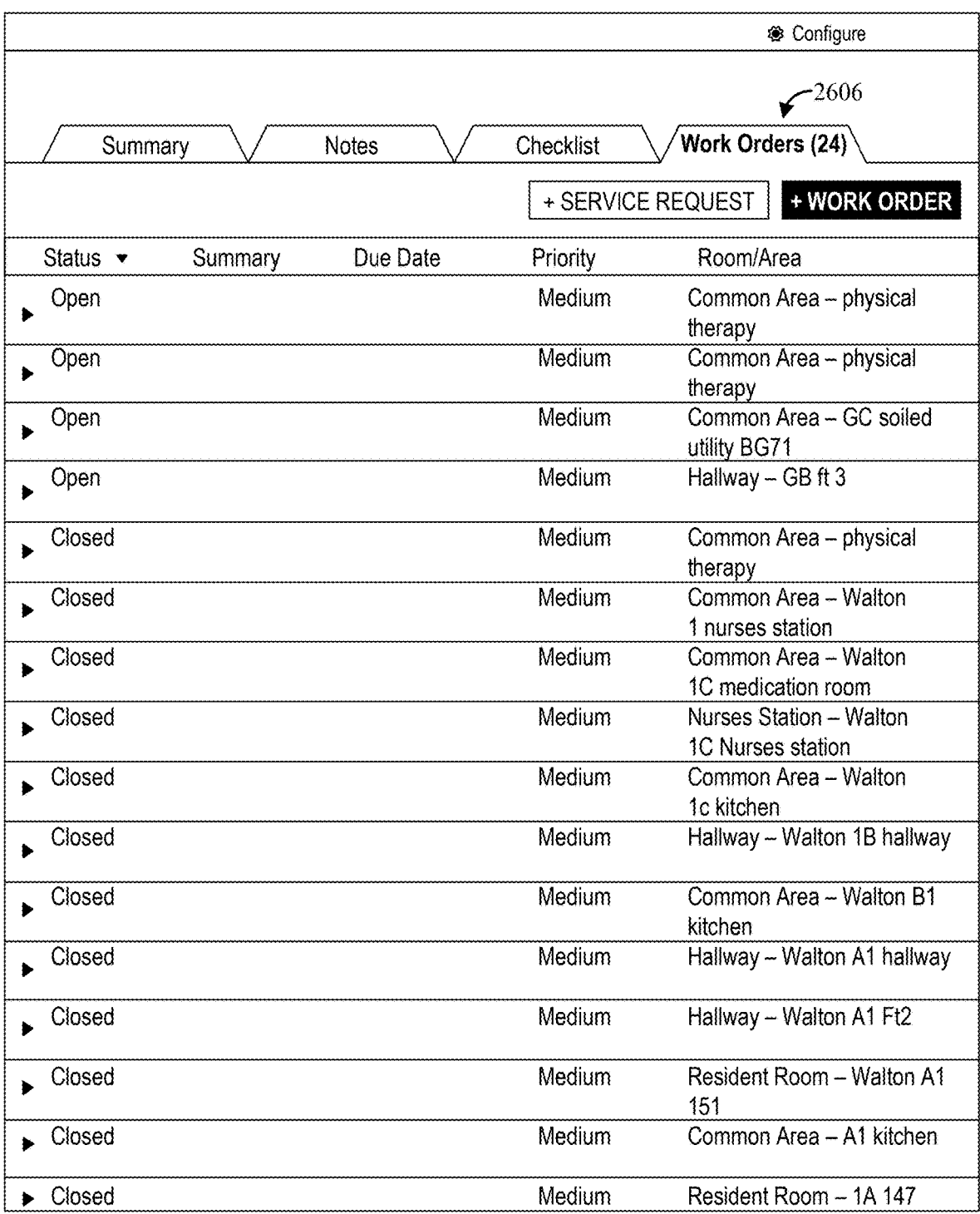
FIG. 26 shows an example mock survey work order user interface that can be used by facility personnel to manage work orders and/or service requests associated with a mock survey, in accordance with some aspects of the disclosure.

FIG. 26 shows an example mock survey work order user interface 2600 that can be used by facility personnel to manage work orders and/or service requests associated with a mock survey. The document generation system 202 can cause the mock survey work order user interface 2600 to be presented to a user via the computing device 330, for example. The mock survey work order user interface 2600 can be presented responsive to a selection of a work orders tab 2606 as shown near the top of the mock survey work order user interface 2600. Via the mock survey work order user interface 2600, the user can view a variety of information associated with different work orders and/or service requests associated with the mock survey, including the status, summary, due date, priority level, room/area, person assigned, and other information. Via the mock survey work order user interface 2600, the user can also easily create new work orders or service requests by selecting a selectable user interface element presented on the mock survey work order user interface 2600. For example, the user can find an issue with the facility when going through the checklist for the mock survey (e.g., via the mock survey checklist user interface 2400), and then the user can add a note associated with the issue via the mock survey notes user interface 2500 and/or create a work order to address the issue via the mock survey work order user interface 2600. The mock survey work order user interface 2600 can also present generated tasks, work orders, and recommendations for improved compliance based on a mock survey.

FIG. 27 shows an example task explanation user interface 2700 that can be used by facility personnel to complete tasks for a facility. The document generation system 202 can cause the task explanation user interface 2700 to be presented to a user via the computing device 330, for example. The task explanation user interface 2700 can be presented as part of a mock survey exercise responsive to the selection of a user interface element (e.g., a user interface element presented on the mock survey checklist user interface 2400). The example task explanation user interface 2700 as shown in FIG. 27 explains to the user how to complete tasks associated with different compliance requirements for fire safety. The task explanation user interface 2700 details both existing compliance requirements as well as new compliance requirements that capture recent changes in regulatory code, for example. The task explanation user interface 2700 identifies specific rules and regulations associated with different tasks and also provides a detailed explanation to the user such that the user does not need to be an expert in the regulatory code to complete the tasks.

FIG. 28 shows an example best practice task explanation user interface 2800 that can be used by facility personnel to complete tasks for a facility. The document generation system 202 can cause the best practice task explanation user interface 2800 to be presented to a user via the computing device 330, for example. Via the best practice task explanation user interface 2800, the user can view a detailed explanation of how to complete a compliance-related task in accordance with best practices (e.g., as maintained via the best practices database 218). In the specific example shown in FIG. 28, the best practice task explanation user interface 2800 explains to the user how to test an emergency power generator for a facility. The best practice task explanation user interface 2800 includes a link to a video explanation as well as detailed steps that can be followed by the user to test the emergency power generator for the facility. The best practice task explanation user interface 2800 also provides reference materials (e.g., viewable and/or downloadable Portable Document Format (PDF) files, links, etc.) associated with the best practice task. The reference materials can include equipment specifications, details on the regulatory code, historical citation data associated with the best practice task, and other reference materials. The best practices database 218 can be used to maintain a best practices library including one or more tasks for each testing, inspection, and maintenance requirement associated with different compliance inspections. The best practice task explanation can also be automatically formatted properly for inclusion in generated compliance documentation to satisfy requirements.

FIG. 29 shows an example best practice task logging user interface 2900 that can be used by facility personnel to document the results of performing a best practice task. The document generation system 202 can cause the best practice task logging user interface 2900 to be presented to a user via the computing device 330, for example. Via the best task logging user interface 2900, the user can enter and/or view data associated with a best practice task. In the specific example shown in FIG. 29, the best task logging user interface 2900 shows the results of testing an emergency power generator for a facility. As shown, the results presented via the best task logging user interface 2900 include a variety of parameters such as the load, the engine oil pressure, the water temperature, voltage and amperage outputs, and other information associated with the emergency power generator for the facility that can be used for logbook documentation. The results shown via the best task logging user interface 2900 can be used by the document generation system 202 to automatically generate properly formatted compliance documentation for a given compliance inspection and for other compliance functionality as described herein.

Figure 30:
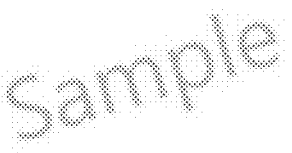
FIG. 30 shows an example paper document that can be maintained for facility compliance purposes, in accordance with some aspects of the disclosure.

FIG. 30 shows an example paper document 3000 that can be maintained for facility compliance purposes. For example, the paper document 3000 can be uploaded to the document generation system 202, or the paper document 3000 can be stored on-site (e.g., in a binder) at a facility. The paper document 3000 generally details maintenance services performed by one or more of the service providers 226. In the specific example shown in FIG. 30, the paper document 3000 details services performed by an outside contractor to clean out a grease trap at a facility using a pump truck. The paper document 3000 details a date of service and other information associated with the work performed that can be required for various types of compliance inspections. In some examples, service providers 226 can alternatively enter the information from the paper document 3000 directly into the document generation system 202 and/or the maintenance management system 204 via a user interface. However, not all service providers 226 can use electronic documentation of work, and therefore the ability of the document generation system 202 to handle and maintain paper documents such as the paper document 3000 can be important for eliminating compliance gaps and also for generating appropriate compliance documentation for compliance inspections. In addition, some regulations require a "paper" copy including a signature from the technician as proof that the work was done. For example, for testing fire alarms, NFPA code requires a detailed report from the technician with date and signature, which can be uploaded into an electronic format for documentation purposes.

FIG. 31 shows an example task list user interface 3100 that can be used by facility personnel or surveyors to assess compliance gaps for a facility. The document generation system 202 can cause the task list user interface 3100 to be presented to a user via the computing device 330, for example. Via the task list user interface 3100, the user can view a variety of tasks that can be required for completion for compliance purposes (e.g., to address compliance gaps). Via the task list user interface 3100, the user can view details associated with each task such as a due date, a description, a completion status, and other information associated with the task. The user can also upload documents (e.g., logging documents including equipment testing details and results)

via the task list user interface 3100. A surveyor can also view the task list user interface 3100 to view different documents associated with a given compliance inspection for a facility in order to evaluate the compliance of the facility with one or more regulations.

FIG. 32 shows an example citation report 3200 that details different citations issued by a regulatory entity. The document generation system 202 can generate the citation report 3200 using data retrieved from the citations database 216 and cause the citation report 3200 to be presented on a user interface to a user via the computing device 330, for example. The citation report 3200 provides an example of public citation data that can be accessed by the document generation system 202 and stored in the citations database 216. The user can view a variety of information via the citation report 3200, and the document generation system 202 can utilize a variety of information via the citation report 3200, including facility, location, survey information, deficiency descriptions, citation dates and codes, severity codes, and other citation information. In the specific example shown in FIG. 32, the citation report 3200 details citations issued by the Centers for Medicare & Medicaid Services (CMS). As described above, citation data such as the citation report 3200 can be used by the document generation system 202 to identify citation trends and proactively facilitate facility compliance based on the citation trends to reduce citation risk for the facility.

FIG. 33 shows another example citation report 3300 that details a specific citation issued by a regulatory entity. The document generation system 202 can generate the citation report 3300 using data retrieved from the citations database 216 and cause the citation report 3300 to be presented on a user interface to a user via the computing device 330, for example. The user can upload the citation report 3300 to the document generation system 202 such that the citation report 3300 can be accessed and managed electronically. Via the citation report 3300, users can view specific details associated with a given citation issued by the regulatory entity. For example, as shown in FIG. 33, the citation report 3300 not only provides a detailed explanation of a deficiency identified by a surveyor pertaining to a Post Indicator Valve (PIV), but it also provides a K-Tag. and a plan of correction for following to address the deficiency pertaining to the PIV. After uploading the citation report 3300, the user can enter the plan of correction in manually via a user interface, or the document generation system 202 can generate a recommended plan of correction based on an analysis of the citation report 3300. The document generation system 202 can then add details associated with the plan of correction to the citation report 3300, or otherwise associated data associated with the plan of correction to the citation report 3300 within the document generation system 202. Responsive to receiving the citation report 3300, the maintenance management system 204 can also generate corresponding tasks or work orders. Detailed reports such as the citation report 3300 can be used by facility personnel to gain insight into why citations might be issued and what steps they can take to avoid receiving similar citations.

Another interactive report that can be generated by the document generation system 202 and/or the maintenance management system 204 and presented to a user via a user interface can present the most common citations that have recently been issued based on an aggregate of citation data from the citations database 216. The most common citations can be displayed, prioritized, and/or filtered based on various factors including type of facility, region, severity, recency, AHJ, etc. The user can also filter based on a specific facility to get insight into citations for each facility in an organization. The report can display a graphical visualization of the trends (e.g., a line chart) for each citation to see the change in number of occurrences of the citation over time. The report can provide recommendations and/or guidance for each citation based in part on surveyor notes (e.g., the "Summary Statement of Deficiencies" from the example citation report 3300) from the aggregated citations (and associated rules and regulations) to provide insight into why the citation might be issued and what steps they can take to avoid receiving similar citations (e.g., using a statistical or language model (large language model, etc.) to process surveyor citation notes and associated rules and regulations).

In some implementations, citation-analysis is performed using advanced natural language models and semantic matching, extracting violations and recommendations from heterogeneous document types. The compliance-management platform can incorporate a dedicated citation-analysis engine (CAE) that transforms unstructured regulatory text into the structured inputs consumed by the template-generation model and the enforcement model feedback loop. The CAE executes on distributed-computing resources and draws upon multiple internal and external data repositories to maximize extraction fidelity.

In some implementations, the CAE hosts a large-language-model (LLM) implemented as a transformer network fine-tuned on corpora of healthcare regulations, surveyor narratives, and compliance documentation. The LLM parses incoming documents—citation reports, survey notes, Federal-Register notices—and outputs token-level embeddings that capture semantic relationships among regulatory clauses, data-standards, and facility attributes.

In some implementations, a natural-language-processing (NLP) layer surrounding the LLM performs named-entity recognition, sentiment estimation, and text classification. Extracted entities include violation codes, facility identifiers, severity ratings, and recommended corrective actions. The NLP layer classifies each violation according to (i) governing jurisdiction, (ii) facility type, and (iii) risk tier—thus producing the structured historical-enforcement data required by the enforcement model.

In some implementations, structured outputs can be aligned against the data-alignment knowledge repository by means of a graph-matching routine. Traversal algorithms map each extracted violation to a corresponding node that represents the violated data standard. Semantic-matching logic tolerates lexical variation, allowing "soiled-linen handling" in a citation narrative to match formal "infection-control linen policies" language appearing in the code of data standards.

In some implementations, a plan-of-correction generator downstream of the LLM can assemble data-alignment recommendations tailored to the entity's facility profile. For example, the generator sequences tasks by referencing dependency edges in the knowledge graph and by applying the priority-scoring engine. Continuous-monitoring logic within the CAE scrapes regulatory websites and public-notice feeds for amendments to the code of data standards. Detected updates trigger automatic LLM re-evaluation and graph-node revision, thereby maintaining synchronization between the platform's knowledge base and the most current regulatory landscape.

In some implementations, the CAE additionally hosts an evidence-validation adapter that queries external academic and industry databases to cross-reference recommended practices with peer-reviewed literature. Validation scores are appended as metadata to each recommendation, enabling the platform to favor evidence-supported remediation steps when ranking tasks.

In some implementations, outcome-tracking analytics feed back into the LLM fine-tuning pipeline. Post-remediation survey results, task-completion metrics, and citation-avoidance statistics are aggregated across the dispersed network (e.g., aggregate historical enforcement data). Reinforcement-learning updates adjust model weights so that successful remediation patterns receive higher output probability in future plan-generation cycles.

In some implementations, the citation-analysis engine, LLM, NLP layer, graph-matching routine, and plan-of-correction generator constitute a tightly integrated subsystem that supplies high-precision, evidence-backed, and continuously refreshed inputs to the template-generation model and the enforcement-model feedback loop, thereby advancing the platform's objective of automated, data-driven compliance management.

FIG. 34 shows an example best practice categories user interface 3400 that can be used by facility personnel to configure best practice categories. The document generation system 202 and/or the maintenance management system 204 can cause the best practice categories user interface 3400 to be presented to a user via the computing device 330, for example. Via the best practice categories user interface 3400, the user can view a standard set of best practice categories associated with a given type of facility or organization. The standard set of best practice categories in some examples are not editable by the user, but instead are included in each implementation of document generation system 202 and/or the maintenance management system 204 to provide a baseline level of best practice functionality. The standard best practice categories can represent different categories of documents related to common regulatory reporting requirements. Data associated with the standard best practice categories can be maintained in the best practices database 218, for example.

Figure 35:
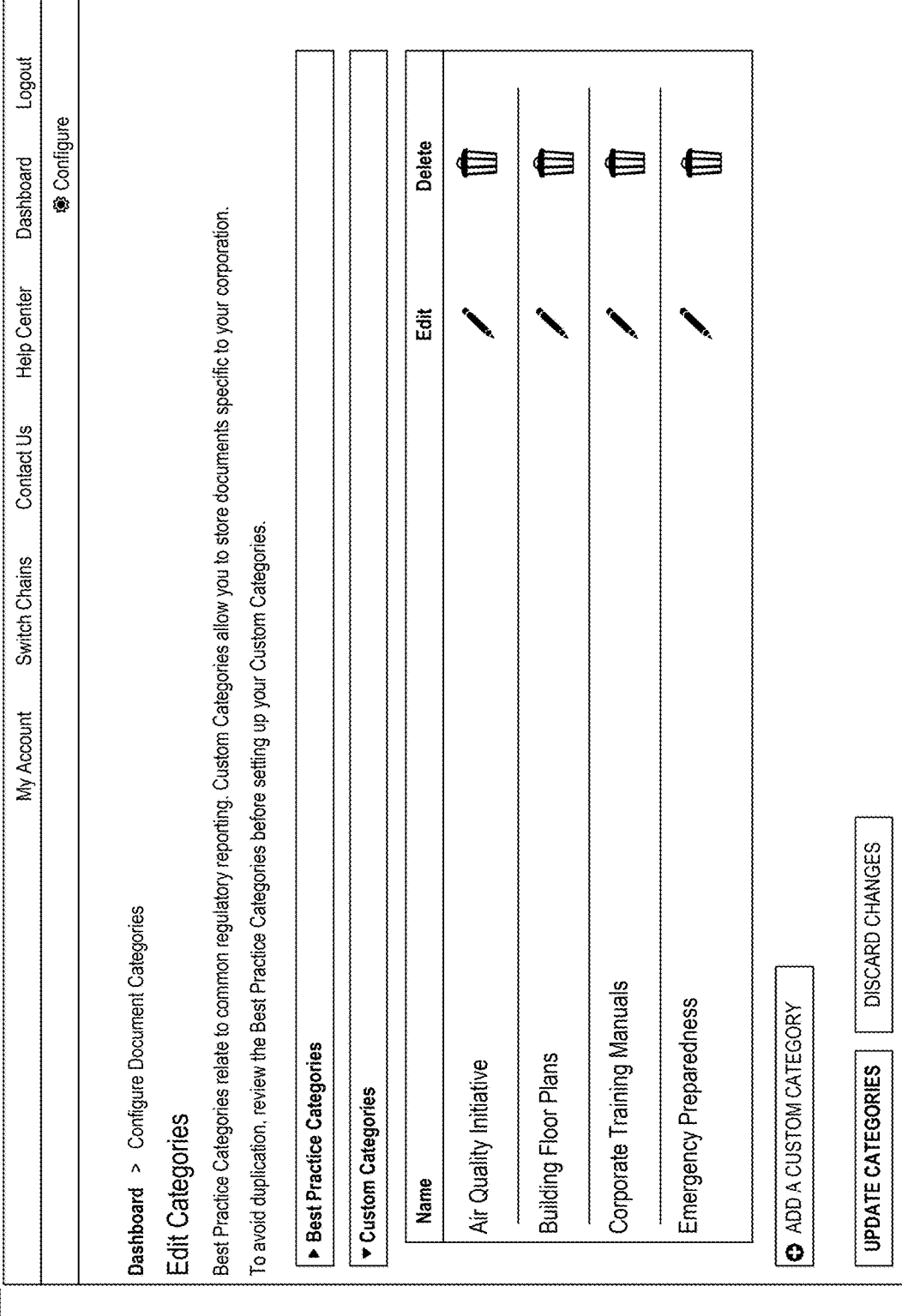
FIG. 35 shows another example best practice categories user interface that can be used by facility personnel to configure best practice categories, in accordance with some aspects of the disclosure.

FIG. 35 shows another example best practice categories user interface 3500 that can be used by facility personnel to configure best practice categories. The document generation system 202 and/or the maintenance management system 204 can cause the best practice categories user interface 3500 to be presented to a user via the computing device 330, for example. Via the best practice categories user interface 3500, the user can add, edit, and delete custom best practice categories. For example, as shown, the user can configure custom best practice categories for an air quality initiative, for building floor plans, for corporate training materials, and/or for emergency preparedness. Depending on the type of facility, location of the facility, compliance trends for a facility or organization, and/or other possible factors, the ability to configure custom best practices can provide more dynamic and configurable functionality of the document generation system 202 and/or the maintenance management system 204. The custom best practice categories can represent different categories of documents related to more particular (e.g., facility or organization specific) regulatory reporting requirements than the standard best practice categories. The custom best practice categories can be configured to pull in documentation from multiple sources, such as detailed above, to generate custom compliance documentation. Data associated with custom best practice categories can be maintained in the best practices database 218, for example.

FIG. 36 shows an example compliance documentation overview user interface 3600 that can be used by facility personnel to view and manage compliance documents. The document generation system 202 and/or the maintenance management system 204 can cause the compliance documentation overview user interface 3600 to be presented to a user via the computing device 330, for example. Via the compliance documentation overview user interface 3600, the user can view historical compliance documentation in a variety of categories for a given facility, group of facilities, and/or organization. For example, the user can view compliance documentation related to elevators, emergency power generators, fire drills, etc. As shown, each category of compliance documentation can be presented as a selectable user interface element (e.g., a drop down list) via the compliance documentation overview user interface 3600. Moreover, via the compliance documentation overview user interface 3600, the user can also search (e.g., via text input) for compliance documents, filter compliance documents (e.g., by date, by category, etc.), and upload compliance documents for maintaining electronically.

FIG. 37 shows another example compliance documentation overview user interface 3700 that can be used by facility personnel to view and manage compliance documents. The document generation system 202 and/or the maintenance management system 204 can cause the compliance documentation overview user interface 3700 to be presented to a user via the computing device 330, for example. Specifically, the compliance documentation overview user interface 3700 shows example functionality when the user selects a particular category of compliance documentation. In this case, as shown, the user has selected the fire suppression category. As a result of selecting the fire suppression category, the user can see that 56 compliance documents related to fire suppression are stored electronically. Each document can include a file name, an associated task, and an assigned date. Moreover, via the compliance documentation overview user interface 3700, the user can perform actions associated with different compliance documents related to fire suppression via individual selectable user interface elements. For example, the user can download, edit, and/or delete individual documents via the selectable user interface elements.

FIG. 38 shows an example mega pull user interface 3800 that can be used by facility personnel to grab all documentation and other inputs related to compliance parameters specified by the user. The document generation system 202 can cause the mega pull user interface 3800 to be presented to a user via the computing device 330, for example. Via the mega pull user interface 3800, the user can specify various parameters related to a specific compliance "mega pull". For example, as shown, the user initiates a life safety export that pulls all report documents for a specified time frame. The mega pull can return work history reports, logbook reports, compliance documents, and/or other inputs or documents in all categories related to life safety with the click of a single button. This functionality provided by the document generation system 202 can allow users to efficiently and thoroughly access all electronically stored documents related to specified parameters via a simple interface to facilitate compliance practices.

FIG. 39 shows an example severity matrix 3900 that can be used to determine the severity of compliance gaps and/or violations for a facility or organization. The severity matrix 3900 is associated specifically with CMS code and regulations. However, the severity matrix 3900 provides an example indicating how severity scores can be generated by the document generation system 202 and/or the maintenance management system 204 to prioritize tasks and/or work orders for completion. As noted, when the document generation system 202 and/or the maintenance management system 204 identify compliance gaps, the compliance gaps can be scored according to severity based on factors including citation risk, a continuum of service, a cost, and/or a past-due time period associated with the compliance gap. In some examples, as reflected in the severity matrix 3900, the scores can be indicative of whether compliance gaps are isolated gaps, part of a pattern of gaps, or part of a widespread phenomenon of gaps (e.g., across an entire organization). Further, the scores can be indicative of whether the gaps cause immediate jeopardy to resident health or safety, actual harm that is not immediate, no actual harm but potential for more than minimal harm that is not in immediate jeopardy, or no actual harm with only the potential for minimal harm.

For each similar data standard identified, the system can determine an enforcement trend by analyzing a penalty matrix generated by an enforcement model. The enforcement model can be implemented as a statistical model, machine learning model, rules engine, or compliance logic, and can be configured to output one or more penalty matrices based on enforcement data input. Each penalty matrix can contain weights that represent the likelihood of enforcement procedures being initiated against entities for specific data standards. The system can use these weights to adjust the ranking of recommendations in the template, ensuring that for each entity, the specific data standards, actions, or tasks associated with higher risk—considering both the probability and potential impact of enforcement— are prioritized for remediation. This allows different entities to have distinct prioritization profiles for the same data standards, reflecting their unique risk exposures.

The disclosed technology includes penalty matrices. In some implementations, a penalty matrix includes a multi-dimensional data structure generated by the enforcement model that can encode weights representing the likelihood, or an increased likelihood, severity, and frequency of data enforcement procedures, or actual data enforcement procedures, for each entity and data standard within the dispersed network. The penalty matrix can be constructed by aggregating historical enforcement data—such as citation records, surveyor notes, and regulatory actions—and applying statistical or machine learning algorithms to estimate risk scores for each entity-standard pair. In some implementations, the penalty matrix can be output by a historical model. For example, the penalty matrix can include entries where Entity A and Standard X are assigned a weight of 0.85 (indicating high risk of enforcement), while Entity B and Standard Y are assigned a weight of 0.30 (indicating lower risk). These weights can be updated iteratively as new enforcement data is received, allowing the compliance-management platform to dynamically adjust prioritization and recommendations in the data template based on the most current risk landscape.

The disclosed technology includes enforcement models. In some implementations, an enforcement model can refer to a computational component of the compliance-management platform that analyzes historical enforcement data and operational metrics to estimate the likelihood and potential impact of future data enforcement procedures against entities for specific data standards. The enforcement model can be implemented using statistical algorithms (e.g., logistic regression to calculate citation probabilities), machine learning techniques (e.g., gradient-boosted decision trees trained on historical citation events), rules engines (which apply predefined regulatory rules to flag non-compliance), or compliance logic, which can refer to a set of domain-specific heuristics and decision rules that encode expert knowledge about regulatory requirements and typical enforcement patterns. The system can select or combine these models based on the type and quality of available data, the regulatory context, and the operational characteristics of the entity. For example, the platform can use a machine learning model to predict infection control citation risk for facilities with rich historical data, a rules engine to flag missing documentation in real time, and compliance logic to prioritize actions when regulatory changes are ambiguous or data is incomplete. The system can integrate these models by assigning weights to their outputs or by using an ensemble approach, where the final risk score or penalty matrix is derived from a combination of statistical, machine learning, and rules-based assessments. This integration ensures that the enforcement model adapts to varying data environments and regulatory frameworks, providing robust and context-sensitive compliance recommendations.

To inform the generation and adjustment of recommendations, the method aggregates historical enforcement data, including records of data enforcement procedures such as audits, penalties, and corrective actions. This data is collected from multiple sources, including publicly available regulatory survey results and surveyor observations. Surveyor observations can refer to compliance findings, notes, or assessments made by regulatory surveyors or inspectors that are public or non-public. Non-public surveyor observations can include those observations not disclosed in public reports, or published after a delay of weeks or months, or which are available to the entity or its compliance team. Each enforcement record is associated with environmental factors such as date, time, username, location, status, external weather conditions, and pass/fail record, which provide context for the enforcement event.

Environmental factors, as referenced herein, can be associated with individual records in the historical enforcement data and can be used by the compliance-management platform to refine risk assessments and prioritize data-alignment recommendations. These factors—such as date, time, username, location, status, external weather conditions, or pass/fail record—can be included for all records or only for those where such contextual information is available or relevant. For example, if a citation record includes the environmental factor "external weather conditions: severe storm," the enforcement model can increase the likelihood score for non-compliance related to emergency preparedness standards for that facility during the affected period. Similarly, if a pass/fail record is linked to a specific location and time, the system can identify patterns of compliance failures that occur during night shifts or in particular facility areas, enabling targeted recommendations such as additional staff training or procedural changes for those contexts.

An enforcement model is used to analyze the aggregated historical enforcement data. The enforcement model is configured to output penalty matrices-structured data representations that assign weights to the likelihood of enforcement procedures for each entity and data standard. These penalty matrix outputs can include multiple matrices, each corresponding to different time periods, entity types, or data standards. The model can utilize statistical analysis, machine learning, or rule-based logic to identify new data trends and patterns in enforcement activity.

Although the invention has been described and illustrated in the foregoing illustrative examples, it is understood that the present disclosure has been made only by way of example, and that numerous changes in the details of implementation of the invention can be made without departing from the spirit and scope of the invention, which is limited only by the claims that follow. Features of the disclosure can be combined and rearranged in various ways.

We claim:

1. A method for adapting data alignment recommendations across a dispersed network of entities in response to a change in a code of data standards, the method comprising:
   generating a data template of data alignment recommendations sorted according to an original ranking by inputting the code into a template generation model configured to output data alignment recommendations based on data standards input,
      wherein the data alignment recommendations include instructions to entities for aligning with code changes, and
      wherein the original ranking is determined by base scores of the template generation model corresponding to likelihoods of enforcement procedures occurring against a given entity for a given data standard;
   aggregating historical enforcement data by matching entity identifying information across separate data sources,
      wherein the historical enforcement data includes records of data enforcement procedures against the entities;
   identifying a data trend for a data standard associated with the change in the code based on a penalty matrix output by an enforcement model configured to output penalty matrices from input including historical enforcement data,
      wherein the penalty matrix includes weights corresponding to likelihoods of data enforcement procedures against the given entity for the given data standard;
   adjusting the base scores of the template generation model in response to the weights of the penalty matrix; and
   generating an updated data template using adjusted scores of the template generation model,
      wherein the updated data template includes revised data alignment recommendations sorted according to a revised ranking for the entities.

2. The method of claim 1, further comprising:
   detecting the change in the code by comparing an updated version of the code with a prior version.

3. The method of claim 1, wherein the original ranking includes a first rank for a first data alignment recommendation corresponding with a first entity and second rank corresponding with a second entity, wherein the second rank is greater than the first rank indicating a greater likelihood of a data enforcement procedure against the second entity than the first entity, and wherein adjusting the base scores further comprises:
   adjusting the first rank to a third rank in the updated data template; and
   adjusting the second rank to a fourth rank on the updated data template,
      wherein the third rank is greater than the fourth rank indicating the change to the code corresponds to a greater likelihood of a data enforcement procedure against the first entity than the second entity.

4. The method of claim 1, wherein the enforcement model includes at least one of:
   a statistical model,
   a machine learning model,
   a rules engine, or
   a compliance logic.

5. The method of claim 1, wherein each record is associated with environmental factors including at least one of:
   date,
   time,
   username,
   location,
   status, or
   pass/fail record.

6. The method of claim 1, wherein the adjusted scores include a previous iteration of the template generation model, wherein the method further includes an enforcement model feedback loop comprising:
   determining a set of susceptible entities based on a comparison of the revised ranking of the revised data alignment recommendations against an enforcement threshold,
      wherein the entities associated with a ranking above the enforcement threshold are included within the set of susceptible entities;
   updating the historical enforcement data with data corrections made by the entities in response to the change, and actual data enforcement procedures performed against the entities over an updated time period;
   identifying a new data trend for the data standard associated with the change based on updated historical enforcement data;
   determining an error based on a comparison of a new set of adjusted scores against the previous iteration of the template generation model; and
   updating the weights of the penalty matrix to reflect the new data trend and mitigate the error.

7. The method of claim 6, wherein the historical enforcement data includes publicly available regulatory survey results and surveyor observations,
   wherein the historical enforcement data informs generation of the revised ranking by enabling the enforcement model feedback loop to:
      identify patterns in enforcement procedures across similar entity types,
      predict likelihoods of future enforcement procedures based on entity characteristics and operational metrics, and
      adjust data alignment prioritization algorithms based on effectiveness of previous remediation efforts in preventing recurring enforcement procedures.

8. A non-transitory, computer-readable storage medium comprising instructions recorded thereon, wherein the instructions when executed by at least one data processor of a system, cause the system to:
   aggregate historical enforcement data for a code of data standards across a plurality of data sources by matching network entities according to identifying information,
      wherein the historical enforcement data includes records of data enforcement procedures performed against the network entities; and
   identify a data trend for a data standard using the historical enforcement data as input to a historical model configured to output a penalty matrix,
      wherein the penalty matrix includes weights, and the weights reflect likelihoods of data enforcement procedures being performed against a given entity for a given data standard;
   responsive to the weights of the penalty matrix, set base scores of a template generation model configured to output data alignment recommendations based on trends in data standard enforcement, wherein each base score determines a rank in a data template of a recommendation for an entity to align with the data standard; and generate the data template of recommendations to align the network entities according to the data standard by inputting the data trend into the template generation model.

9. The non-transitory, computer-readable storage medium of claim 8, further comprising:

detecting a change in the code by comparing an updated version of the code with a prior version.

10. The non-transitory, computer-readable storage medium of claim 8, wherein a first data alignment recommendation has a first rank in the data template for a first entity and second rank for a second entity, and wherein the system is further caused to:

adapt the first data alignment recommendation for the first entity with a first priority score by updating the first rank to a third rank on an updated data template based on adjusted scores of the template generation model; and adapt the first data alignment recommendation for the second entity with a second priority score by updating the second rank to a fourth rank on the updated data template based on the adjusted scores of the template generation model, wherein the first priority score is higher than the second priority score, and wherein the third rank is greater than the fourth rank indicating a change to the code corresponds to an increased likelihood of a data enforcement procedure for the first entity than for the second entity with regard to a first data standard.

11. The non-transitory, computer-readable storage medium of claim 8, wherein the historical model includes at least one of:

a statistical model,
a machine learning model,
a rules engine, or
a compliance logic.

12. The non-transitory, computer-readable storage medium of claim 8, wherein each record is associated with environmental factors including at least one of:

date,
time,
username,
location,
status, or
pass/fail record.

13. The non-transitory, computer-readable storage medium of claim 11, wherein the network entities with likelihoods of data enforcement procedures above a given threshold comprise predicted data enforcement procedures, and wherein the medium includes a model feedback loop that further causes the system to:

update the historical enforcement data with actual data enforcement procedures performed against the network entities over an updated time period;

identify a new data trend for the data standard associated with a change based on updated historical enforcement data;

determine an error based on a comparison of a new set of adjusted scores against the adjusted scores from a previous iteration of the template generation model; and update the weights of the penalty matrix to reflect the new data trend and mitigate the error.

14. The non-transitory, computer-readable storage medium of claim 13, wherein the historical enforcement data includes publicly available regulatory survey results and surveyor observations, wherein the historical enforcement data informs generation of the rank of the recommendation by enabling the enforcement model feedback loop to:

identify patterns in enforcement procedures across similar entity types, predict likelihoods of future enforcement procedures based on entity characteristics and operational metrics, and adjust data alignment prioritization algorithms based on effectiveness of previous remediation efforts in preventing recurring enforcement procedures.

15. A system comprising:

at least one hardware processor; and at least one non-transitory memory storing instructions, which, when executed by the at least one hardware processor, cause the system to:

generate a template of recommendations for aligning entities according to data standards based on an output of a template generation model configured to output alignment recommendations based on data standards input;

responsive to an updated data standard, identify similar data standards to the updated data standard based on similarity scores from a similarity model, the similarity model configured to output similarity scores based on data standard input;

determine an enforcement trend for the similar data standards based on a penalty matrix from an enforcement model configured to output penalty matrices based on enforcement data input; and adjust a ranking of the recommendations in the template according to weights of the penalty matrix.

16. The system of claim 15, wherein a first data alignment recommendation has a first rank in the template for a first entity and second rank for a second entity, and wherein the system is further caused to:

adapt the first data alignment recommendation for the first entity with a first priority score by updating the first rank to a third rank on an updated data template based on adjusted scores of the template generation model; and adapt the first data alignment recommendation for the second entity with a second priority score by updating the second rank to a fourth rank on the updated data template based on the adjusted scores of the template generation model, wherein the first priority score is higher than the second priority score, and wherein the third rank is greater than the fourth rank indicating the updated data standard corresponds to an increased likelihood of a data enforcement procedure for the first entity than for the second entity with regard to a first data standard.

17. The system of claim 15, wherein the enforcement model includes at least one of:

a statistical model,
a machine learning model,
a rules engine, or
a compliance logic.

18. The system of claim 15, wherein each record is associated with environmental factors including at least one of:

date, time,
username,
location,
status, or
pass/fail record.

19. The system of claim 15, wherein the entities with likelihoods of data enforcement procedures above a given threshold comprise predicted data enforcement procedures, and wherein the system is further caused to enter a model feedback loop comprising:

update historical data input with additional data enforcement procedures performed by an authority against the entities over an updated time period;

identify a new data trend for the updated data standard based on updated historical enforcement data;

determine an error based on a comparison of a new set of adjusted scores against the adjusted scores from a previous iteration of the template generation model; and update the weights of the penalty matrix to reflect the new data trend and mitigate the error.

20. The system of claim 19, wherein the historical data includes publicly available regulatory survey results and surveyor observations, wherein the historical data informs generation of the ranking of the recommendations in the template by enabling the model feedback loop to:

identify patterns in enforcement procedures across similar entity types, predict likelihoods of future enforcement procedures based on entity characteristics and operational metrics, and adjust data alignment prioritization algorithms based on effectiveness of previous remediation efforts in preventing recurring enforcement procedures.

* * * * *